(12) United States Patent
Fillion

(10) Patent No.: US 11,539,144 B2
(45) Date of Patent: *Dec. 27, 2022

(54) PHASED ARRAY ANTENNA WITH ISOTROPIC AND NON-ISOTROPIC RADIATING AND OMNIDIRECTIONAL AND NON-OMNIDIRECTIONAL RECEIVING ELEMENTS

(71) Applicant: Raymond Albert Fillion, Niskayuna, NY (US)

(72) Inventor: Raymond Albert Fillion, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,401

(22) Filed: Jul. 28, 2022

(65) Prior Publication Data
US 2022/0368033 A1    Nov. 17, 2022

Related U.S. Application Data

(63) Continuation-in-part of application No. 17/434,744, filed as application No. PCT/US2020/033370 on May
(Continued)

(51) Int. Cl.
*G01S 15/04* (2006.01)
*H01Q 3/46* (2006.01)
(Continued)

(52) U.S. Cl.
CPC .............. *H01Q 21/22* (2013.01); *G01S 7/032* (2013.01); *H01Q 3/2676* (2013.01); *H01Q 15/02* (2013.01); *H01Q 1/3233* (2013.01)

(58) Field of Classification Search
CPC ........ H01Q 3/2629; H01Q 3/38; H01Q 21/06; H01Q 21/08; H01Q 3/267; G01R 29/10; H02J 50/20; H03D 7/00
See application file for complete search history.

(56) References Cited

U.S. PATENT DOCUMENTS 3,755,815 A    8/1973   Stangle
4,065,748 A    12/1977  Maguer
(Continued)

FOREIGN PATENT DOCUMENTS

CN    205488535      8/2016
WO    2021-029929 A2    2/2021
WO    2021-029929 A3    6/2021

OTHER PUBLICATIONS

Radar Fundamentals (Part II), Basics about aerodynamics and avionics, World Press 2016.
(Continued)

*Primary Examiner* — Mirza F Alam
(74) *Attorney, Agent, or Firm* — Jay R. Yablon

(57) ABSTRACT

A phased array antenna system comprising a plurality of isotropic radiating elements and/or omnidirectional receiving elements addressing close in fields and a plurality of non-isotropic radiating elements and/or non-omnidirectional receiving elements addressing remote fields with the combined elements used to extend the maximum range of the antenna system without increasing the number of element nor the output power of the antenna. The non-isotropic radiating elements and/or the non-omnidirectional receiving elements can be formed by adding focusing structures such as lenses or reflective structures in the radiating path of isotropic radiating elements and/or omnidirectional receiving elements. Antennas with combined isotropic radiating and non-isotropic radiating elements can be utilized for electromagnetic phased array radar, communication and imaging systems and for acoustic phased array sonar or ultrasound systems.

19 Claims, 36 Drawing Sheets

Related U.S. Application Data 18, 2020, now Pat. No. 11,411,324, which is a continuation of application No. 16/429,167, filed on Jun. 3, 2019, now abandoned, and a continuation of application No. 16/429,165, filed on Jun. 3, 2019, now Pat. No. 10,838,059.

(51) Int. Cl.

| | | |
|---|---|---|
| *H01Q 21/22* | (2006.01) | |
| *H01Q 15/02* | (2006.01) | |
| *G01S 7/03* | (2006.01) | |
| *H01Q 3/26* | (2006.01) | |
| *H01Q 1/32* | (2006.01) | |

(56) References Cited

U.S. PATENT DOCUMENTS

| | | | |
|---|---|---|---|
| 4,381,509 A | 4/1983 | Rotman | |
| 6,842,401 B2 | 1/2005 | Chang | |
| 8,780,012 B2 | 7/2014 | Llombart Juan et al. | |
| 8,988,754 B2 | 3/2015 | Sun | |
| 9,753,351 B2 | 9/2017 | Eldada | |
| 10,838,059 B2 | 11/2020 | Fillion | |
| 11,411,324 B2 | 8/2022 | Fillion | |
| 2005/0007882 A1* | 1/2005 | Bachelor | G01S 15/89 367/103 |
| 2005/0030228 A1* | 2/2005 | Judd | H01Q 21/08 342/383 |
| 2005/0225492 A1 | 10/2005 | Metz | |
| 2008/0136702 A1 | 6/2008 | Tsuchihashi et al. | |
| 2008/0218429 A1* | 9/2008 | Johnson | H03D 7/00 343/893 |
| 2010/0066590 A1* | 3/2010 | Brown | G01S 13/42 342/147 |
| 2012/0218866 A1* | 8/2012 | LaWhite | G01S 7/521 367/87 |
| 2013/0214971 A1* | 8/2013 | Robinson | G01R 29/10 342/360 |
| 2017/0062944 A1 | 3/2017 | Zimmerman et al. | |
| 2017/0110909 A1* | 4/2017 | Zeine | H02J 50/10 |
| 2017/0170556 A1* | 6/2017 | Carey | H01Q 3/40 |
| 2017/0187248 A1* | 6/2017 | Leabman | H02J 50/20 |
| 2018/0231647 A1* | 8/2018 | Fabrizio | G01S 7/52003 |
| 2018/0269579 A1* | 9/2018 | Bartone | H01Q 9/0428 |
| 2019/0317210 A1 | 10/2019 | Fillion | |
| 2019/0319368 A1 | 10/2019 | Fillion | |
| 2022/0045439 A1 | 2/2022 | Fillion | |

OTHER PUBLICATIONS

A Framework for Understanding: Deriving the Radar Range Equation, Keysight.com.
mmWave Automotive Radar and Antenna System Development, awrcorp.com Application Note.
ARS 408-21 Long Range Radar Overview, Conti-engineering.com.
Introduction to Naval Weapon Engineering, fas.org.
Laser Beam Steering Subsystem: Center For Gravitational Physics, Australian National University.
Highly Integrated Optical Phased Arrays: Martinj R Heck, Aarhus University, Denmark.
Revolutionary new 2D optical phased array is packed onto a single, tiny chip, ExtremeTech, Jan. 13, 2013.
D. Ehyaie, Novel Approaches to the Design of Phased Array Antenna, Dept. of Electrical Engineering, University of Michigan, 2011.
Iulian Rosu, Phased Array Antennas, https://www.qsl.net/va3iul/Antenna/Phased_Array_Antennas/Phased_Array_Antennas.pdf.
Baviskar, Jaypal et al. "Metamaterial Lens Incorporated Enhanced Gain Omnidirectional Conformal Patch Antenna." 2016 IEEE Aerospace Conference. Mar. 2016 pp. 1-7 (Year: 2016).
International Preliminary Report on Patentability (IPRP) dated Aug. 24, 2021 for parent application PCT/US20/33370.
Antenna Theory and Design, Stutzman, W. L. Thiele, G.A 3rd Edition. New York: Wiley, 2013, p. 307.
Design and Performance Evaluation of a Dielectric Flat Lens Antenna for Millimeter-Wave Applications, M. Imbert et al., IEEE Antennas and Wireless Propagation Letters, 2013.

* cited by examiner

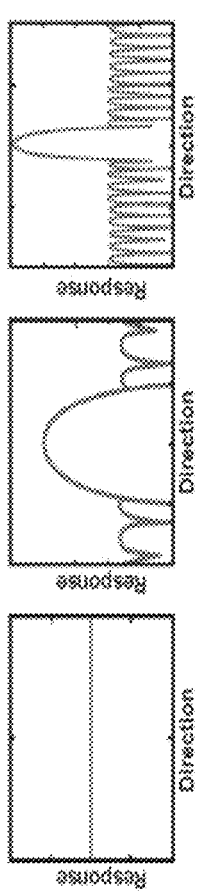
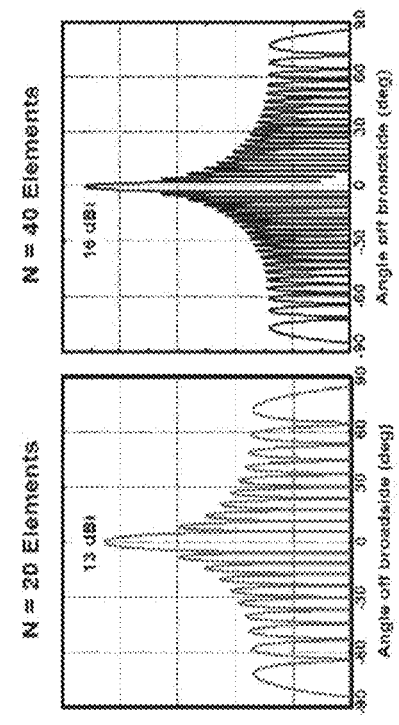
FIG. 2A FIG. 2B FIG. 2C FIG. 2D FIG. 2E FIG. 2F
Prior Art

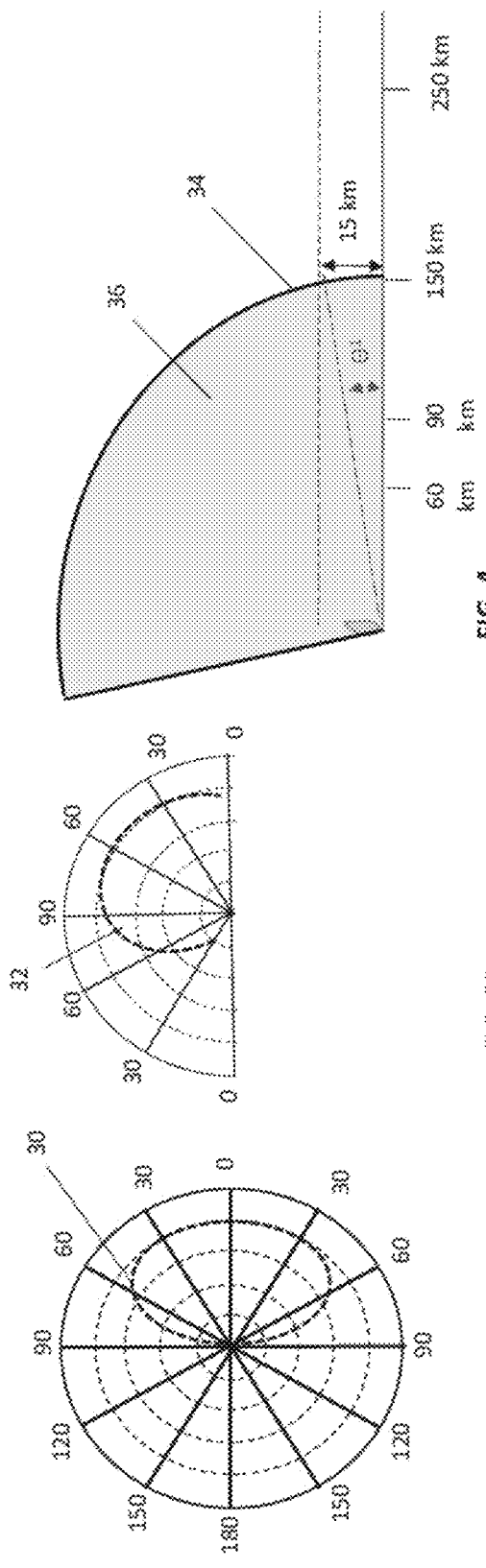

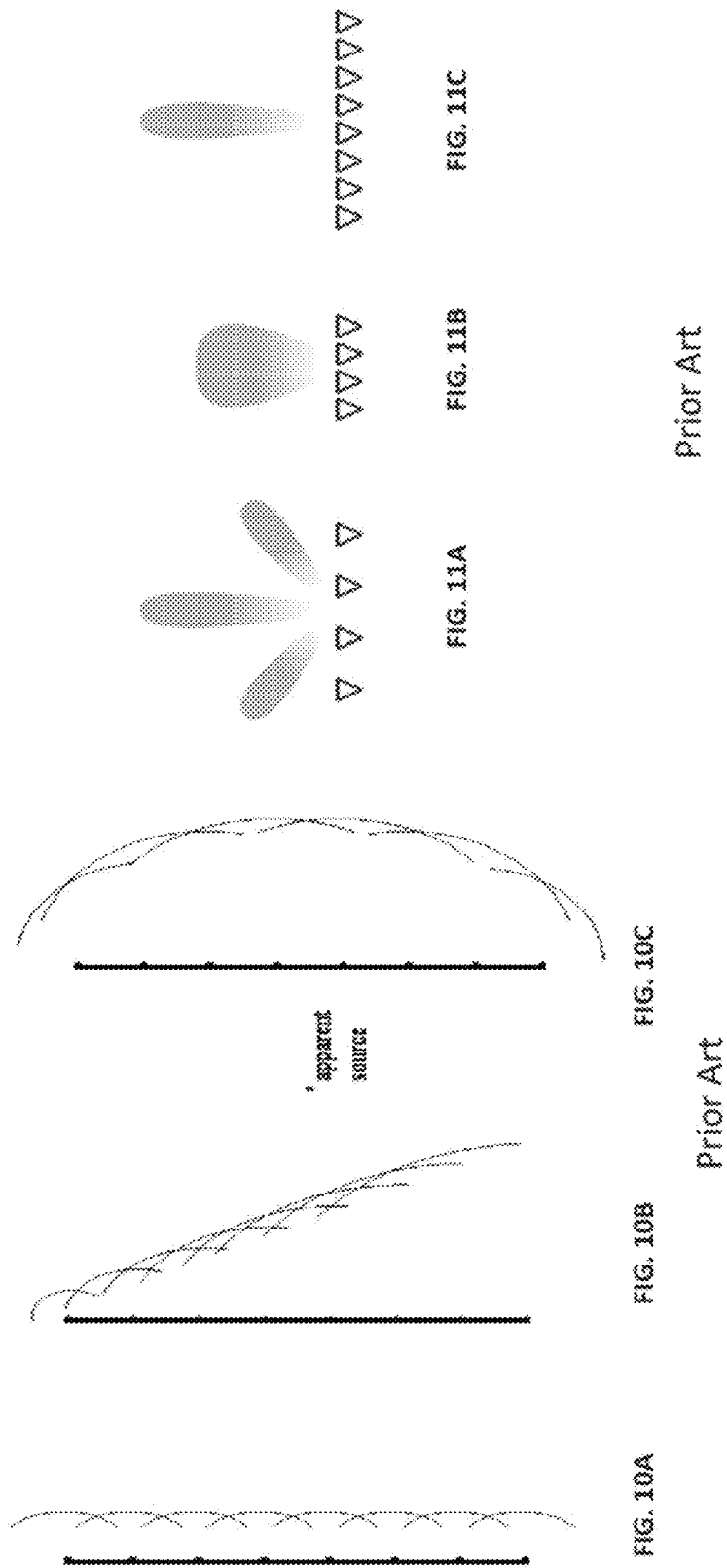

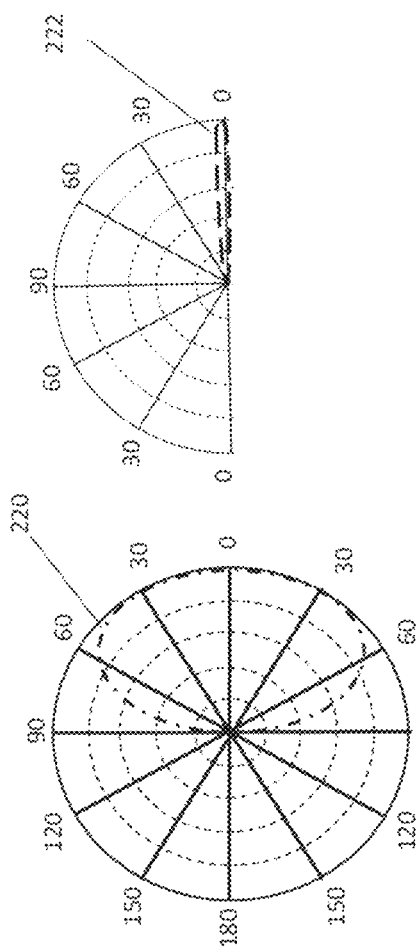
FIG. 14A
FIG. 14B
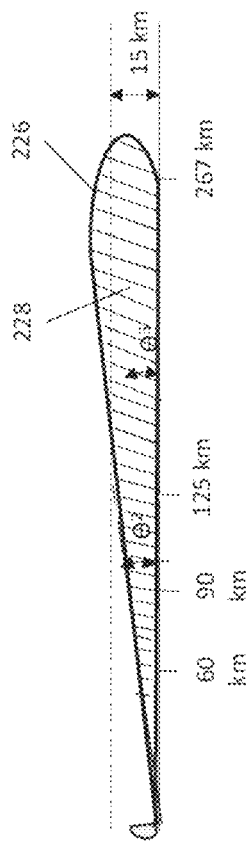
FIG. 15

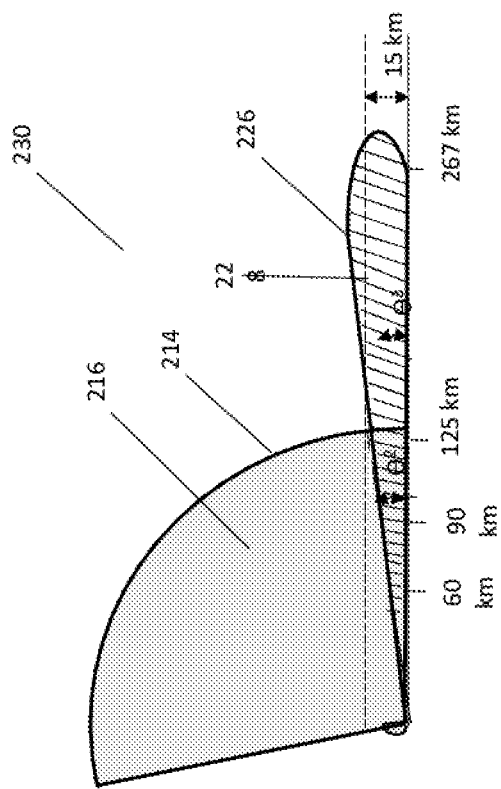
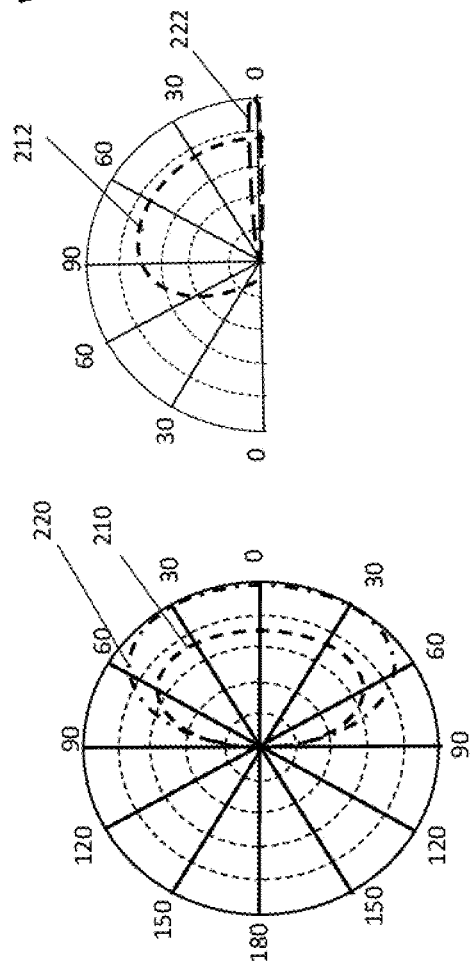
FIG. 17
FIG. 16B
FIG. 16A

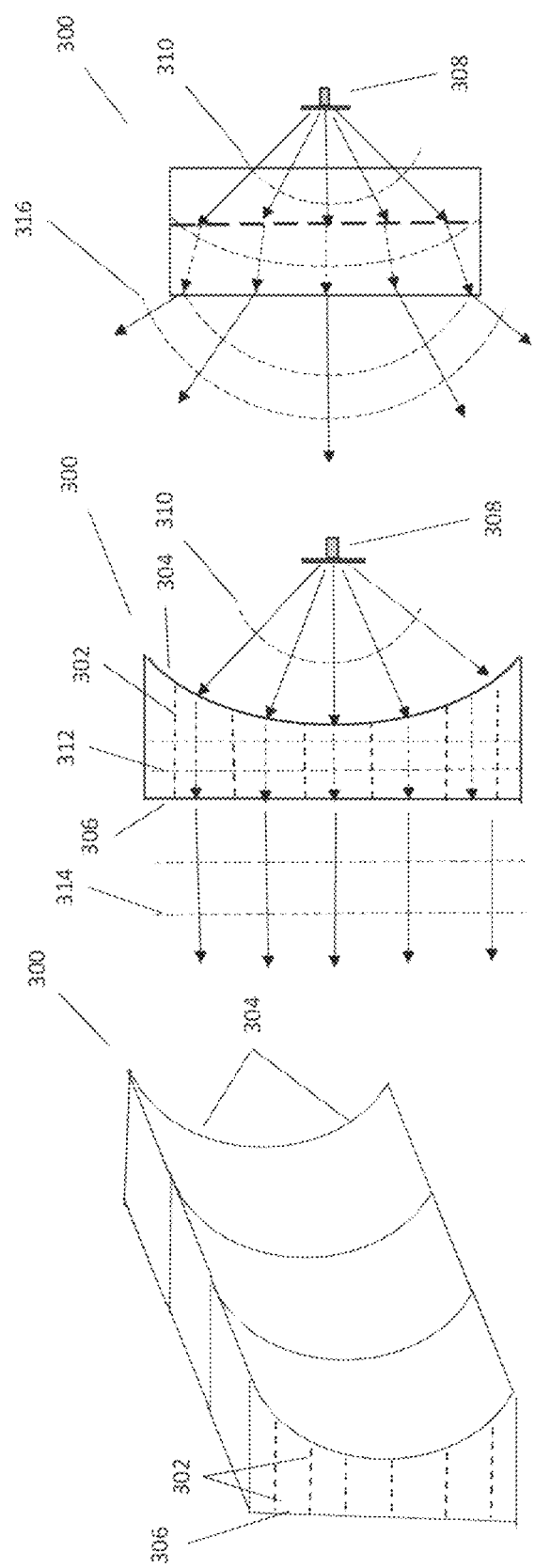

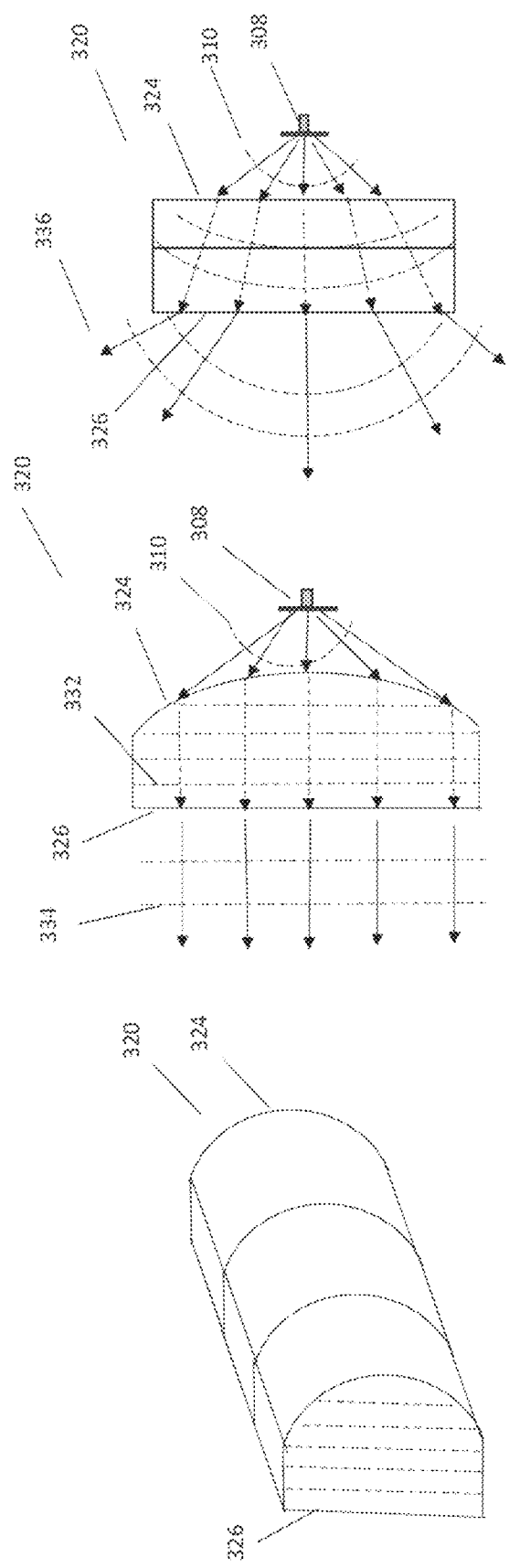

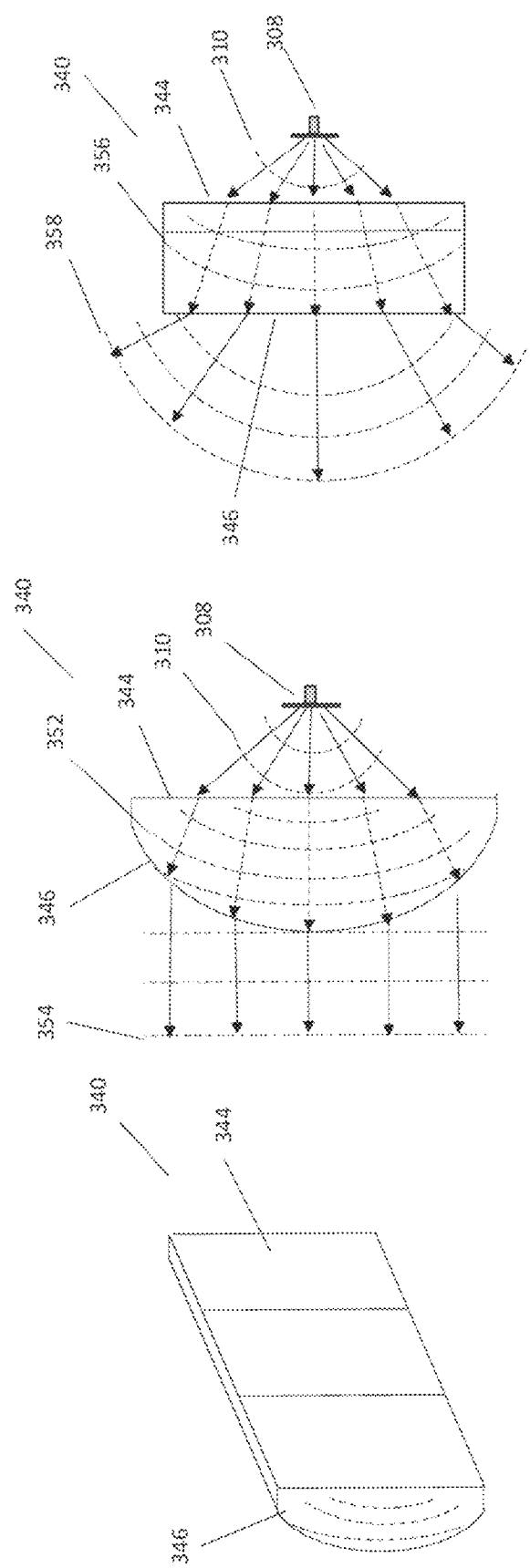

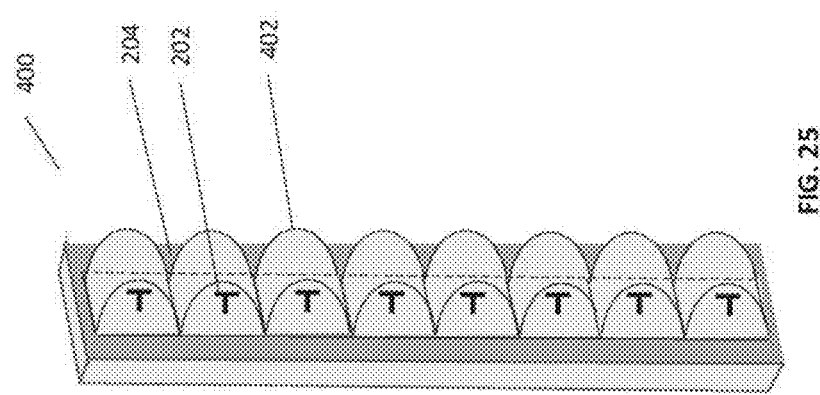
FIG. 25
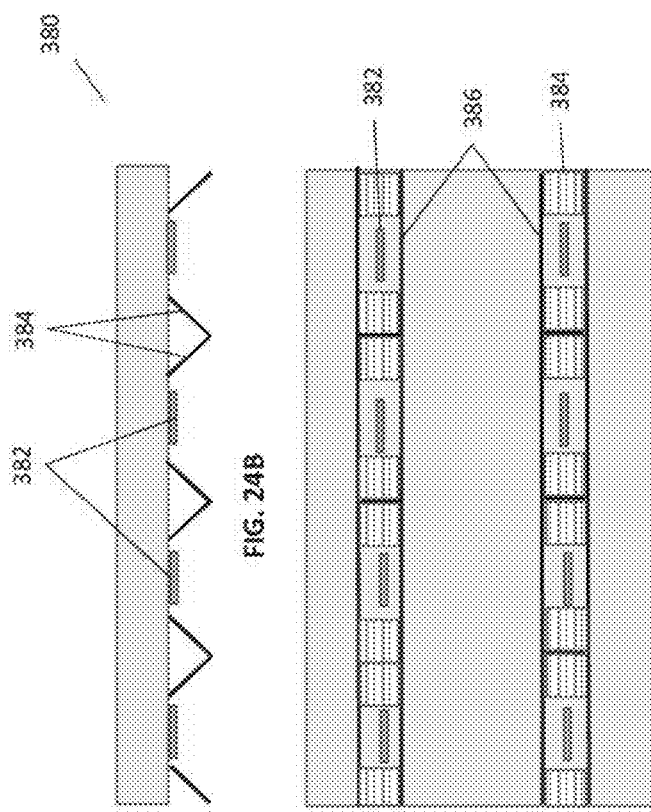
FIG. 24A
FIG. 24B
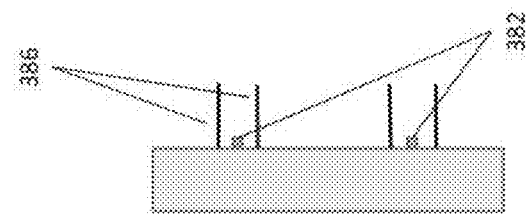
FIG. 24C

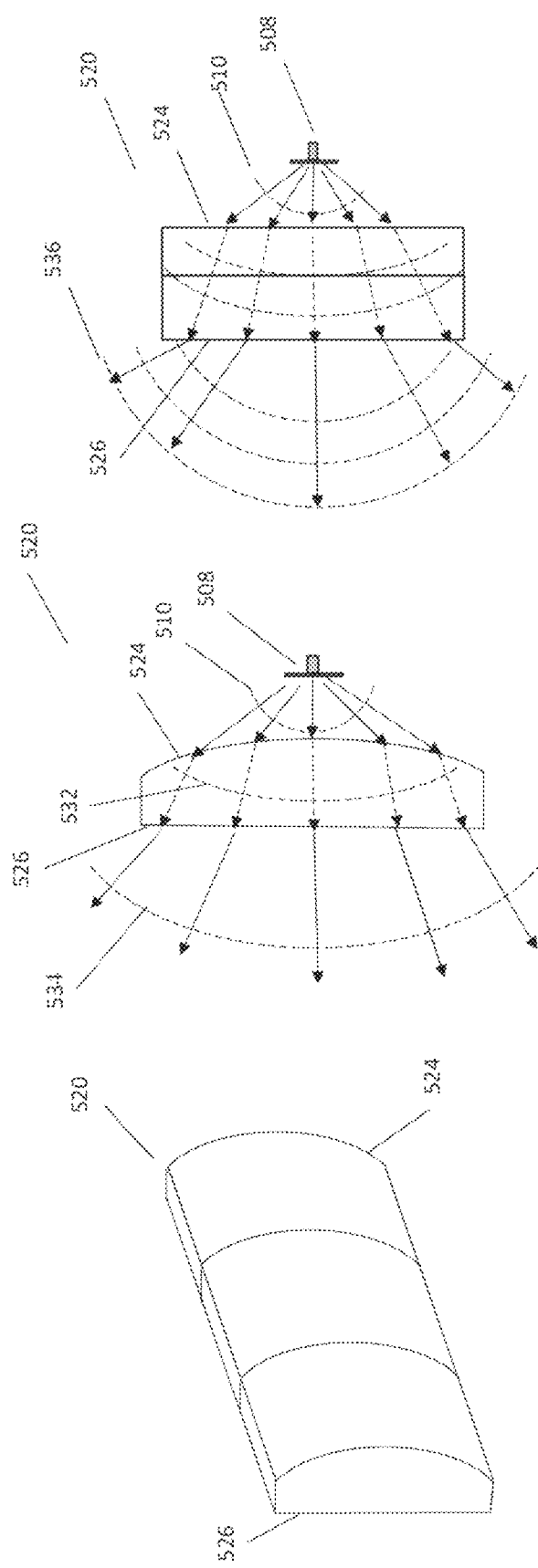

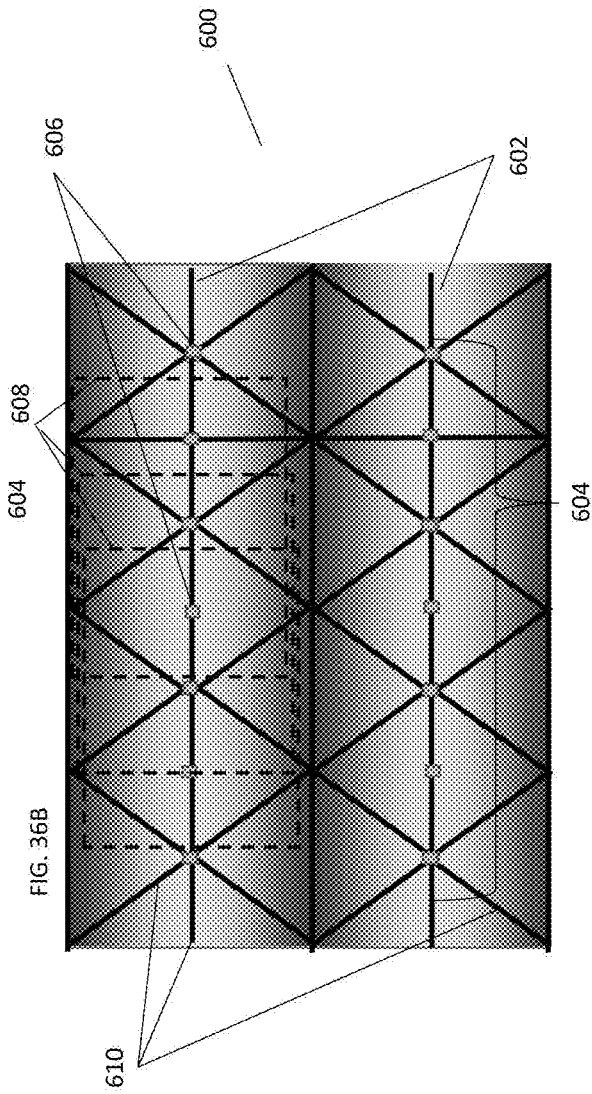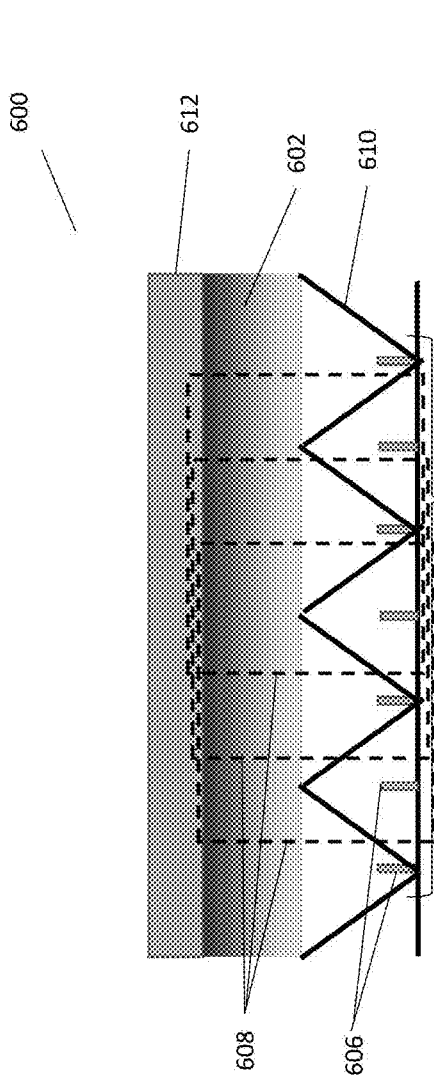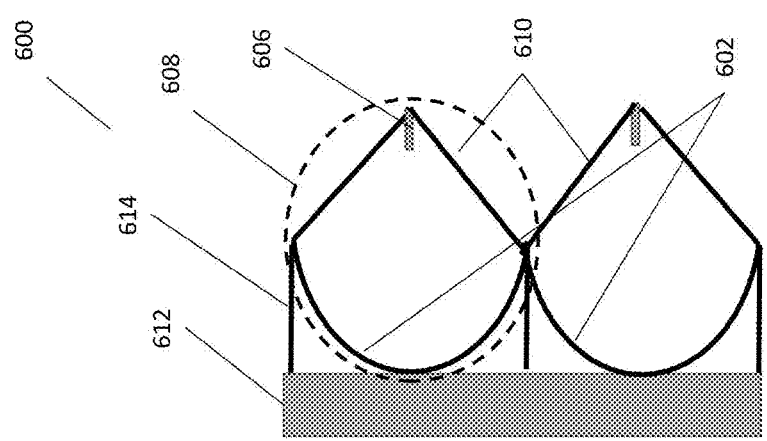
FIG. 36A
FIG. 36B
FIG. 36C

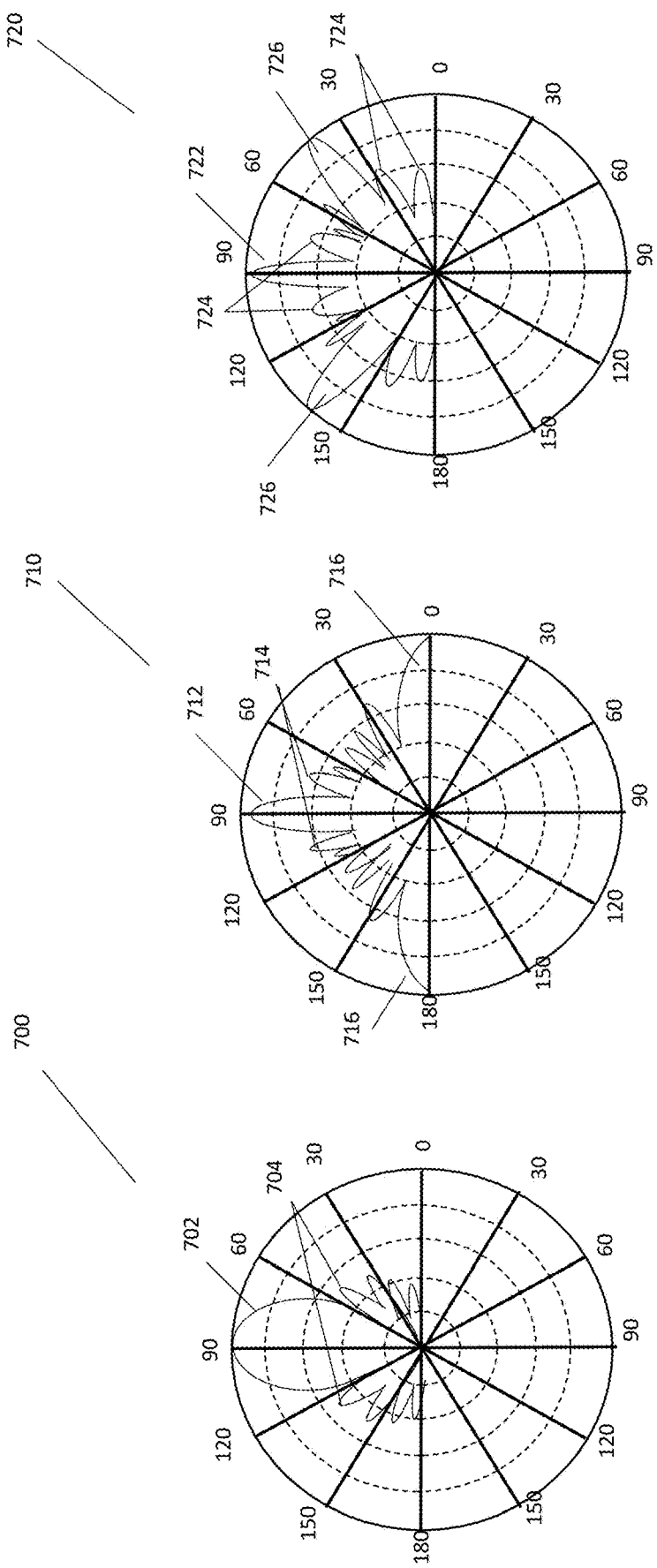

PHASED ARRAY ANTENNA WITH ISOTROPIC AND NON-ISOTROPIC RADIATING AND OMNIDIRECTIONAL AND NON-OMNIDIRECTIONAL RECEIVING ELEMENTS

CROSS-REFERENCE TO RELATED APPLICATIONS

This application is a continuation-in-part of application Ser. No. 17/434,744 filed Aug. 28, 2021, now U.S. Pat. No. 11,411,324 issued Aug. 9, 2022. Said Ser. No. 17/434,744 is a US national stage application of PCT/US20/33370 filed May 18, 2020. Said PCT/US20/33370 is a continuation of abandoned U.S. Ser. No. 16/429,167 filed Jun. 3, 2019. Said PCT/US20/33370 is also a continuation of U.S. Ser. No. 16/429,165 filed Jun. 1, 2019, now U.S. Pat. No. 10,838,059 issued Nov. 17, 2020.

BACKGROUND OF THE INVENTION

Phased Array antennas for electromagnetic (radar and communication) and acoustic (sonar and ultrasound) systems use multiple radiating elements, each radiating electromagnetic waves or acoustic waves respectively. The waves radiating from each element of the array on the face of an antenna have their phase and the amplitude separately controlled so that one or more beams of in-phase radiated waves is projected in a narrow pattern in a specific direction. In the case of a linear array antenna such as in a sonar towed array having a horizontal array of elements, the beam forming is only in a disc perpendicular to the axis of the line array. In the case of an area array antenna with elements distributed in an X-Y grid, such as ship board phased array radar, the beam is formed in both the vertical plane and the horizontal plane. Without phase delays between adjacent radiating elements, radiated beam would be centered broadside or perpendicular to the face of the antenna. By changing the phase difference between vertical and/or horizontal adjacent elements, the direction of the beam of in-phase waves is changed in the vertical (elevation) and/or horizontal (azimuth) planes.

In prior art phased array radar systems, the antenna has an array of 100's or 1000's of radiating elements, each radiating an electromagnetic wave at a specific frequency and wavelength, such as microwave or millimeter wave or from less than 1 GHz to more than 40 GHz. The radar antenna has radiating elements that have a radiating pattern that is generally isotropic covering a field of view of at least +60° to −60° in azimuth and at least +60° to −60° in elevation although in the case of surface radar systems the useful field of view in elevation is generally 0° to 90°. In most radar systems, the same antenna and the same array of elements used to radiate the transmitted electromagnetic waves are used for receiving the return electromagnetic waves. On the receive mode, these elements are generally omnidirectional, able to receive signals from at least +/−60° in azimuth and at least +/−60° in elevation.

Parabolic Radar Antenna Systems To fully understand the function of various prior art phased array radar antenna and their resulting radar wave patterns, it helps to understand monolithic, non-phased array antenna. The basic radar antenna has a single feed or radiating element, a parabolic reflector and a single receiver element. The radiating element typically has a spherical or near spherical wavefront. Each portion of the of the wavefront reaches the parabolic reflecting surface and is phase shifted 180°, reflected off of the surface at an angle that has each portion of the reflected wave traveling in parallel paths forming a narrow beam. The parabolic shape of the reflector combined with the radiating element being located at focal point F, causes all portions of the radiating wave have the same path length from the radiating element to the reflector and from the reflector to a plane perpendicular to the direction of radiation. All portions of the reflected wave are now in phase and radiating in near parallel paths and forms a narrow radiating beam.

The gain of a parabolic antenna is the ratio of the radiation intensity in a particular direction to the radiation intensity averaged over all directions. Assuming a uniform antenna pattern, the gain of a parabolic antenna is equal to the area of the isotropic sphere ($4\pi r^2$) divided by the area of the beam as measured by the 3 dB point. Different beam widths can be formed by moving the radiating element away from the antenna focal point. If one assumes a rectangular beam of "a" degrees vertically and by "b" degrees horizontally, the antenna gain is approximately:

$$G = \frac{41250}{ab} \text{ (where } a \text{ and } b \text{ are in degrees)}$$

Looking at a number of beam widths, the approximate gain is as follows:

| Beam Width (a, b) | 1° | 2° | 4° | 8° | 16° |
|---|---|---|---|---|---|
| Gain (Numeric) | 41250 | 10312 | 2578 | 644 | 161 |
| Gain dB | 46 dB | 40 dB | 34 dB | 28 dB | 22 dB |

Looking at this one can see that having a smaller beam width can greatly increase the power density of the radar signal within radar beam width. The beam is moved by moving the antenna up or down or left or right, or by rotating it to target any location. The draw back of a smaller beam width it is that it would take more steps of moving the antenna to cover a specific area such as a 360° horizontal sweep and a 90° vertical sweep. This takes more time as the beam gets smaller and limits the agility of the radar system. It should be noted that if as is typical, the receive signals are received by the same parabolic antenna, the receive gain would nearly equal the transmitting gain.

Phased Array Radar Systems

Prior art phased array radar antennas are composed of an array of radiating elements, generally uniformly spaced in the horizontal and vertical directions. The exception is linear phased array antenna which has elements uniformly spaced horizontally or vertically line forming a line array. Each element of the array is fed an electromagnetic signal that has its phase (and potentially, its amplitude) electronically controlled relative to its neighbors to form and to steer one or more beams of in phase electromagnetic wave fronts. The beam is a virtual beam that is formed by having various radiated waves of each radiating elements either be in phase and add together within the beam or be out of phase and cancel each other out or to be partially in phase and to partially reinforce or partially canceling outside of the beam. With no horizontal or vertical phase delay, a beam is formed broadside to the array, directly perpendicular to the array face. By having a small phase delay between adjacent elements across the array, the beam can be pointed in any direction. Dynamic phase array requires no physical movement to aim the beam as the beam is moved electronically. This can produce antenna motion fast enough to use a small pencil-beam to simultaneously track multiple targets while searching for new targets using just one radar set. The region that can be addressed by a phased array system, either electromagnetic or acoustic systems, is called the field of view and is defined for an antenna's radiating elements as the beam width of the individual radiating elements in the array and for the antenna's receiving elements as the region for which a signal from a target or object of interest can be received by the antenna's receivers. By having multiple radiating elements radiating with a controlled phase delay in adjacent radiating elements, a beam is formed and its beam width is directly dependent on the number of radiating elements in the line array or the area array.

The linear phased array, a one dimension line array with equal spaced radiating elements, is easy to analyze and is the basis for analyzing most two dimension array designs. FIG. 1A shows a prior art schematic of a linear phased array antenna 10 with eight isotropic radiating elements 12 that receive the phased output signals from the eight input/output phase control elements 14 with a broadside wave pattern and with an angled wave pattern. The input feed array 16 splits the input signal coming from the array input line 18 in stages to feed each of the eight input/output phase control elements 14. By changing the phase of excitation to each element, the direction of the reinforced beam radiated by the array can be immediately changed. In FIG. 1A, the phase difference between adjacent radiators is 0° and the resulting eight radiated waves 20 are in phase and wavefront 22 is broad side to the array face forming a beam 24 that is perpendicular to the antenna face.

FIG. 1B depicts the same prior art antenna as FIG. 1A but there is a phase delay between each adjacent radiating element 14. The phase delay between adjacent elements is $\Delta\varphi$ with the left element phase delay at 0°, the next element has a phase delay of $\Delta\varphi$, each element has a delay $\Delta\varphi$ from its left adjacent element and the right most element has a phase delay of 7 $\Delta\varphi$ from the left most element. Each of the eight radiated waves 26 is phase delayed from its adjacent wave by $\Delta\varphi$. This causes the resulting wavefront 28 to be propagated at an angle of $\Theta$ from broad side. The direction of the radiated beam 30 is determined by the element-to-element phase delay of $\Delta\varphi$. A larger $\Delta\varphi$ moves the beam further off of broadside and a phase delay of $-\Delta\varphi$ would move the beam to the opposite side, to the right in FIG. 1B.

The beam width in a phased array antenna is dependent upon the number of radiating elements on the antenna if all radiating elements are used to form one beam or is dependent upon the number of radiating elements used to form the beam if only a portion of the array is used. The more elements used in the array to form the beam, the narrower the beam is and the higher the gain is within the beam width. FIGS. 2A through 2F depict the gain plots of prior art linear antenna arrays, each having differing number of isotropic radiating elements, from 1 radiating element to 40 radiating elements. In these examples, there is no phase delay between the radiating elements causing the beam to be broadside to the array. FIG. 2A depicts the gain plot for a single ideal isotropic radiating element. It has a uniform gain of 0 dB over a range of +/−90° making its field of view +/−90°. FIG. 2B depicts the gain plot for a linear antenna array with three isotropic radiating elements. It has a wide beam width of about +/−30° and has an antenna gain of about 5 dB. FIG. 2C depicts the gain plot for a linear antenna array with six isotropic radiating elements. It has a beam width about +/−10° and an antenna gain of about 8 dB. FIG. 2D depicts the gain plot for a linear antenna array with ten isotropic radiating elements. It has a beam width about +/−5° and an antenna gain of 10 dB. FIG. 2E depicts the gain plot for a linear antenna array with twenty isotropic radiating elements. It has a beam width about +/−3° and an antenna gain of 13 d. FIG. 2F depicts the gain plot for a linear antenna array with forty isotropic radiating elements. It has a beam width about +/−1.5° and an antenna gain of 16 dB. It should be noted that although the beam widths for line arrays of FIGS. 2B through 2F vary from +/−30° for FIG. 2B to +/−1.5° for FIG. 2F, the field of view for all of these is +/−90° and is determined by the field of view of the individual radiating elements as depicted in FIG. 2A. [1]

A two-dimensional array of radiating elements forms beams in two dimensions, horizontal and vertical. An antenna with an array of 1600 radiating elements in a 40 by 40 array would have horizontal beam width of about 3° and a vertical beam width of about 3°. It would have a gain of 32 dB. Although the beam widths of each of these examples gets narrower as the number of elements is increased, the field of view of each of these is constant and equal to that of each isotropic radiating element that make up the array, typically +/−60° to +/−90° both horizontally and vertically.

For a phased array antenna, the gain is simply the sum of the number of elements in the linear or area array, assuming the array is uniformly illuminated and the aperture is lossless. Therefore ignoring losses, a 10-element array would have a gain of 10 or 10 dB, a 100-element array has a gain of 100 or 20 dB and a 1000 element array has a gain of 1000 or 30 dB. To get the full gain of a phased array antenna, all of the elements of the array must be used. If half of the elements are used in one beam, that beam would have a gain of half of the full array gain, or 3 dB less.

Although it is generally ignored in looking a phased array radars and other phased array systems, the bulk of the radiated power from each element in the array and for the antenna as a whole is not in the formed beam of in-phase radiated waves, but in the areas or directions outside of the beam where most of the individual waves emitted from each radiating element are out of phase from each other and have their signals fully or mostly canceled out by wave interference. When the radiated wave from two elements are 180° out of phase at a specific point in the non-remote field or in the remote field of the antenna, they cancel each other out. There is still energy being radiated from each element in those directions but there is no detectable signal. A 10-element linear array would have a 10 dB gain and a 10° beam width, with approximately 8% of the radiated energy within the beam width and 92% outside. In a similar way, a 20-element linear array would have a 13 dB gain and about a 6° beam width, with approximately 5% of the radiated energy within the beam width and 95% outside. Further, a two-dimensional array with 100 elements in a 10×10 array, would have a gain of 20 dB and a beam width of 10° in both the horizontal and vertical planes with less than 1% of the radiated energy within the beam width and 99% outside. In essence, every phased array emits most of its radiated power in non-productive directions, outside of the formed beam and with most of that radiated energy generally canceled out or forming complicating side lobes.

A key aspect of radar systems is that the power density of the radar transmitted signal decreases by the square of the distance, i.e., if the power density of the radiated wave at a range R is P1 watts per unit area, then the power density at a range of 2R is one fourth of P1 watts per unit area. The second key aspect is that the return signal from the object (target) has the same range to power density factor meaning that the power density of a return signal at a range of 2R from the object is one fourth of the power density at R from the object. That means that as the range increases by a factor of 2, the returned signal will be reduced by a factor of $2^4$ or 16 to 1. This is best seen in the basic radar range equations below.

Basic Radar Range Equation: [2]
$P_r$=received power $$P_r = \frac{P_t G_t G_r}{\lambda^2 \sigma}$$

$R_{max}$=maximum antenna range for detection $$R_{max} = \sqrt[4]{\frac{P_t G_t G_r \lambda^2 \sigma}{(4\pi)^3 P_{min}}}$$

$P_t$=peak power [W]
$G_t$=gain of transmit antenna (unitless)
$G_r$=gain of receive antenna (unitless)
$\lambda$=carrier wavelength[m]
$\sigma$=mean Radar Cross-Section (RCS) of target [m$^2$]
R=range from radar to target [m]

The maximum range ($R_{max}$) of a phased array antenna system is the maximum distance where a return signal from an object can be detected utilizing the full power of the antenna on transmission and all of the receiving elements on detecting the return signal, i.e., using all elements of the array. This means that to double $R_{max}$, while keeping the receive sensitivity constant, the beam power must be increased by a factor of 16 by increasing the radiated power per element and/or increasing the number of radiating elements. Alternatively, the number of radiating elements and the number of receiving elements in the array can both be increased by a factor of 4. These options for increasing the $R_{max}$ of an antenna by a factor of 2 are not only prohibitively costly but may be physically impossible. Another way to increase power in the beam to increase $R_{max}$ would be to have radiating elements in the array that are non-isotropic such as elements that have a narrowed field of view due to the use of lenses, horns, parabolics or other means. These can increase power density in the beam by factors of 10×, 100× or more and increase $R_{max}$ but at the cost of limiting the horizontal and/or vertical field of view of the antenna. To be useful, an antenna with fixed antenna beamforming would have to be moveable to be able to aim the beam from one region of interest to another which defeats the key advantage of a phased array antenna, instantaneous movement of the beam to any point in the targeted region.

To fully understand the limitations of current prior art phased array antenna systems, a number of example systems will be examined and these will be followed up with examples of these same systems after embodiments of this invention are applied to the systems.

One key application area for phased array radar systems is a ship board search and track phased array radar systems. A complete ship board radar system would typically have four phased array antennas, one for each of four directions based on the orientation of the ship (fore, aft, starboard and port). For each of the four antennas, the non-remote field regions do not need the full array of radiating elements to detect a target object such as a plane or surface ship or a missile fired from either. In general, surface ship radar systems only need to detect targets up to 15 km in altitude and only a small portion of the array elements are need for the non-remote field. It should be noted that in certain ballistic missile defense situations, a shipboard phased array radar system could be required to search and tract targets above 15 km. Ship board phased array radar systems can simultaneously form multiple beams from one array, by independently controlling multiple portions of the array to send radar beams into different directions at the same time to tract multiple targets in the non-remote field and/or to search and track at the same time. The peak radiated power of an antenna requires all radiating elements are used to transmit a radar wave and all receiving elements are used to detect a returned radar signal. Peak power is only needed for remote field target objects with minimum radar cross-sections that are near, at or beyond the radar system's $R_{max}$. Example A is a typical prior art phased array radar antenna system.

Example A: Typical Prior Art Phased Array Radar Antenna 1000 radiating elements
30 dB radiating antenna gain
1000 receiving elements
30 dB receiving antenna gain
$R_{max1}$=150 km
$P_{min1}$=Power Density at $R_{max1}$
Max Altitude: 15 km
Max Elevation Angle ($\Theta_1$): 100° (10° past vertical)
Min Elevation Angle ($\Theta_2$): 0°
Max Azimuth Angle: 60°
Min Azimuth Angle: −60°

FIGS. 3A and 3B depict antenna gain plots for the prior art 1000 isotropic element, phased array radar antenna from Example A. FIG. 3A depicts the horizontal gain plot 30 for the antenna. The horizontal 3 dB nodes are about at +/−60° with maximum gain of 30 dB. FIG. 3B depicts the vertical gain plot 32 for the antenna. The 3 dB node is about at 100° (10° past vertical) with the same maximum gain of 30 dB. FIG. 4 depicts the range chart for the 1000 isotropic element phased array antenna of Example A. It has a maximum detection range ($R_{max1}$) of 150 km. The maximum altitude that needs to be targeted is 15 km. The maximum angle of elevation at $R_{max1}$ for the targeted maximum altitude of 15 km is 6°. Shaded area 36 denotes a vertical section of the full range of the antenna where it can fully detect a target based on its full gain. It should be noted that it covers altitudes of up to 150 km at angles near vertical, even though in this application it is assumed that there are no targets of interest above 15 km. The 1000 isotropic radiating elements with an antenna gain of 30 dB are used to detect and track objects within 150 km with an elevation of 0° to 100° (10° past vertical) and an azimuth of +60° to −60° from antenna broadside. The total antenna gain including transmission and reception would thus be 60 dB.

Another example of a prior art phased array system is for an automotive driver assist radar system. Radar is used in a motor vehicles as part of its advanced drive assist system (ADAS) providing a variety of driver aids including collision avoidance, blind spot detection, lane change assist, pedestrian warning and parking assist. The main collision avoidance system needs to scan both non-remote fields with a wide field of view and a remote field with a narrower field of view. The latest prior art collision avoidance radar systems have phased array systems with separate antenna radiating element arrays for the non-remote field and the remote field and another set of elements for signal reception.

[3]

Example B is a prior art automotive radar system that is part of a driver assist system. FIG. 5 depicts a schematic of the Continental Engineering Services ARS 408-21 radar sensor that is an automotive phased array radar with a non-remote field radiating antenna and a remote field radiating antenna and one receiving array. [4] The microphotograph in the upper right portion of FIG. 5 shows the antenna system face. The antenna has a non-remote field array of transmitting elements seen on the left side of the antenna microphotograph in FIG. 5 with a 1×12 array of isotropic radiating elements that operate at 24 GHz and have a gain of about 11 dB. Each radiating element has a field of view of about +/−60° in azimuth and elevation from the antenna broadside. The 1×12 non-remote field array has no horizontal beam forming, having a horizontal beam width of +/−60°, the same as each individual radiating element in the 1×12 array. It has vertical beam forming, having a vertical beam width of 9° targeting an elevation of 0° to 9°. There is no vertical phase control of the elements in this system, so the array beam would be broad side and would have a field of view equal to the beam width covering an elevation of 0° to 9°. The antenna has a remote field array of transmitting elements, seen in the center of the antenna microphotograph in FIG. 5 with a 5×12 array of isotropic radiating elements operating at 77 GHz and having a gain of about 18 dB. It has horizontal beam forming, having a horizontal beam width of +/−9° and a vertical beam width of 0° to 9°. There is no vertical or horizontal phase control of the elements, so the beam would be broad side and would have a field of view equal to the beam widths, 0° to 9° vertically and +/−9° horizontally. The antenna has an array of receiving elements, seen in the right side of the antenna microphotograph in FIG. 5. The receiver array has a 4×12 array of isotropic receiving elements with a receiver gain of about 17. The array forms receiving beam with a width of 9° vertically and 20° horizontally. The four columns of the 4×12 receiver array each have horizontal phase control that can sweep the receiver beam across its horizontal field of view of +/−60° from antenna broadside. As with the transmitting elements, there is no phase control on the array columns so the receive beam does not sweep vertically.

FIG. 6 depicts the range plots for the non-remote field antenna range plot (dark gray) and remote field antenna range plot (light gray) for the two transmit arrays and the one receiving array of FIG. 5. The remote field 5×12 array has a gain of about 18 dB and a beam width of +/−9° at a range of 150 m and +/−4° at a range of 250 m. The non-remote field 1×12 array has a gain of about 11 dB and a beam width of +/−60° and a range of 10 to 70 m (varies by the angle). The right side 4×12 array of omnidirectional receiving elements and is used for both the non-remote field and the remote field. The remote field radiated wave has only 15% of its radiated power within the +/−9° beam width up to 150 m and only 7% of its radiated power within the +/−4° beam width up from 150 to 250 m. Fully 93% of the antenna's radiated power is not in the remote field beam and is therefore is not used in detecting remote field objects. All of the radiating elements of the non-remote field and the remote field transmitting arrays are isotropic and all of the receiving elements of the receiving array are omnidirectional.

Another electromagnetic phased array antenna system is an antenna for the transmission and/or reception of communication signals. One unique phased array communication system is the base station used in cellular phone communication systems. In typical cellular phone base stations, multiple line array phased array antennas are used to transmit electromagnetic communication signals to mobile receivers and to receive electromagnetic communication signals form mobile transmitters. A prior art example of a typical base station tower of is Example C. There are three sets of transmitting line arrays and three sets of receiving line arrays, each set covering 120° of azimuth, covering 360° in total. Each set would have at least one receiving line array and at least one transmitting line array. For Example C we will look at one base station radiating line array. Each line array will have eight receiving or transmitting elements arranged in a vertical line with a spacing fixed by the frequency or frequencies used. As depicted in FIG. 7, line array transmitting antenna 200 has eight isotropic radiating elements 202 located on the face 204 of the antenna. Each element would have a gain of 1 dB and would have a field of view +/−60° in azimuth and +/−60° in elevation. The eight-element line array would have a beam width of at least 120° horizontally and about +/−10° in elevation. Because a base station transmit antenna must always be able to send signals to mobile receivers in any azimuth or elevation within the array field of view, phase control is not used to move or steer the transmitted beam.

The same requirement applies to the receiver line arrays that must be able to receive transmitted signals from any mobile transmitter within the array's field of view. FIGS. 8A and 8B depict the azimuth gain plot 206 and elevation gain plot 208 for the eight transmitting element phased array line antenna of FIG. 7 with a maximum gain of 9 dB. If we assume that the eight transmitting element line array has a vertical beam width of 20°, then only 17% of the radiated energy of the transmitting element line array would be in the transmitted beam and 83% would be in other directions and would not be utilized. In addition, in the antenna remote field, only a narrow portion of the 20° vertical beam width is at an altitude that would have mobile transceivers. In the remote field, only 5% to 10% of the radiated signal is useful, with 90% or more not utilized.

Acoustic Phased Array Antenna Systems

Another key application area for phased array antenna systems is acoustic phased arrays such as sonar and ultrasound. In medical and industrial ultrasound acoustic imaging, a line array or an area array of transducer elements are used to transmit an ultrasonic wave into a target body or object and then to receive back a reflected ultrasonic acoustic wave from objects within the body or object. Sonar acoustic phased array antenna systems come in two main forms. One is a sonar system where acoustic signals are transmitted out by an array of transducers and where the same array of transducers receives the reflected signals. The other sonar system is a passive sonar where no acoustic wave is transmitted and the sonar system simply listens for acoustic signals generated by an object of interest, such as a sonar towed array system listening for surface ships, submarines and torpedoes. As in radar phased array systems, acoustic phased array systems use multiple transmitting elements such as transducers, aligned in a line array or an area array to form a beam of in phase acoustic waves and to receive reflected acoustic signals. Changing the phase between adjacent acoustic elements changes the direction, in azimuth and elevation, of a transmitted beam of reinforcement in the radiated acoustic waves. This creates radiated beams in any desired direction within the field of view of the acoustic antenna. The same phase control is used on each receiving element the do the same beamforming on the received signals, reinforcing the signals from the selected direction and canceling out the signals from other directions.

In sonar phased array antenna applications, the transmitting elements need to be sufficiently isotropic to cover +/−60° to +/−90° in azimuth and +/−45° to +/−90° in elevation. Unlike surface ship radar, sonar systems on submerged platforms, i.e., submarines, must have a field of view that goes above and below 0° elevation. FIG. 9A depicts functional diagram of an active sonar system and FIG. 9B depicts active beamforming, both having a cylindrical transducer array. [5] A focused transmitting element such as an acoustic transducer with a focusing lens would narrow the field of view by a factor of X and increase the power density in the beam by the same factor, X. Most sonar acoustic array systems rely on phase control of each transducer for beamforming such as detailed in U.S. Pat. No. 6,842,401B2, Chiang et al. The use of one large acoustic lens to focus a returning acoustic signal was described in U.S. Pat. No. 4,065,748A, Maguer, et al.

Example D is a prior art sonar phased array with 400 isotropic transducers and a transmitting gain of 26 dB. It has a field of view of +/−60° in azimuth and +/−60° in elevation. In this example, the sonar array has an $R_{max}$ of 150 km when using all 400 elements to form one beam of in phase acoustic waves. The receiving gain of this sonar phased array system would be 26 dB (based upon its 400 receiving elements). The total sonar antenna gain would be the combined antenna transmit and receive gain or 52 dB (26 dB transmit gain and 26 dB receive gain). The prior art transducer array of Example D is acoustic equivalent of the radar antenna array in Example A. As with a radar array with 400 elements, the sonar array with 400 elements arranged in a 20 by 20 array, would have a beam width of 6° in azimuth and elevation. With the field of view for the array at +/−60° in azimuth and elevation, less than 1% of the emitted acoustic power of the array is within the beam and more than 99% is outside of the beam and not useful. It should be noted that acoustic signals can have significant signal loss due to attenuation particularly in water and in high liquid medium such as muscle, fat and other portions of body. For this specification, the attenuation due to acoustic absorption is ignored for simplicity.

Another phased array acoustic system with an array of isotropic elements is a towed array. A towed array is a system of hydrophones towed behind a submarine or surface ship on a long cable that can be kilometers long. Most towed array systems are passive and do not emit any acoustic signal but just receives acoustic signals emanating from distant object such as a submarine, a surface ship or a torpedo or even a whale. Although there are towed arrays that are active such as the Atlas Elektronik ACTAS system, we will focus on passive towed array systems. The array's hydrophones can be used to detect sounds and with beamforming and signal processing, identify a target's direction and range and with signal analysis identify if the target is a ship, a submarine or a whale and even identify the type of ship by its distinctive acoustic signature. Each towed array system has a specific passive frequency range such as 50 Hz to 1600 Hz. Longer towed array systems may have 100's or 1000's of acoustic sensing elements and amplifiers. Most towed array systems use ceramic piezoelectric transducers for sensing.

Essentially, a towed array acoustic system is a linear phased array system. Transducer elements in the towed array are omnidirectional, typically receiving acoustic signals over a vertical range of +90° to −90° and over a horizontal range of +90° to −90°. The towed array system has $R_{max}$ that varies based on the signal strength of the distant target. Example E is a prior art passive towed array system with 1000 omnidirectional transducers used only for sensing. It has an antenna gain of 30 dB. It can detect an emitted acoustic signal of strength X at a range of $R_{max4}$.

Optical Phased Array Systems

An optical phased array (OPA) system involves the controlling of the phase of light waves transmitted from and/or received at a two-dimensional phased array antenna. It is the optical analog of a phased array radar and like a phased array radar, has no moving parts. Two types of OPA systems in use today in automotive systems are Lidar (light detection and ranging) and Ladar (laser detection and ranging). Ladar systems are more versatile than radar systems in part because of the shorter wavelength associated with laser beam transmissions. Phased array optics (PAO) can be arrays of lasers or spatial light modulators (SLM) with addressable phase and amplitude elements. Two-dimensional optical phase arrays were described in U.S. Pat. No. 8,988,754 B2, Sun et al, and in U.S. Pat. No. 9,753,351, Eldada, each having only one lens covering the whole array.

FIGS. 10A through 10C depict three examples of an eight emitting element, optical phased array with three differing wavefronts. The optical phased array of FIG. 10A is timed with no phased delay between elements so the combined waves from each emitting element form a composite wave radiating directly perpendicular (broadside) to the array. The optical phased array of FIG. 10B is timed with phase delays between each element to have the combined waves from each emitting element form a composite wave radiating an angle off center. The optical phased array of FIG. 10C is timed with phase delays between each element such that the combined waves from each emitting element form a composite wave radiating wavefront appearing to emanate from a point source behind the array. [6] As with a radar phased array, by adjusting the phase of the various elements, a wavefront can be sent in a beam in any direction from at least +/−60° to +/−90° horizontally and +/−60° to +/−90° vertically.

FIGS. 11A through 11C depict optical linear phased arrays and their emitted wave patterns. Each optical phased array has a laser feeding an array of emitters. As with phased array radar and acoustic antenna systems, optical phase array antennas can control of the output of each emitter to form a beam of reinforced optical waves in any desired direction. FIG. 11A depicts an optical linear array with four widely spaced emitters and the resulting beam and side lobes. FIG. 11B depicts an optical array with four densely spaced emitters and the resulting beam. FIG. 11C depicts an optical array with eight densely spaced emitters and the resulting beam which with more radiating emitting elements, is narrower than the beam in FIG. 11B. [7] A typical prior art optical phased array system is described in Example F. It is an optical phased array system with 100 isotropic light emitters in an array of 10 rows with 10 elements per row. The antenna gain is 20 dB and has a beam width of 10° in azimuth and elevation. Its $R_{max}$ is 150 km when using all 100 elements. With the 10° beam width, less than 1% of the radiated optical signal is in the beam width and more than 99% in outside of the beam and not providing useful function.

Problem to be Solved

In any phased array antenna system, there is a requirement that a beam formed by individually changing the phase of each radiating element can be electronically steered over the required azimuth sweep and elevation. Most phased array radar antenna contain 100's to 1000's of isotropic radiating elements that over a broad range of horizontal and vertical angles from the antenna broad side have uniform radiating gain plots at least over a horizontal range of +/−60° and over a vertical range of at least 0° to 90° for ship board or ground-based systems and a vertical range of at least +/−60° to for airborne, projectile or space-based systems. Generally, the radiated wave power over this whole space needs to be uniform within 3 dB. For ground based or surface ship antenna systems that need to have a field of view of 360° would require four antenna arrays, each facing 90° off from the next, covering 360° with each overlapping the next adjacent antenna by 30°. Vertically, each antenna face covers a little more than 100° and thus each antenna face providing a 20° overlap with their adjacent antenna faces. In many ground-based or ship-board phased array radar systems, the maximum altitude of interest is the maximum altitude for which a target of interest could achieve. In the case of aircrafts, that would be about 50,000 feet or less than 10 miles or about 15 km. A phased array antenna system with an $R_{max}$ of 150 km or more, would hit maximum altitude at 6° elevation. At all range values of less than 0.84 $R_{max}$, the antenna system has excess gain. It would be beneficial if the excess radar power that is transmitted in the non-remote field directions could be traded off to increase the gain the remote field to increase $R_{max}$.

As noted above, the bulk of the radiated power from each element in the array and for the antenna as a whole is not in the formed beam, but in the areas or directions outside of the beam where the transmitted waves from each of the multiple radiating elements are fully or partially out of phase from each other and have their signals fully or mostly canceled out. When the radiated wave from two elements are 180° out of phase in a specific point in the non-remote field or remote field of the antenna, they cancel each other out. There is still energy being radiated from each element in all directions covered by each element's field of view, typically +/−60° in azimuth and 0° to 90° in elevation. A 10-element linear array would have a 10 dB gain and a 10° beam width, with approximately 8% of the radiated energy within the beam width and 92% outside. In a similar way, a 20-element linear array would have a 13 dB gain and about a 6° beam width, with approximately 5% of the radiated energy within the beam width and 95% outside. Further, in a two-dimensional array with 100 elements in a 10×10 array, would have a gain of 20 dB and a beam width of 10° in both the horizontal and vertical planes with approximately 1% of the radiated energy within the beam width and 99% outside. In essence, every phased array emits most of its radiated power in non-productive directions, outside of the formed beam and with most of that radiated energy generally canceled out or forming complicating side lobes.

It is desirable that the excess radiated power targeting non-remote field regions of phased array antenna systems be utilized to increase radiated power targeting remote field regions to extend the maximum range of the antenna system without increasing the number of radiating elements nor the radiated power per element.

BRIEF DESCRIPTION OF THE INVENTION

The invention provides a phased array antenna system that has the full capability of multiple beam formation, beam direction and elevation agility and transmit and receive capability as a standard phased array antenna system but that can offer an increase of 50% or more in maximum range ($R_{max}$) with the same number of radiating elements and the same radiated output power per element. The invention utilizes some of the excess power used to target non-remote field objects and utilizes it to extend the $R_{max}$ in the remote field of the phased array system. As noted above, the non-remote field is defined as the range the antenna to 0.84 $R_{max}$ and the remote field is defined as the range beyond 0.84 $R_{max}$.

Therefore, according to one embodiment of the invention, a phased array radar antenna comprises a plurality of generally isotropic radiating elements targeting the detection and/or tracking of objects in the non-remote field and a plurality of non-isotropic radiating elements targeting the detection and/or tracking of objects in the remote field.

According to another embodiment of the invention, a phased array radar antenna comprises a plurality of generally omnidirectional sensing elements targeting the detection and/or tracking of objects in the non-remote field and a plurality of non-omnidirectional sensing elements targeting the detection and/or tracking of objects in the remote field.

According to another embodiment of the invention, a phased array acoustic antenna comprises a plurality of generally isotropic radiating elements targeting the detection and/or tracking of objects in the non-remote field and a plurality of non-isotropic radiating elements targeting the detection and/or tracking of objects in the remote field.

According to another embodiment of the invention, a phased array acoustic antenna comprises a plurality of generally omnidirectional sensing elements targeting the detection and/or tracking of objects in the non-remote field and a plurality of non-omnidirectional elements targeting the detection and/or tracking of objects in the remote field.

According to yet another embodiment of the invention, an optical phased array system comprises a plurality of generally omnidirectional sensing elements targeting the detection of objects in the non-remote field and a plurality of non-omnidirectional sensing elements targeting the detection of objects in the remote field.

According to further embodiment of the invention, an optical phased array system comprises a plurality of generally isotropic emitting elements for the transmission of communication signals in the non-remote field and a plurality of non-isotropic emitting elements for the transmission of communication signals in the remote field.

According to another embodiment of the invention, an optical phased array system comprises a plurality of generally omnidirectional sensing elements for the reception of communication signals in the non-remote field and a plurality of non-omnidirectional sensing elements for the reception of communication signals from the remote field.

According to one additional embodiment of the invention, a phased array microwave antenna comprises a plurality of generally isotropic radiating elements for the transmission of communication signals in the non-remote field and a plurality of non-isotropic radiating elements for the transmission of communication signals in the remote field.

According to one further additional embodiment of the invention, a phased array microwave antenna comprises a plurality of generally omnidirectional receiving elements for the reception of communication signals from the non-remote field and a plurality of non-isotropic receiving elements for the reception of communication signals from the remote field.

According to another embodiment of the invention, a phased array antenna comprises a first plurality of generally isotropic radiating elements used to form radiating beams in the non-remote field and a second plurality of generally isotropic radiating elements each radiating through focusing lenses for forming non-isotropic radiating waves.

According to another further embodiment of the invention, a phased array antenna comprises a first plurality of generally isotropic radiating elements used to form radiating beams in the non-remote field and a second plurality of generally isotropic radiating elements each radiating through horn structures to redirect the isotropic radiated waves into non-isotropic radiating waves.

According to a yet further embodiment of this invention, a phased array antenna comprises a first plurality of radiating elements having a radiating pattern with a first field of view in the horizontal plane and a second field of view in the vertical plane and a second plurality of radiating elements having a radiating pattern with a third field of view in the horizontal plane and a fourth field of view in the vertical plane and wherein the third field of view is more than 2:1 narrower than the first field of view and/or the fourth field of view is more than 2:1 narrower than the second field of view.

According to another embodiment of this invention, a phased array antenna comprises a plurality of radiating elements having a generally isotropic radiating pattern and having focusing elements in the wave path of each isotropic radiating element that focus the radiated waves in the vertical plane to form a beam width with a narrower field of view and an increased power density within the beam width.

According to yet another embodiment of this invention, a phased array antenna comprises a plurality of receiving elements having a generally omnidirectional field of view and having focusing elements in the wave path of each receiver to focus received waves in the vertical plane and increase the power density of the return signal at the receiving elements.

According to an embodiment of this invention an algorithm for utilizing embodiments of this invention comprises an analysis software tool that identifies whether a remote or non-remote field of view is to be addresses in performing an operation of the phased array antenna system of any of the embodiments of this invention and directs the system to utilize the correct portion of the elements of the antenna to best address those regions. Specifically, the algorithm would direct non-remote regions to be addresses to those portions of the antenna with isotropic radiating elements and/or omnidirectional receiving elements and would direct remote regions to be addresses to those portions of the antenna with non-isotropic radiating elements and/or non-omnidirectional receiving elements.

According to yet another embodiment of this invention, a phased array antenna comprises a first plurality of generally isotropic radiating elements with a radiating pattern of at least 0° to 90° in elevation and +/−60° in azimuth used to address non-remote regions and a second plurality of non-isotropic radiating elements composed of isotropic radiators and a curvilinear reflective structure that focuses the radiated waves of each isotropic radiator into a non-isotropic radiating pattern used to address remote regions.

According to a further embodiment of this invention, a phased array antenna comprises a first plurality of generally isotropic radiating elements with a radiating pattern of at least 0° to 90° in elevation and +/−60° in azimuth used to address non-remote regions and a second plurality of non-isotropic radiating elements composed of isotropic radiators and a metal lens that focuses the radiated waves of each isotropic radiator into a non-isotropic radiating pattern used to address remote regions.

According to yet a further embodiment of this invention, a phased array antenna comprises a first plurality of generally isotropic radiating elements with a radiating pattern of at least 0° to 90° in elevation and +/−60° in azimuth used to address non-remote regions and a second plurality of non-isotropic radiating elements composed of isotropic radiators and a dielectric flat lens that focuses the radiated waves of each isotropic radiator into a non-isotropic radiating pattern used to address remote regions.

For the purposes of this specification, a generally isotropic radiating element is defined as one that has a radiated wave that has a field of view of at least +/−60° in azimuth and at least 0° to 90° vertically from antenna broadside. Also, a non-isotropic radiating element is defined as one that has a radiated wave that has a field of view at least 50% narrower than the field of view of the generally isotropic radiating elements of the same antenna in the horizontal and/or vertical planes. An omnidirectional receiving element is defined as one that has an angle of reception of signals of at least +/−60° horizontally and at least 0° to 90° vertically from antenna broadside. Also, a non-omnidirectional receiving element is defined as one that has an angle of reception at least 50% narrower than the angle of reception of the generally omnidirectional receiving elements of the same antenna in the horizontal and/or vertical planes.

BRIEF DESCRIPTION OF THE DRAWINGS

The drawings illustrate embodiments presently contemplated for carrying out the invention.

In the drawings:

FIGS. 2A through 2F depict antenna gain plots for prior art line arrays with varying numbers of isotropic radiating elements.

FIGS. 3A and 3B depict the azimuth and elevation antenna gain plots for a prior art array of 1000 isotropic radiating element, phased array radar antenna system.

FIG. 4 depicts the range plot for prior art array of 1000 isotropic radiating element, phased array radar antenna system.

FIGS. 10A through 10C depict a prior art line array of eight isotropic optical radiating elements and three of its radiating wavefronts.

FIGS. 11A through 11C depict radiating elements and resulting beam forms of a prior art optical phased array.

FIGS. 14A and 14B depict the azimuth and elevation antenna gain plots of a 500 non-isotropic radiating element array in an antenna system according to an embodiment of this invention.

FIG. 15 depicts the range chart of a 500 non-isotropic radiating element array in an antenna system according to an embodiment of this invention.

FIGS. 16A and 16B depict the azimuth and elevation antenna gain plots of a 1000 radiating element antenna system that contains a 500 isotropic radiating element array and a 500 non-isotropic radiating element array in one antenna system according to an embodiment of this invention.

FIG. 17 depicts the range chart of a 1000 radiating element antenna system that contains a 500 isotropic radiating element array and a 500 non-isotropic radiating element array in one antenna system according to an embodiment of this invention.

FIGS. 19A through 19C depict a perspective view, a vertical cross-section and a horizontal cross-section of a cylindrical conductive lens mounted over an isotropic radiating element that forms a non-isotropic radiating wave according to an embodiment of this invention.

FIGS. 20A through 20C depict a perspective view, a vertical cross-section and a horizontal cross-section of a cylindrical dielectric lens mounted over an isotropic radiating element that forms a non-isotropic radiating wave according to an embodiment of this invention.

FIGS. 21A through 21C depict a perspective view, a vertical cross-section and a horizontal cross-section of another cylindrical dielectric lens mounted over isotropic radiating elements that forms a non-isotropic radiating wave according to an embodiment of this invention.

FIGS. 24A through 24C depict the front view, horizontal cross-section and vertical cross-section of a segment of a radiating antenna where microwave reflective sidewalls are formed in situ to form an array of H-field horns according to an embodiment of this invention.

FIG. 25 depicts cellular tower line array with cylindrical lenses mounted over each isotropic radiating element forming non-isotropic radiating elements according to an embodiment of this invention.

FIGS. 32A through 32C depict a perspective view, a vertical cross-section and a horizontal cross-section of a cylindrical lens similar to the lens in FIG. 20 except that the lens has reduced curvature and reduced beamforming.

FIGS. 33A through 32C depict a perspective view, a vertical cross-section and a horizontal cross-section of an oval lens similar that does beam forming in both the vertical and horizontal plane.

FIGS. 36A through 36C depict a front view, a horizontal cross-section and a vertical cross-section of portion of a phased array antenna with line arrays of radiators and/or receivers and curvilinear reflective structures that combine to do beam forming in vertical plane and not in the horizontal plane.

FIGS. 40A through 40C depict gain plots in polar coordinates of a seven-element linear array with element pitch at ½ wavelength, 1 wavelength and 1½ wavelength respectively.

DETAILED DESCRIPTION

Embodiments of the invention apply to phased array antenna systems for electromagnetic radiating elements and acoustic radiating elements. To better understand the invention and how embodiments could be applied to a typical phased array antenna system, we will look at modifying the prior art phased array antenna systems of examples detailed above.

The antenna in Example A has 1000 isotropic radiating elements with a gain of 30 dB and an $R_{max1}$ of 150 km. Example G is a phased array radar antenna with a combination of isotropic radiating elements and non-isotropic radiating elements according to an embodiment of this invention. It has the same number of radiating elements as in Example A, 1000 elements, with the same radiated output power per element. It has 500 isotropic radiating elements and 500 non-isotropic radiating elements. The 500 isotropic radiating elements would be dedicated to shorter range target detection and tracking (non-remote field) with a full field of view of 0° to 100° in elevation (from the ground to 10° past vertical) and −60° to +60° in azimuth (same as the isotropic radiating elements in Example A). The 500 non-isotropic radiating elements would be dedicated to long range target detection (remote field) with a reduced field of view of 0° to 6° in elevation (only one twentieth of the vertical field of view as the isotropic radiating elements) while maintaining a field of view of −60° to +60° in azimuth.

Figure 12B:
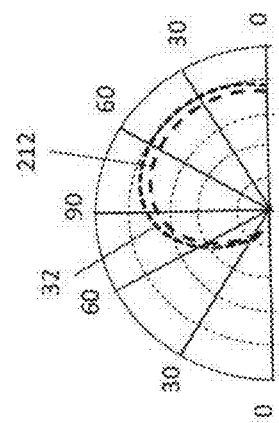
FIGS. 12A and 12B depict the azimuth and elevation antenna gain plots of a 500 isotropic radiating element antenna system according to an embodiment of this invention.
Figure 12A:
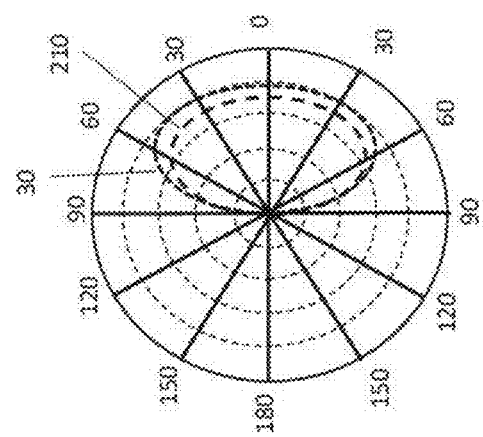

FIGS. 12 and 12B depict the antenna gain plots for the 500 isotropic radiating elements of the non-remote field portion of the phased array of Example G according to an embodiment of this invention. FIG. 12A depicts the horizontal gain plot 210 for the 500 isotropic radiating elements. The horizontal gain plot 30 for the 1000 isotropic radiating elements of Example A is overlaid for comparison. This antenna portion has half as many radiating elements, one half the power level. The maximum antenna gain is 27 dB, 3 dB less than the 1000 isotropic radiating element antenna in Example A. The 3 dB horizontal nodes are about at +/−60° from the antenna broadside. FIG. 12B depicts the vertical gain plot 212 for the 500 isotropic radiating elements of Example G as well as the vertical gain plot 32 for the 1000 isotropic radiating elements of Example A. It has its 3 dB vertical nodes at about at 100° (10° past vertical) and at 0° as in Example A with maximum gain of 27 dB, 3 dB less than in Example A.

Figure 13:
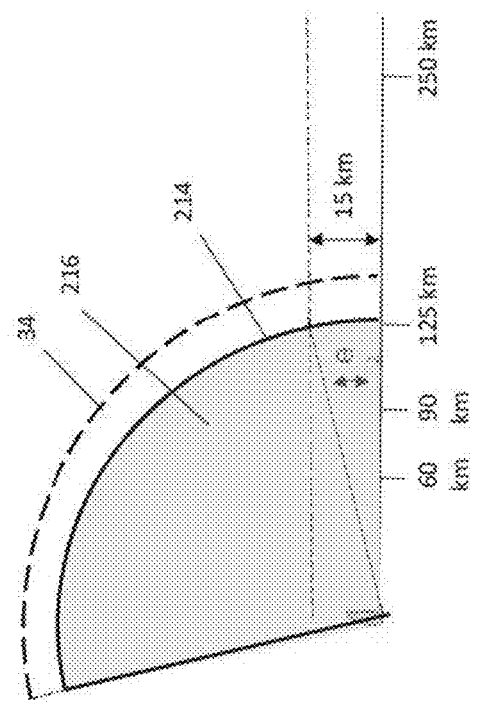
FIG. 13 depicts the range chart for the array of a 500 isotropic radiating element antenna system according to an embodiment of this invention.

FIG. 13 depicts the range chart 214 for the 500 isotropic elements portion of the phased array antenna of Example G which has a maximum detection range ($R_{max2}$) of 126 km (0.84% of $R_{max1}$ of Example A). The range chart 34 for the 1000 isotropic elements of Example A is included for comparison. The targeted maximum altitude is 15 km as in Example A. Shaded area 216 denotes a vertical cross-section of the full range of the 500 isotropic elements portion of the antenna where it can fully detect a target based on the gain of the 500 elements. It covers altitudes of up to 126 km compared to the 150 km altitudes in the baseline array of Example A. For those few radar applications that need higher radar coverage above 15 km, such as searching for ballistic missiles or tracking satellites, the 500 isotropic radiating elements of Example G provides coverage to altitudes up to 126 km. The 500 isotropic radiating elements are used to detect and track objects within a range of 126 km with an elevation of 0° to 100° (10° past vertical) and from +60° to −60° horizontally from antenna broadside. The Example G specifications for the 500 isotropic radiating elements covering the non-remote field are:

Example G: Non-Remote Field Elements 500 radiating elements
27 dB gain
$R_{max}2$=126 km
$P_{min2}$=Power Density at $R_{max2}$
Max Altitude: 15 km
Max Vertical angle ($\Theta_1$): 100°
Min Vertical Angle ($\Theta_2$): 0°
Max Azimuth Angle: 60°
Min Azimuth Angle: −60°

FIGS. 14A and 14B depict the antenna gain plots for the 500 non-isotropic radiating elements of the remote field portion of the antenna in Example G according to an embodiment of this invention. FIG. 14A depicts the horizontal gain plot 220 for the 500 non-isotropic radiating elements. The antenna gain for the 500 non-isotropic elements is 27 dB, 3 dB less than the 1000 isotropic radiating elements of Example A. The non-isotropic radiating elements also has an additional gain of 13 dB (20×) due to the narrow elevation field of view of 6° versus the full elevation of 120° of the baseline of Example A. The net a gain of 500 non-isotropic radiating elements of the antenna in Example G is 40 dB (27 dB antenna gain plus 13 dB gain due to the narrow vertical field of view) with the horizontal 3 dB nodes at about at +/−60°. FIG. 14B depicts the vertical gain plot 222 for the 500 non-isotropic radiating elements. It has its 3 dB vertical node at about at 6° and at 0° with a maximum gain of 40 dB. It has a 6° vertical field of view centered at 3° elevation.

FIG. 15 depicts the range chart 226 for the portion antenna with the 500 non-isotropic radiating elements according to an embodiment of this invention. Striped area 226 denotes a vertical cross-section of the full range of the non-isotropic portion of the antenna where it can fully detect a target based on the gain of the 500 non-isotropic elements. It has a maximum detection range ($R_{max3}$) of 267 km for the elevation range of 0° to 6° with its maximum gain of 40 dB. The maximum elevation at $R_{max3}$ for the targeted altitude of 15 km is 6°. The 500 non-isotropic radiating elements will detect target objects in the remote field from 126 km to 267 km at altitudes of 0 to 15 km, a 78% increase in $R_{max}$ over the base line antenna in Example A.

Example G: Remote Field Elements 500 radiating elements
40 dB gain (27 dB from 500 elements+13 dB from 6° vertical band width)
$R_{max3}$=267 km (78% increase in range over Example A)
$P_{min3}$=Power at $R_{max3}$
Max Altitude: 15 km
Max Vertical angle ($\Theta_1$): 6°
Min Vertical Angle ($\Theta_2$): 0°
Max Azimuth Angle: 60°
Min Azimuth Angle: −60°

FIGS. 16A and 16B depict the combined antenna gain plots for the 1000 element antenna of Example G with 500 isotropic radiating elements for the non-remote field and 500 non-isotropic radiating elements for the remote field according to an embodiment of this invention. FIG. 16A depicts the horizontal gain plot 210 of the 500 isotropic radiating elements portion of the antenna and horizontal gain plot 220 of the 500 non-isotropic radiating elements portions of the antenna in Example G combined onto the same plot. The horizontal gain plot of isotropic elements 210 is shown as a dashed line and the horizontal gain plot of non-isotropic elements 220 is shown as a dash-dot-dash line. The horizontal 3 dB nodes for the isotropic elements are about at +/−60° with maximum gain of 27 dB. The horizontal 3 dB nodes for the non-isotropic elements are about at +/−60° with maximum gain of 40 dB. FIG. 16B depicts the vertical gain plot 212 for the 500 isotropic radiating elements portion of the antenna and vertical gain plot 220 of the 500 non-isotropic radiating elements portions of the antenna in Example G combined onto the same plot. The vertical gain plot 212 of the isotropic elements is shown as a dashed line and the vertical gain plot 222 of non-isotropic elements 48 is shown as a dash-dot-dash line. For the isotropic elements, the 3 dB node is about at 100° (10° past vertical) with the maximum gain of 27 dB. For the non-isotropic elements, the 3 dB notes are at 0° and 6° and with a maximum gain of 40 dB.

FIG. 17 depicts the combined range chart 230 for the Example G antenna. It includes range chart 214 as depicted in FIG. 13 for the 500 isotropic radiating elements portion of the phased array antenna which has a maximum detection range ($R_{max2}$) of 126 km and range chart 226 as depicted in FIG. 15 for the 500 non-isotropic radiating elements portion of the phased array antenna which has a maximum detection range ($R_{max3}$) of 267 km according to an embodiment of this invention. Shaded area 216 denotes a vertical cross-section of the full range of the antenna where it can fully detect a target based on the gain of the 500 isotropic radiating elements. Diagonal lined area 228 denotes a vertical cross-section of the full range of the non-isotropic portion of the antenna where it can fully detect a target based on the gain of the 500 non-isotropic radiating elements. The targeted maximum altitude is targeted at 15 km. The maximum elevation at $R_{max3}$ for the targeted maximum altitude of 15 km is 6°. The 500 isotropic radiating elements will detect targets from 0 km to 126 km at altitudes of 0 to 126 km (well beyond the required 15 km). The 500 non-isotropic radiating elements will detect target objects from 126 km to 267 km at altitudes of 0 to 15 km. The combination of the 500 isotropic and 500 non-isotropic radiating elements covers all targeted areas over a range of 0 to 267 km over an altitude of 0 to a minimum of 15 km and a maximum altitude of 126 km altitude.

In Example G, which has the same 1000 radiating elements and the same level of radiated power as in Example A, with 500 isotropic elements dedicated to the non-remote field and 500 non-isotropic elements dedicated to the remote field, the maximum range ($R_{max}$) is increased from 150 km (of baseline Example A) to 267 km, a 78% increase. The 500 isotropic radiating elements are used to detect and track objects within the non-remote field, out to 126 km with an elevation of 0° to 100° (10° past vertical) and from +60° to −60° horizontally from antenna broadside. The 500 non-isotropic radiating elements are used to detect and track objects in the remote field from 126 km to 267 km with an elevation of 0° to 6° and from +60° to −60° horizontally from antenna broadside. All of the target area covered by the radar antenna of prior art Example A covering out to 150 km distance and up to 15 km altitude are covered by the 1000 mixed isotropic and non-isotropic radiating elements of the radar antenna of Example G according to an embodiment of this invention and the maximum distance of antenna coverage is pushed out to 267 km.

In order to best utilize the extended range provided with various embodiments of this invention, an algorithm for an analysis software tool is proposed as an embodiment of this invention. This algorithm would determine whether a remote or non-remote field of view is to be addressed in performing an operation of the phased array antenna system of embodiments of this invention and would direct the system to utilize either the isotropic or the non-isotropic elements of the antenna to best address those regions. Specifically, the algorithm would direct non-remote regions to be addressed by utilizing all or portions of the antenna with isotropic radiating elements and/or omnidirectional receiving elements and would direct remote regions to be addresses by those portions of the antenna with non-isotropic radiating elements and/or non-omnidirectional receiving elements.

Example H is an automotive phased array radar antenna similar to the automotive phased array antenna of Example B, but with modifications-based embodiments of this invention. The automotive radar of Example B has all isotropic radiating elements and all omnidirectional receiving elements. In Example H, remote field array of transmitting elements in the center 5×12 array of transmitting elements (FIG. 3) are modified to form non-isotropic radiating elements. Specifically, each of these remote field radiating elements would have horizontal beam forming to narrow radiated beam in the horizontal plane from the original +/−60° of Example B to +/−9°, the only field of view required in the remote field of this automotive application. This would increase the radiated power density in the remote field by a factor 6.7× and increase gain by more than 8 dB while covering the same field as the automotive radar of Example B. The increased gain pushes the maximum range of the antenna from the baseline 250 m to 400 m.

Figure 1B:
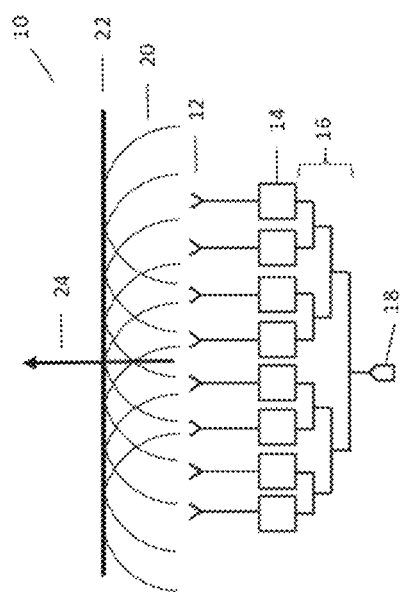
FIGS. 1A and 1B depict schematics of a prior art linear array of eight radiating elements with and without phase delays and its wavefront patterns.
Figure 1A:
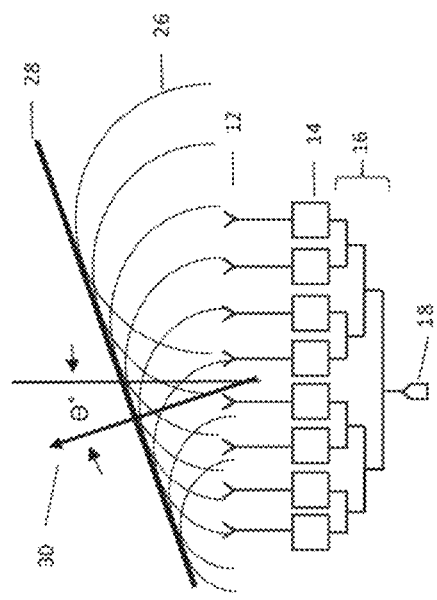
Figure 5:
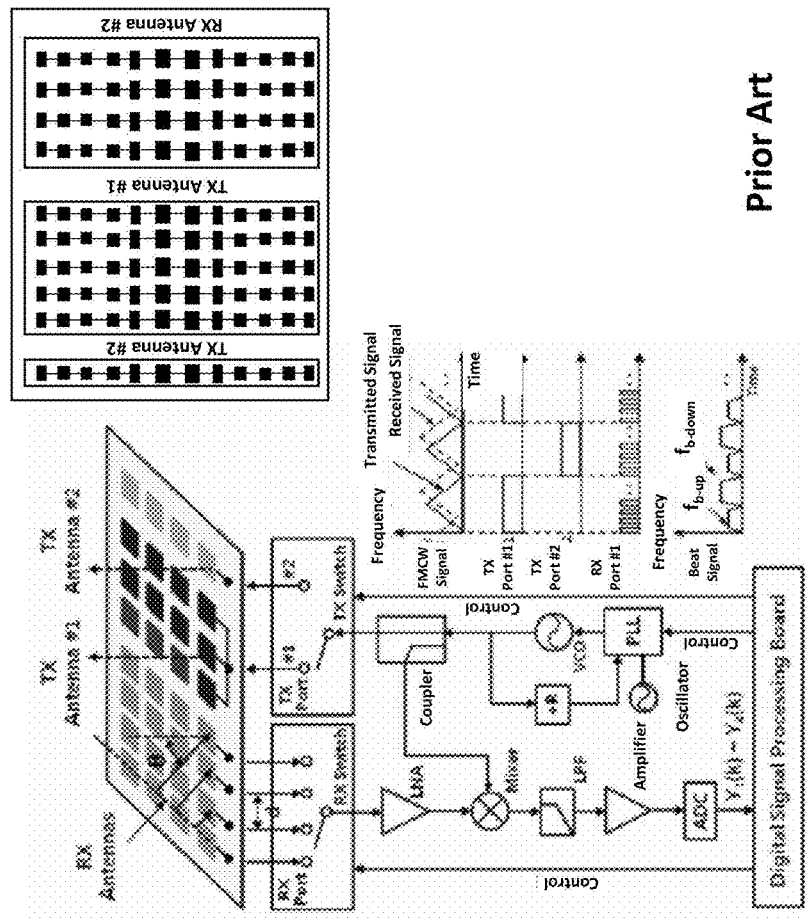
FIG. 5 depicts a schematic of a prior art automotive driver assist radar system.
Figure 6:
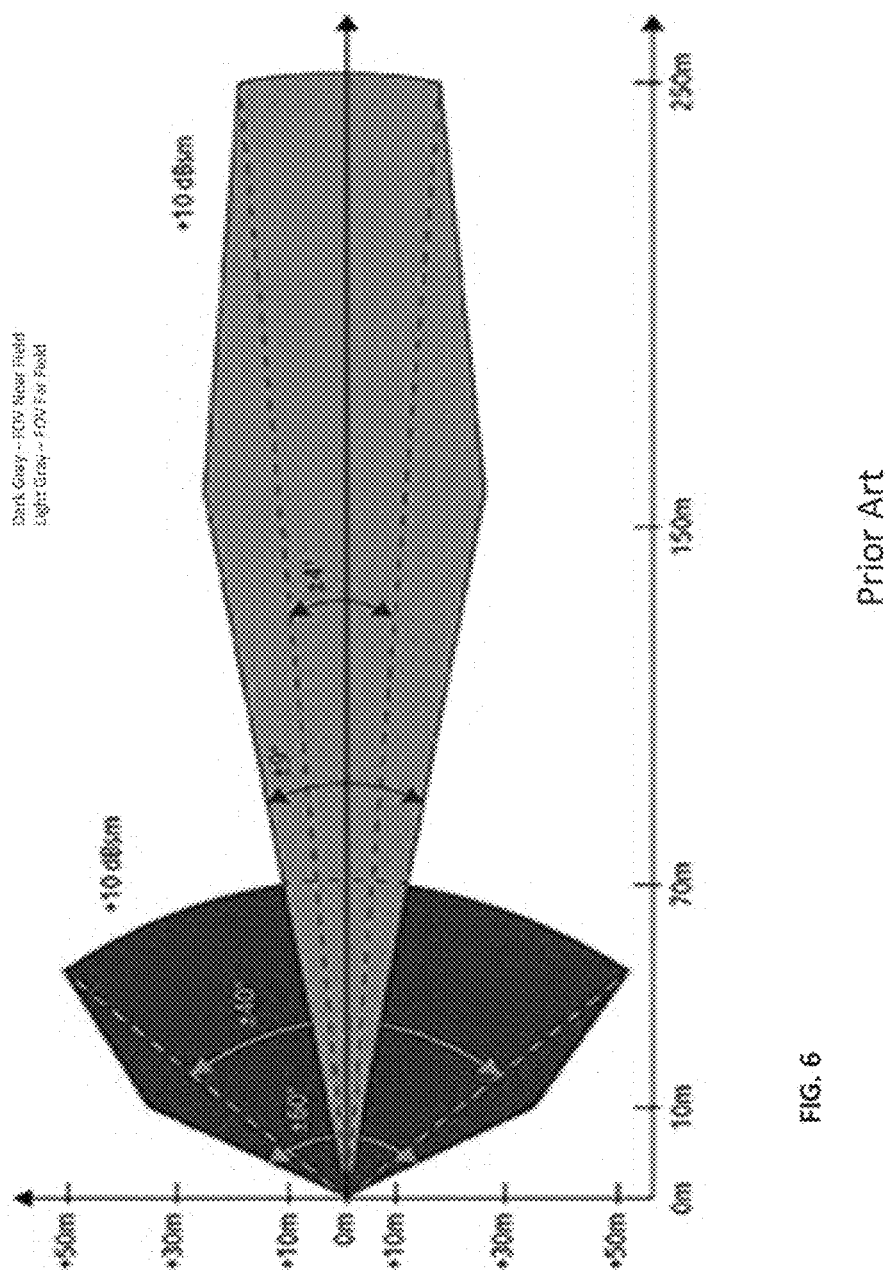
FIG. 6 depicts the non-remote field and remote field range plots of the automotive driver assist radar system of FIG. 5.
Figure 8B:
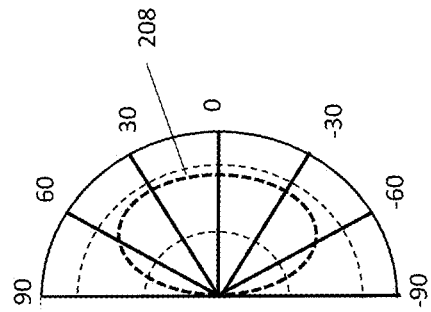
FIGS. 8A and 8B depict the azimuth and elevation antenna gain plots of the prior art cellular tower linear array of FIG. 7.
Figure 8A:
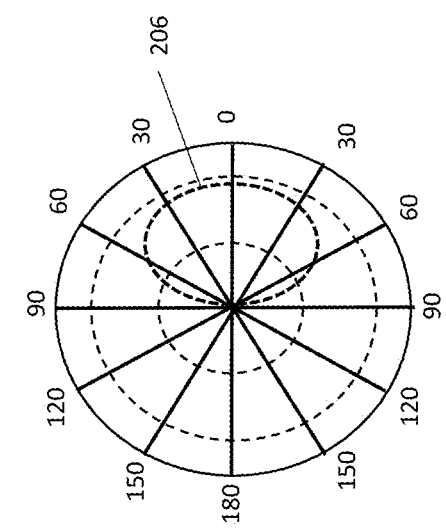
Figure 7:
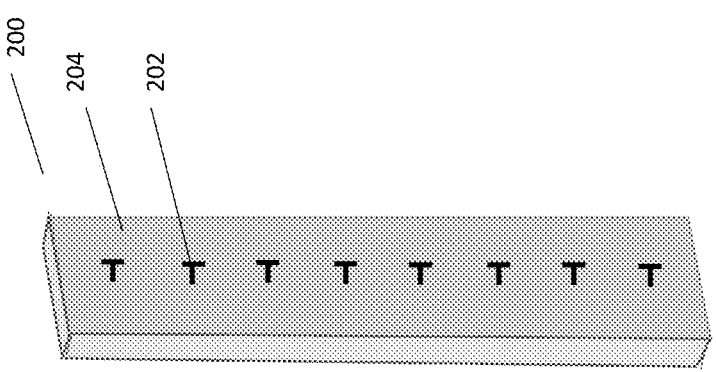
FIG. 7 depicts a prior art cellular tower linear array.
Figure 9B:
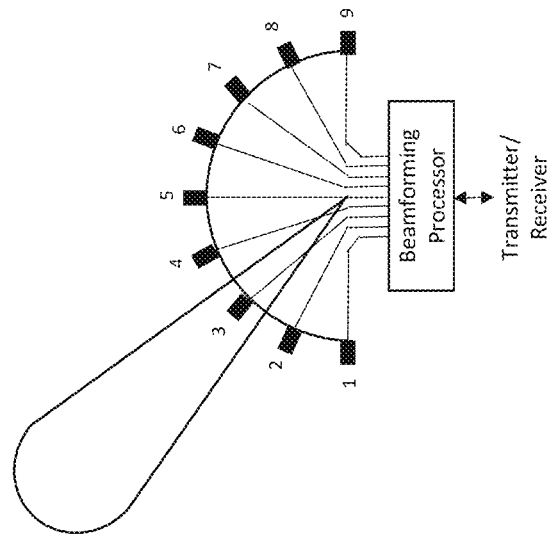
FIGS. 9A and 9B depict a schematic of a prior art sonar array system and its radiated beam.
Figure 9A:
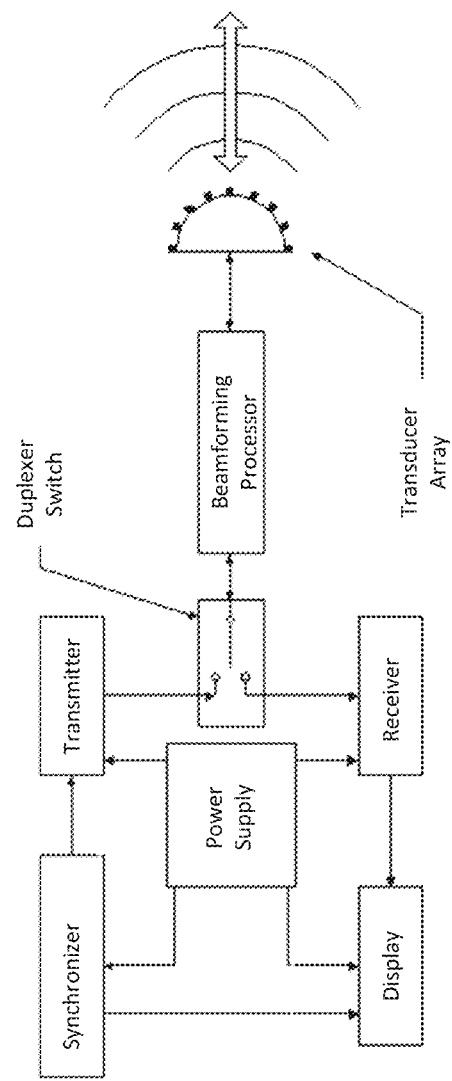
Figure 18B:
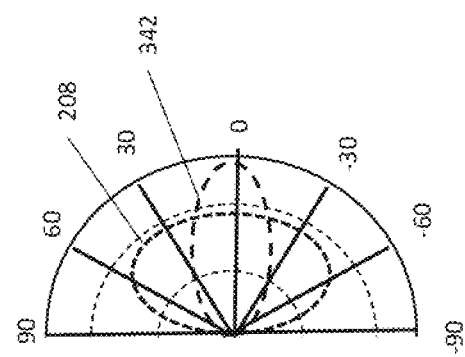
FIGS. 18A and 18B depict the azimuth and elevation antenna gain plots for a cellular tower line array with all non-isotropic radiating elements according to an embodiment of this invention.
Figure 18A:
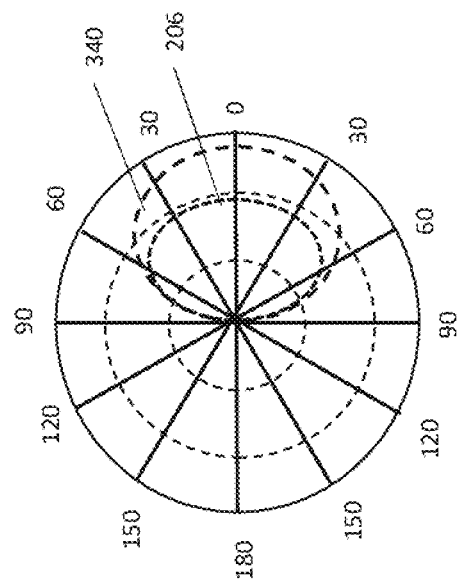

In another embodiment of this invention, detailed in Example I, the antenna elements of transmitting line arrays and the receiving line arrays of a cellular tower array would have focusing structures in the radiating paths of each transmitting element and each receiving element. Example I is the same cellular tower line array phased array antenna system as in Example C except the transmitting element are non-isotropic and are focused in the vertical plane to have the radiated wave of each radiating element restricted to a narrow vertical field of view and while maintaining the same wide horizontal field of view. The transmitting line array antenna has eight radiating elements located on the face of the antenna (the same as the prior art antenna of FIG. 7). With the narrow transmitted beam width in the vertical plane is 20°, there would be a 6× increase in power density within the beam verses that in Example C, or an additional 8 dB gain within the beam width. FIGS. 18A and 18B depict the azimuth gain plot 340 and elevation gain plot 342 for the Example I antenna and that is an embodiment of this invention. The azimuth gain plot 206 from FIG. 8A and elevation gain plot 208 from FIG. 8B for the baseline antenna of Example C are included for comparison. The eight transmitting element phased array line antenna of Example I has an antenna gain of 9 dB and a focusing gain of 8 dB for a total gain of 17 dB. The maximum range to get a valid signal from the antenna to a mobile receiver would be extended by a factor of 2.4×. This extended range is accomplished with the same number of radiating elements and with the same output power per element as the baseline of Example C.

In a similar way, the receiving line array of a cellular tower would have similar focusing structures as the transmitting line arrays to extend the receiving maximum range by a similar factor of 2.4×. This extension is accomplished using an embodiment of this invention using the same number of receiving elements, each with the same level of signal detention. Using this embodiment of the invention would permit cellular towers to be spaced more than twice the distance as current prior art cellular towers, cutting the number of towers and all of their associated electronics and hardware by a factor of four.

Although only three examples of electromagnetic phased array antenna systems, a shipboard phased array radar system, an automotive radar system and a cellular tower communication antenna system are described above, the embodiments of this invention relative to phased array electromagnetic systems equally applies to other phased array electromagnetic systems such as microwave inspection systems and other types of phased array electromagnetic systems. Ones skilled in the art could apply the principles of this invention to many other electromagnetic phased array systems.

Non-isotropic Radiating Elements:

It is clear from the proceeding sections of this specification that the embodiment of this invention detailed in Example G of a phased array radar antenna with a plurality of isotropic radiating elements and a plurality of non-isotropic radiating elements provides a 78% increase in maximum range of the radar system versus the prior art base line system of Example A without increasing the number of radiating elements nor increasing the radiated power of the elements has clear performance advantages over the prior art antenna system of Example A. This section of this specification will address how to achieve the proposed narrowed vertical field of view of the 500 non-isotropic radiating elements as well as the 500 non-omnidirectional receiving elements that target remote field objects in this embodiment of the invention.

There are well known radiating elements that have narrower vertical and/or horizontal field of views and have corresponding higher power density within the beam as well as receiving elements that have non-omnidirectional field of views. These include lenses, reflectors and horns mounted over or incorporated onto isotropic radiating elements and omnidirectional receiving elements. We will now examine structures that can be incorporated into a phased array antenna system electromagnetic transmitting pathway to create non-isotropic radiating elements and non-omnidirectional receiving elements that are embodiments of this invention.

One key requirement in constructing the array of non-isotropic radiating elements of embodiments of this invention, is the tightly packing of the radiating elements in many arrays. In typical radar phased arrays, radiating elements are spaced from 0.5 to 1.0 wavelength. One structure that can be applied to each radiating element in an array of radiating elements to focus each radiating element into a non-isotropic radiating element is a lens. Prior art phased array antenna, including U.S. Pat. No. 3,755,815, Stangel et al and U.S. Pat. No. 4,381,509A, Rotman et al, utilized one lens to focus the radiated waves of an array of radiating elements in the horizontal and vertical plane narrowing the field of view and increasing gain in the field of view. These lenses focus the radiating beam in both the horizontal and vertical planes, taking a generally isotropic radiating element with a field of view of at least +/−60° and forming focused beam with a field of view of for example +/−10° to +/−20° in both azimuth and elevation. But these antenna systems cannot be used to address a full +/−60° or +/−90° field of view required in most phased array antenna systems and demonstrated in the prior art phased array radar system in Example A.

A cylindrical lens with curvature in just the vertical plane or in just the horizontal plane can be used to form a radiated wave with focusing in just the vertical plane or in just the horizontal plane. There are two types of lenses that have been used to provide plane-wavefront, narrow beams: conducting type lenses and dielectric type lenses. A conducting type lens has flat metal strips placed in the lens dielectric material in parallel to the electric field of the wave and spaced at slightly larger than one-half wavelength within a dielectric material. A dielectric lens is composed of a high dielectric constant organic or inorganic material. In both of these lens types, the dielectric material is effectively transparent to the electromagnetic waves but the difference in the lens dielectric constant or the index of refraction verses air causes the wave to either converge or diverge based upon the shape of the lens.

A cylindrical version of a conductive lens that can be used to form non-isotropic radiating elements from an array of isotropic radiating elements are depicted in FIGS. 19A through 19C according to an embodiment of this invention. FIG. 19A depicts a perspective view of a cylindrical version of conducting type lens 300. Metal strips 302 within the lens 300, are horizontal and act as wave guides that force the radiated waves to propagate horizontally, parallel to the metal strips 302. Lens face 304 is concave in the vertical direction and parallel in the horizontal direction. The opposite face 306, facing away from the radiating element, is flat in the vertical direction and in the horizontal direction. This type lens would only beam form in the vertical plane and not in the horizontal plane. FIG. 19B depicts the vertical cross-section of conductive lens 300 containing metal strips 302. Concave lens face 304 faces isotropic radiating element 308. Isotropic radiating element 308 has a spherical radiating wave front 310. The velocity of the phase propagation of the wave is greater in the conductive lens than in air so that the radiated wave front 312 within lens 300 and the radiated wave 316 exiting the lens rear face 306 is linear in the vertical plane. Cylindrical lens 300 is concave on the face 304 toward radiating element 308 in the vertical plane so the outer portions of the transmitted spherical waves are accelerated for a longer distance and therefore for a longer interval of time then the inner portion. The radiated wave enters the lens concave surface as a spherical wave and exits the flat rear face 306 of the lens as flat-fronted parallel wave in the vertical plane with a narrow vertical beam width. FIG. 19C depicts the horizontal cross-section of conductive lens 300. Isotropic radiating element 308 has a spherical radiating wave front 310. In the horizontal plane the metal strips do not affect the wave direction and in the horizontal plane, the wave emerges from the lens rear face 306 in the same radiating directions and with a circular wavefront 316. It should be noted that the conducting lens is frequency sensitive and therefore not applicable to a dual frequency antenna.

FIGS. 20A through 20C depict a cylindrical version of dielectric type lens according to an embodiment of this invention. FIG. 20A depicts a perspective view of a cylindrical version of dielectric type lens 320. A face of the dielectric lens 324 that faces toward the radiating element is convex in the vertical direction and linear in the horizontal direction. The opposite face 326, facing away from the radiating element, is flat in the vertical direction and in the horizontal direction. The dielectric material in the lens 320 refracts the waves entering it and slows down the phase propagation as the wave passes through it. FIG. 20B depicts a vertical cross-section of dielectric lens 320. It has isotropic radiating element 308 that has a spherical radiating wave front 310. Focusing in the vertical plane occurs as the portions of the radiated spherical wave front 310 hits the lens face 324 at different points, with different angles to face 324 and at different phases than other portions of the wave. This causes the spherical wave to form a linear wave front 332 in the vertical plane within the lens and to exit the lens as flat-fronted parallel wave 334 in the vertical plane. In this example, the inner portions of the wave are slowed for a longer time than the outer portions. FIG. 20C depicts a horizontal cross-section of lens 320. It has isotropic radiating element 308 that has a spherical radiating wave front 310. Although the higher dielectric constant of the lens dielectric material does bend the incident wave and slow the wave propagation, because the input face 324 and the output face 326 are parallel in the horizontal plane, there is no beam focusing in the horizontal plane. The exiting wave front 336 is circular in the horizontal plane.

FIGS. 21A through 21C depict a cylindrical version of another dielectric type lens according to an embodiment of this invention. FIG. 21A depicts a perspective view of a cylindrical version of dielectric type lens 340. The face of the dielectric lens 344 that faces toward the radiating element is flat in the vertical plane and in the horizontal plane. The opposite face 346, facing away from the radiating element, is convex in the vertical plane and linear in the horizontal plane. The dielectric material in the lens 340 slows down the phase propagation as the wave passes through it. FIG. 21B depicts a vertical cross-section of dielectric lens 340. It has isotropic radiating element 308 that has a spherical radiating wave front 310. Focusing occurs as the portions of the radiated spherical wave front 108 hits the lens face 342 at different points, at different angles to lens face 342 and at different phases than another portion of the wave. The lens face 344 causes the spherical wave to form a modified spherical wave front 356 in the vertical plane within the lens. Additional focusing occurs when the wave front exits the outer face 346 of lens 340. The net effect of cylindrical lens 340 is that the radiated wave exits lens face 346 as flat-fronted parallel wave 354 in the vertical plane. In this example, the inner portions of the wave are slowed for a longer time than the outer portions. FIG. 21C depicts a horizontal cross-section of lens 340. It has isotropic radiating element 308 that has a spherical radiating wave front 310. Although the higher dielectric constant of the lens dielectric material does bend the incident wave and slow the wave propagation, because the input face 344 and the output face 346 are parallel in the horizontal plane, there is no beam focusing in the horizontal plane. The exiting wave front 358 is circular in the horizontal plane.

One preferred embodiment of this invention would utilize lenses to form the non-isotropic radiating array elements of Example G above. The lenses would be horizontal cylindrical lenses, either conducting or dielectric type lens, that focuses only in the vertical plane, and leaving the horizontal plane without any focusing. Depending on the characteristics of the horizontal cylindrical lenses and the position of each of the radiating elements relative to each lens, the degree of beam focusing in the vertical direction can be varied from an incident wave bandwidth of +/−60° to a radiated wave bandwidth of as low as +/−2° to perhaps +/−10° or even as wide as +/−20°. It should be note that the narrower the radiated beam width exiting the lens, the higher the power density of the wave within the beam. The lens used to focus the radiated wave for Example G would have a horizontal radiated wave field of view of +/−60° and a vertical radiated wave field of view of 0° to +6°.

Figures 22A, 22B:
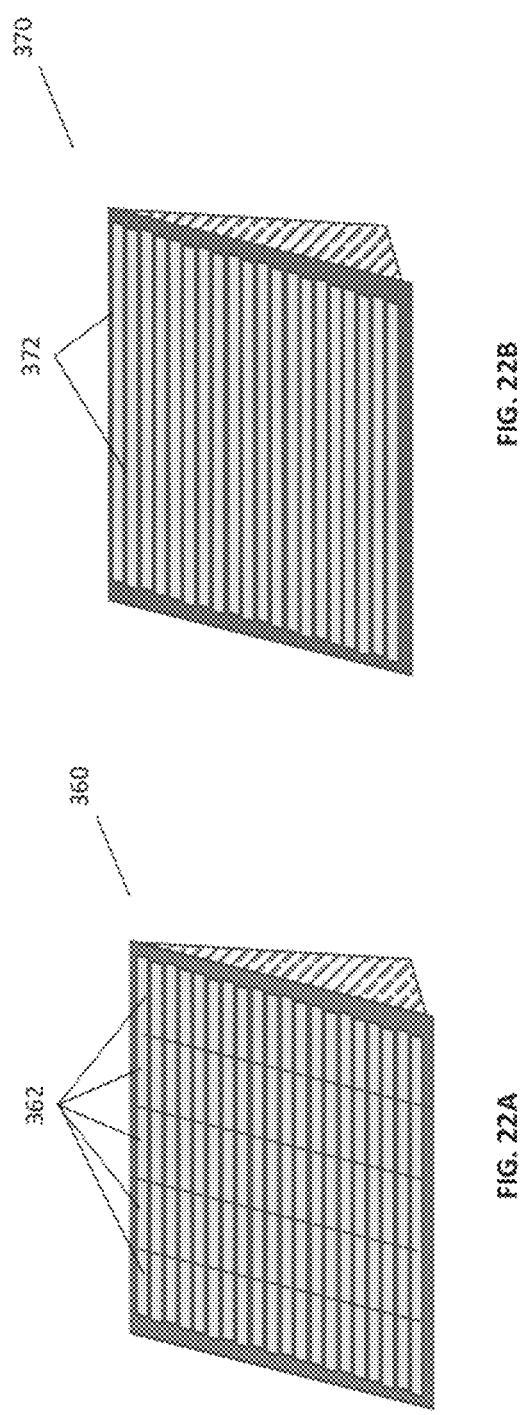
FIGS. 22A and 22B depict two phased array antennas containing cylindrical lenses each covering either a number of isotropic radiating elements in a horizontal row or covering all of the isotropic radiating elements in a horizontal row according to an embodiment of this invention.

There are many different lens sizes, shapes and dielectric material that could be used for the dielectric type cylindrical horizontal lens and many ways to attach the lens to implement the embodiment of this invention contained in Example G or in other embodiments of this invention. The dielectric cylindrical horizontal lenses depicted in FIG. 20A and FIG. 21A could be lenses that are designed to be mounted over each radiating element with each radiating element having its own lens. The phased array of Example G has 500 non-isotropic elements in an array of 20 rows of 25 elements per row. If individual lens were used, it would require 500 lenses to be mounted on the array, one over each element. Alternatively, long rectangular shaped horizontal cylindrical lenses can be mounted in the wave path of multiple radiating elements or in the path on a whole row of radiating elements. If a lens is designed to cover five elements, then the array would require five lenses per row and 100 for the whole array. FIG. 22A depicts the portion of a phased array antenna 360 with 500 radiating elements in an array of 20 rows of 25 elements per row according to an embodiment of this invention of Example G. Note that the 500 isotropic radiating elements of Example G are not depicted in FIGS. 22A and 22B for clarity. There are five horizontal cylindrical lens 362 per row each covering five elements, for a total of 100 lenses. Going a step further, if each lens is designed to cover all 25 elements in a row, then only 20 lenses would be required one per row. FIG. 22B depicts the portion of a phased array antenna 370 with 500 radiating elements in an array of 20 rows of 25 elements per row according to an embodiment of this invention. There is one horizontal cylindrical lens 372 per row, for a total of 20 lenses each covering 25 elements.

Another lens technology that can be used to form the non-isotropic radiating waves is the use of lenses using metamaterials which are composed of man-made composite materials having a negative index of refraction as described in US2005/225492 Metz. Those skilled in the art would recognize that many other cylindrical conductive and dielectric lens structures could also provide the desired beamforming and provide the non-isotropic radiating elements of preferred embodiments of this invention as detailed in Example G or other examples detailed in this specification.

Figure 23B:
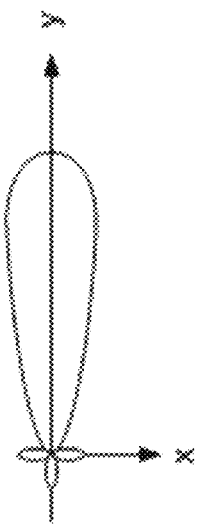
FIGS. 23A through 23D depict prior art microwave E-field and H-field horns that form a narrow beam width horizontally and vertically respectively and the horizontal and vertical gain plots for the prior art H-field horn.
Figure 23A:
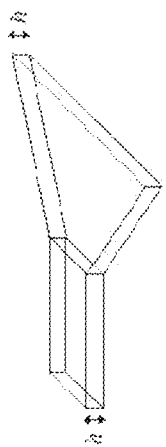
Figure 23D:
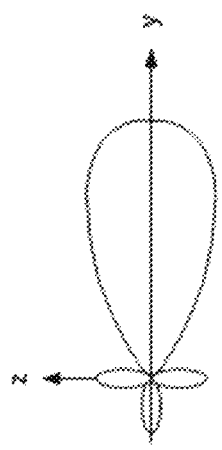
Figure 23C:
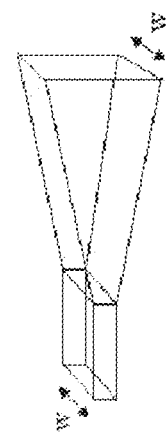

Another structure that can have focusing in the horizontal and/or vertical direction is radiating elements utilizing a horn structure. Horn structures can come in many forms such as square horns that flare equally in height and width or rectangular horns that are flared in only one dimension. FIGS. 23A and 23B depicts prior art rectangular horn structures used to form non-isotropic radiated pattern from an isotropic radiating element. FIG. 23A depicts a typical rectangular horn antenna which flares only in the vertical direction and is an E-plane horn. FIG. 23B depicts a typical rectangular horn antenna which flares only in the horizontal direction and is an H-plane horn. FIGS. 23C and 23D depict the horizontal and vertical gain plots respectively for the H-plane horn in FIG. 23B. FIG. 23C depicts the horizontal gain plot which has minimum amount of horizontal beam forming. FIG. 23D depicts the vertical gain plot which has a significant amount of beam forming. The horizontal direction or H-plane horn could be used to form the non-isotropic radiating elements that address the remote field from Example G above. As one skilled in the art understands, H-plane horn could be design with a sidewall slope and with specific length and internal dimensions based of the wave length(s) of the electromagnetic signal(s) and the degree of horizontal and vertical beamforming desired.

The rectangular horn of FIG. 23B represents a singular radiating element that would typically be used to feed a parabolic reflecting antenna. In an array of 100's or 1000's of radiating elements, the use of individual constructed horns may not be practical or even possible. A more practical approach would be to use MEMS like photo-processing to fabricate arrays of horn structures in situ or to fabricate strips of reflecting structures that form an array of horizontal micro-horns. FIGS. 24A through 24C depict three views of a portion of an antenna array 380 of isotropic radiation elements utilizing in situ fabricated micro-horn structures to form non-isotropic radiating elements according to an embodiment of this invention. FIG. 24A depicts a portion of the radiating front of the antenna array 380 with four radiating elements 382 in each of two rows. FIG. 24B depicts a horizontal cross-section of the antenna cut through the radiating elements 382 in one row. FIG. 24C depicts a vertical cross section of the antenna cut through the radiating elements 382 in one column. As seen in FIG. 24B, the horizontal cross-section has sloped reflecting surfaces 384 forming flared horizontal horn portions. As seen in FIG. 24C, the vertical cross-section has non-flared vertical reflecting surfaces 386. This structure can be formed by applying a thick photo-patternable dielectric of photoresist, forming a cavity to each radiating element with straight sidewalls on the top and bottom sides of the opening and with sloped sidewalls of the left and right sidewalls. The sidewall surfaces could be coated with a metal layer to form the reflective surfaces.

Those skilled in the art would recognize that many other micro-horn structures and fabrication methods could also provide the desired horn structure and provide the non-isotropic radiating elements from isotropic radiating elements according to an embodiment of this invention.

Yet another structure that can have focusing in the horizontal and not the vertical direction is radiating elements utilizing a curvilinear reflective structure.

FIG. 25 depicts an example of a cellular tower linear array antenna with cylindrical lenses mounted over isotropic radiating elements for the line array of Example I. In this example of an embodiment of this invention, the cellular tower linear array depicted in FIG. 7 from prior art baseline Example C is modified to achieve non-isotropic radiating elements. The transmitting line array antenna has eight isotropic radiating elements 202 located on the face 204 of the antenna (the same as the prior art antenna of FIG. 7). One cylindrical lens 402 such as cylindrical lens 320 depicted in FIG. 20A, is mounted over or formed on each array radiating element. Each cylindrical lens 402 has vertical convex curvature facing away from the face 304 to focus the isotropic radiated waves vertically and form narrow non-isotropic radiating elements in the vertical plane. It has no horizontal curvature and thus does not focus horizontally. Each lens forms a focused beam in the vertical plane at least as broad as the vertical beam width in the prior art array in Example C, +/−10°.

Phased Array Receiving Elements

In the example of antenna system of an embodiment of this invention in Example G, the discussion only addressed the effects of utilizing both isotropic radiating elements and non-isotropic radiating elements in a phased array radar antenna. The maximum detection range $R_{max}$ in the prior art phased array radar antenna of Example A was increased by 78% in Example G with the same number of elements and with the same radiating power per element. We will now consider the effects of the antenna of Example G on the receiving elements according to an embodiment of this invention in Example J. The return waves or signals reflected off of a target and received back at the antenna. The reflected signals return on the same elevation and horizontal direction as the original transmitted wave. If the antenna utilizes a lens to focus the radiated wave from each isotropic radiating element to form non-isotropic radiated elements, then the return wave would return on the same path and would be focused back onto the receiving element on the reverse pathway as it was on the transmitted electromagnetic wave. In Example J the focusing effect of the lens system would increase the power level of the return signal received by each receiving element by a factor of 4× to 8× providing 6 dB to 9 dB increase in antenna receiver gain. That would effectively increase the maximum range $R_{max3}$ by a factor of 1.4× to 1.6× over the antenna gain of Example G. Combining the increased antenna receiver gain with increased antenna transmit gain, the $R_{max}$ would increase the antenna maximum range by a factor of 2.5× to 3.0× over the prior art radar system of Example A. The antenna system of the prior art in Example A had an $R_{max}$ of 150 km. The increased antenna transmit gain of 10 dB in Example G, over the baseline of Example A extends $R_{max}$ from 150 km to 267 km. Factoring in the increased antenna receiver gain of 6 dB to 9 dB, $R_{max}$ would be extended from the prior art base line of 150 km to 375 km to 450 km. This is an increase in $R_{max}$ of more than double the original $R_{max}$ of 150 km of the baseline antenna of Example A, while having the same number of antenna elements, 1000, and having the same radiated power per radiating element and the same receiver element capability.

Acoustic Phased Array Antenna Systems

The concept described above relative to electromagnetic phased array radar antenna to increase its $R_{max}$, can be applied to an active or passive sonar system to increases the sonar maximum range, $R_{max}$. An example of an embodiment of this invention is the phased array sonar system of Example K. The sonar phased array system in Example K has the same number, type of transducers and the same output power per element as the sonar system phased array in Example D but it has 200 isotropic transducer elements covering non-remote field targets and 200 non-isotropic transducer elements covering remote field targets. The 200 isotropic radiating elements have a transmitting gain of 23 dB, 3 dB less than the 400-element system of Example D. The isotropic elements have a field of view of +/−90° in azimuth and +/−90° in elevation. The receiving gain of this portion of the sonar phased array system would be 23 dB (based upon its 200 isotropic receiving elements). The total sonar antenna gain would be the combined antenna transmit and receive gain or 46 dB (23 dB transmit gain and 23 dB receive gain) with $R_{max}$ of 106 km, a 29% reduction from the baseline of Example D. Beams formed from these 200 isotropic elements are used for detecting targets in the non-remote field, from the sonar antenna to 106 km.

The 200 non-isotropic transducer elements have vertical focusing that narrows the resulting beam to an elevation field of view +/−4.5° while keeping the azimuth field of view to +/−90° targeting the remote field. The 200 non-isotropic transducer elements have an antenna transmit gain of 23 dB (based on its reduced number of emitting elements). The focusing of the transmitted beam from the non-isotropic transducer elements vertically from the initial field of view of +/−90° to +/−4.5°, increases the power density by a factor of 20 within the beam for a 13 dB increase in gain. This would provide a net transmission gain of 36 dB (23 dB antenna plus 13 dB focusing). It also lowers the side lobes outside of the field of view. The focusing of the returned acoustic signal by the non-isotropic transducer elements in elevation from the initial field of view of +/−90° to +/−4.5° of the focused field of view, increases the power density of the return signal by a factor of 20 for acoustic waves within the beam path for a 13 dB increase in antenna receiver gain. This would provide a net receiver gain of 36 dB (23 dB antenna and +13 dB focusing). The total sonar antenna gain would be the combined antenna transmit and receive gain or 72 dB (36 dB transmit gain and 36 dB receive gain) a 20 dB increase over the baseline sonar of Example D. This increases $R_{max}$ from the 15 km of Example D to 47 km of Example K, an increase in $R_{max}$ of 213%.

The non-isotropic acoustic elements for a sonar system can be achieved by attaching a lens over each transducer element to focus the transmitting beam into a wavefront with a 9° vertical field of view and the full 180° horizontal field of view. For smaller acoustic systems such as a medical or industrial ultrasound system, an array of micro-lens formed in situ would be a better option.

Example L is a passive towed array system according to an embodiment of this invention which has 1000 transducer elements, 500 omnidirectional transducers and 500 non-omnidirectional transducers. The 500 omnidirectional transducers are identical to the omnidirectional transducers of Example E with the same sensing threshold. The 500 omnidirectional transducers have a gain of 27 dB, 3 dB less than the 1000 transducers in Example E. They are used to sense targets in the non-remote field from 0.84 $R_{max4}$ and closer in. The 500 non-omnidirectional transducers have an antenna gain of 27 dB. The 500 non-omnidirectional transducers have focusing structures on each receiving element focus acoustic signals and reduce the sensing field of view to +/−4.5° vertically and while maintaining the same +/−90° horizontal field of view as in the prior art system of Example E. This increases sensing gain from signals from within the narrower envelope by 20 to 1, or 13 dB per sensing element. The total gain of the 500 non-omnidirectional sensors is 40 dB (27 dB antenna gain plus 13 dB focusing gain). This increases the maximum sensing range for the non-omnidirectional elements in its field of view by a factor of 3.16× more than tripling $R_{max4}$ of the system. It should be noted that the range equation for a passive acoustic system such as a passive towed array goes by the second power not the fourth power as with active sonar where pulses must travel from the transducers to the target and back whereas passive sonar signals only travel from the target to the transducers.

Although only two examples of acoustic phased array systems are described above, the embodiments of this invention relative to the example acoustic systems detailed here equally applies to other acoustic systems such as ultrasound, geological acoustic systems and other types of phased array acoustic systems. One skilled in the art could apply the principles of this invention to many other acoustic phased array active and passive systems.

Optical Phased Array Systems

Another embodiment of this invention is an optical phased array system with both isotropic and non-isotropic radiating elements and/or with omnidirectional and non-directional optical imaging elements. The same concept described above relative to a phased array radar antenna and a phased array sonar system can be applied to the optical phased array system. Example M is an optical phased array system of an embodiment of this invention that is similar to the prior art optical phased array system of Example F. Example M is an optical phased array system with 100 light emitters in an array of 10 rows with 10 elements per row. The antenna gain is 20 dB and its $R_{max}$ is 150 km when using all 100 elements. It has 50 isotropic elements covering non-remote field regions and 50 non-isotropic elements with a horizontal focusing covering remote field regions. The focusing narrows the resulting field of view from each non-isotropic element to elevation 0° to 6° while keeping the azimuth field of view to +/−60°. The reduction in the number of isotropic transmission elements from 100 to 50 used for the non-remote field, reduces the antenna gain for the isotropic portion of the antenna by 3 dB to 17 dB. The reduction in the number of transmission elements from 100 to 50 used in the non-isotropic elements for the remote field, reduces the antenna gain for the non-isotropic portion of the antenna by 3 dB to 17 dB. The beam focusing increases the optical power density by a factor of 20 within the beam, a 13 dB increase, and lowers the side lobes outside of the field of view. The net antenna gain increase for the 50 non-isotropic emitting elements would be would be 10 dB (−3 dB lower radiating elements and +13 dB increased beam power density increase) and would increase $R_{max}$ from the 150 km of the baseline to 267 km, an increase of 78%. This same focusing system would improve the performance of the receiving element by focusing the return signals proportionally. The reduction of receiving elements from 100 to 50 used in the non-isotropic elements for the remote field, reduces the antenna receive gain by 3 dB. The focusing of the received signal increases the optical receive signal sensitivity by a factor of 20, 13 dB increase. The net antenna receiving gain would be 10 dB (−3 dB due to fewer sensing elements and +13 dB increased in return signal power density). Combining increase in both the transmission gain, 10 dB and the receiving gain, 10 dB, the increased system gain is 20 dB which would increase the $R_{max}$ to 474 km, an increase of 216%.

The transformation of the isotropic light emitting elements into the proposed non-isotropic light emitting elements can best be accomplished by forming micro lenses over each to the elements. Examples of optical phased array systems use semiconducting array chips with 100's or 1000's of optical nano-emitter elements on a grid on 10 to 100 microns. [8] At these dimensions, mounting a separate lens over each element is impractical at best. One option is to use micro-fabrication techniques to form micro-lenses from dielectric material directly on the device surface. FIGS.

Figure 26E:
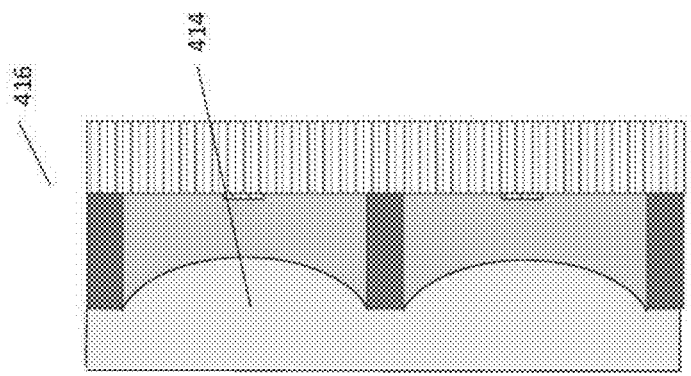
FIGS. 26A through 26E depict a processing sequence for forming cylindrical lenses in situ over the radiating surface of a phased array antenna according to an embodiment of this invention.
Figure 26D:
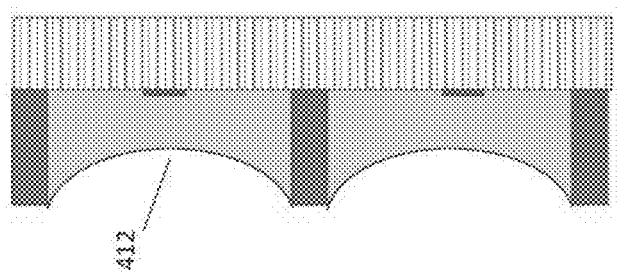
Figure 26C:
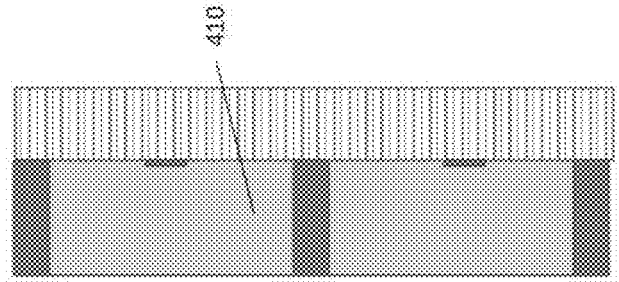
Figure 26B:
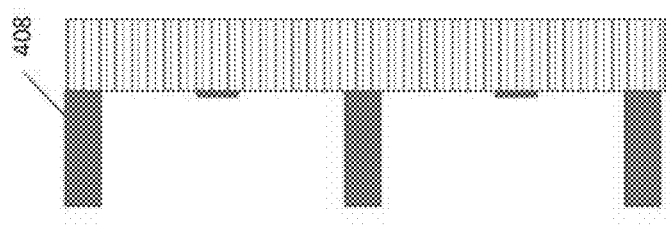
Figure 26A:
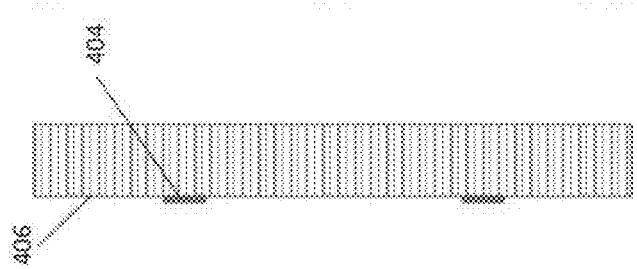
Figure 28:
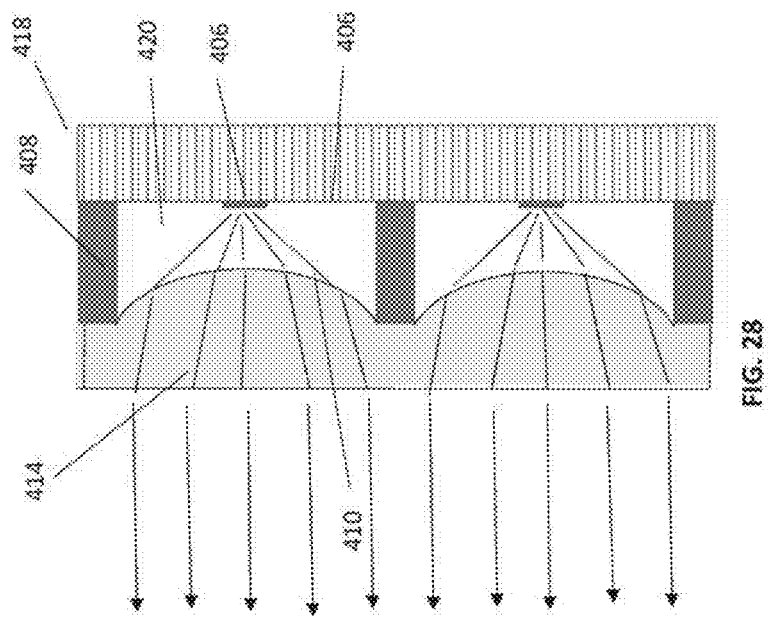
FIG. 28 depicts a vertical cross-section of a portion of another optical phased array with cylindrical lenses formed over the radiating elements according to an embodiment of this invention.
Figure 27:
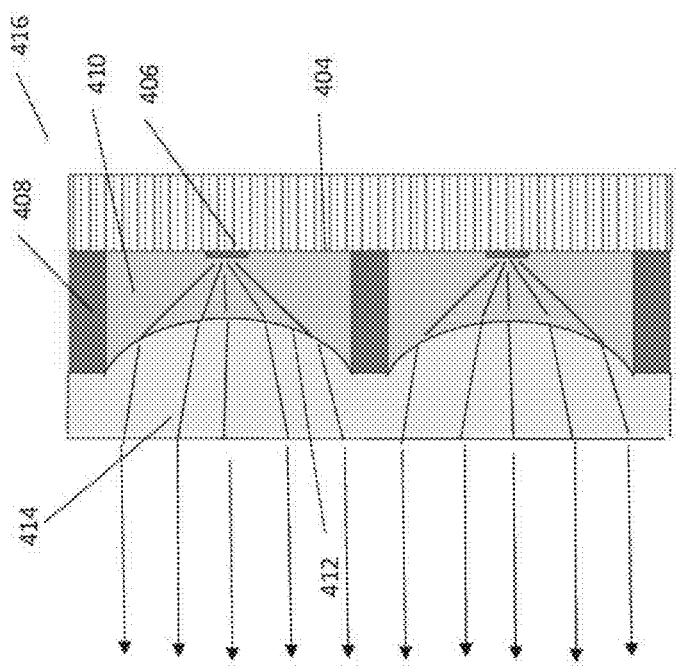
FIG. 27 depicts a vertical cross-section of a portion of an optical phased array with cylindrical lenses formed over the radiating elements according to an embodiment of this invention.

26A through 26E depict one method for the formation cylindrical lens over the emitting elements that is an embodiment of this invention. The cylindrical lens has a vertical concave surface to focus the emitted light in the vertical plane and has a flat horizontal surface that does not focus the emitted light in the horizontal plane. FIG. 26A depicts a vertical cross-section of an antenna segment prior to the formation of the in-situ lenses. The antenna face 404 has two radiating elements 406 on its outer surface. FIG. 26B depicts the antenna segment after support walls 408 are formed between each radiating element 404. Support walls 408 can be composed of a metal or dielectric material. FIG. 26C depicts the antenna segment after first resin 410 is deposited over the surface between support walls 408 and cured. First resin 410 can be a photoresist or a photo-patternable resin such as SU-8. FIG. 26D depicts the antenna segment after first resin 410 is etched to form circular trench 412 by photo-etching or laser ablation, for example. FIG. 26E depicts the antenna segment after optical resin 414 is applied over first resin 410 and support walls 408 and cured. Optical resin 414 is preferably a clear resin with a high index of refraction such as PMMA (1.49), PET (1.57), polycarbonate (1.6) for example. In some applications, first resin 410 is preferably a removable resin that is removed by etching or by sublimation. This would provide an air dielectric of the antenna side of the cylindrical lens. Alternatively, first dielectric 410 can be a permanent dielectric with a low index of refraction such as Teflon AF (1.32) or perfluorohexane (1.25) for example. FIG. 27 depicts a ray diagram for the in situ cylindrical lens 416 shown in FIG. 26E where first resin 408 is left in place. FIG. 28 depicts a ray diagram for the cylindrical lens 418 after first resin 208 is removed leaving air dielectric 420 on the inner surface of the optical resin 414.

Figure 30:
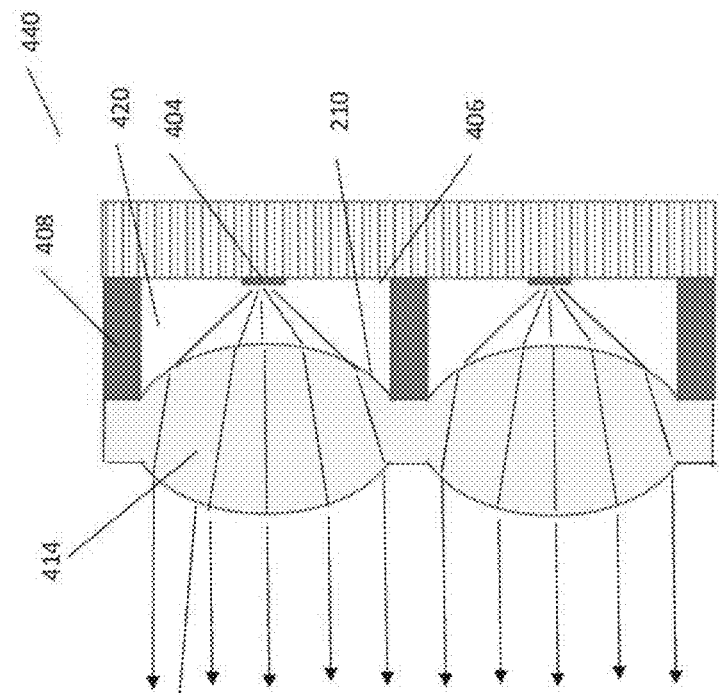
FIG. 30 depicts a vertical cross-section of a portion of another optical phased array with cylindrical lenses formed over the radiating elements according to an embodiment of this invention.
Figure 29:
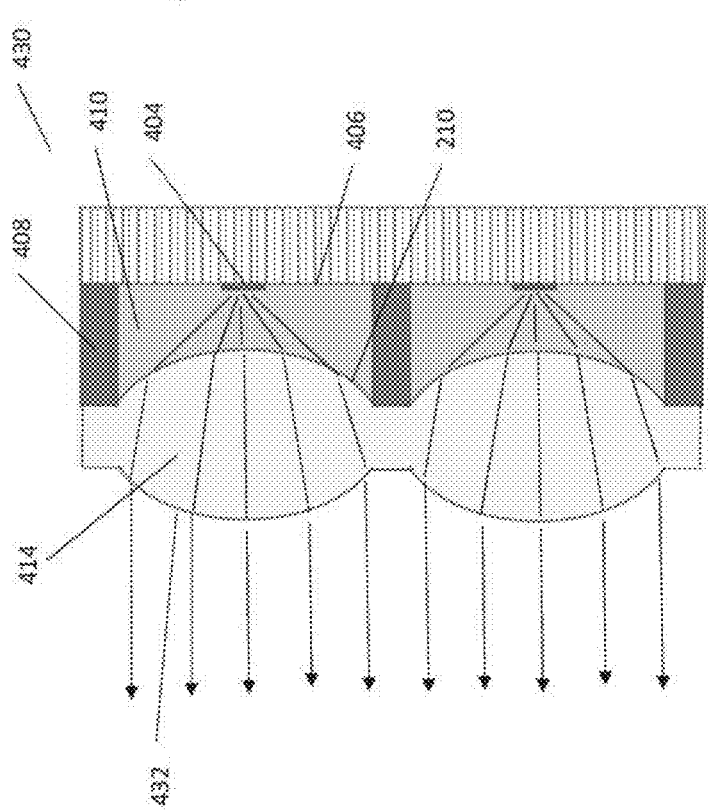
FIG. 29 depicts a vertical cross-section of a portion of an optical phased array with cylindrical lenses formed over the radiating elements according to an embodiment of this invention.

FIG. 29 depicts another cylindrical lens structure 430 with its ray diagram. The outer surface 432 of optical resin 414 sculptured to form a cylindrical outer surface that matches its cylindrical inner surface. It has the first resin 410 in place as the antenna segment depicted in FIG. 23. FIG. 30 depicts yet another cylindrical lens structure 440 and its ray diagram. The outer surface 432 of optical resin 414 sculptured to form a cylindrical outer surface that matches its cylindrical inner surface. It has the first resin removed to form an air dielectric 420 on the inner surface of the optical dielectric 414.

Although not covered in the above discussion nor in the above figures, the same lens focusing elements can be added to optical receivers of an optical phased array antenna. The same types of lenses and the processing steps used to create the lens structure for the transmitting element above can be applied to create a plurality of non-omnidirectional optical receiving elements by forming micro-lenses over an array of omnidirectional optical receivers forming an embodiment of this invention. Similarly, the in situ formed lenses depicted in FIGS. 26 30 can be applied to form focusing lenses and phased array radar systems and on acoustic phased array systems. The dimensions of the lenses would change based on the pitch of the radiating and/or receiving elements and on the wavelength of the emitted and/or received waveform.

Although only one example of optical phased array systems is described above, the embodiments of this invention relative to phased array optical systems equally applies to other phased array optical systems such as communication systems, imaging systems and other types of phased array optical systems. Ones skilled in the art could apply the principles of this invention to many other optical phased array systems.

Antenna Face Orientation

In many prior art phased array antenna systems, the face of the antenna is offset from vertical to optimize the gain plot of the antenna to enable beam forming past vertical such as for example a 10° tilt. If for example, the non-isotropic radiating elements have a field of view from antenna broadside of +/−3° in elevation, forming a 6° beam width in elevation, then the field of view of the non-isotropic radiating elements needs to be tilted from the antenna broadside in order to target objects in the remote field in a narrow elevation range from 0° elevation to a few degrees above, such as from the horizon to about 3° to 6° above the horizon. Even an antenna without tilt might require the field of view of non-isotropic radiating elements to be off-set from the antenna broadside to center the field of view of the elements to the desired elevation range.

Figure 31B:
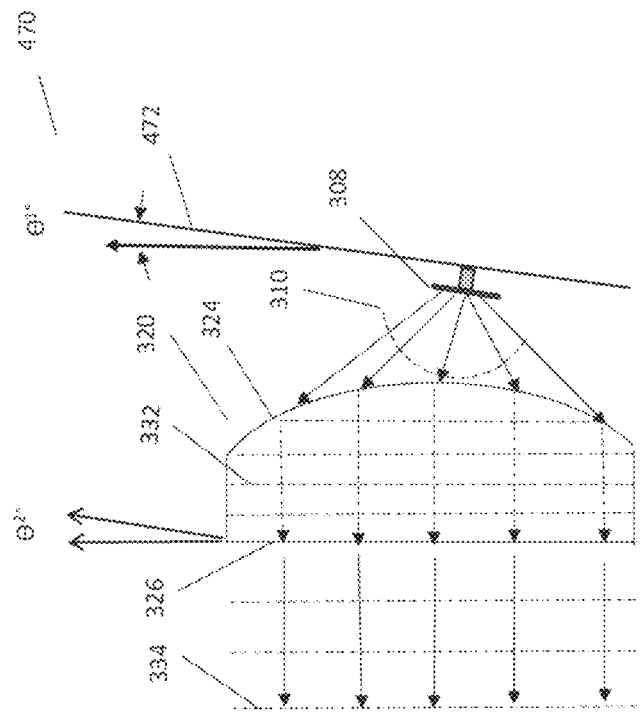
FIGS. 31A and 31B depict vertical cross-sections of conductive and dielectric cylindrical lenses that are offset from the face of the antenna according to an embodiment of this invention.
Figure 31A:
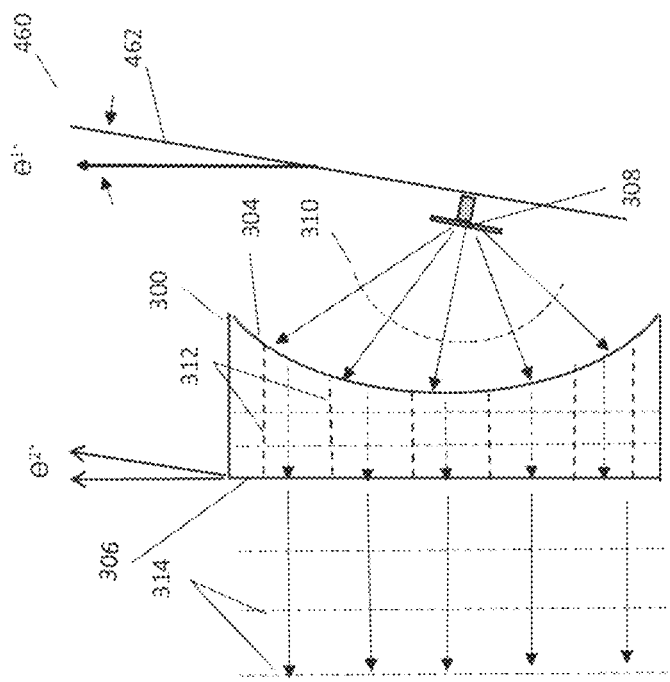

If lenses or horn structures are used to form the non-isotropic radiating elements from generally isotropic radiating elements and they are mounted directly over the isotropic radiating elements, then the resulting non-isotropic beams would be focused at 90° from the antenna face or at the antenna broadside. This would be the case for the lens structures depicted in FIGS. 19, 20 & 21 above if the antenna face is offset from vertical. A preferred approach to adjust the narrow vertical field of view of the non-isotropic radiating elements of embodiments of this invention is to offset the lenses used to narrow the field of view from the isotropic radiating elements vertically. FIGS. 31A and 31B depict cross-sections of cylindrical lenses that are offset from the face of the antenna to optimize the field of view of the resulting beam to focus on the remote field near zero elevation as an embodiment of this invention. FIG. 31A depicts a portion of a radiating antenna array 460 that has an angular tilt of the antenna face 462 of $+\Theta^{1\circ}$ from vertical. Cylindrical conducting lens 300 is similar to cylindrical conducting lens 300 depicted in FIG. 19B. It has a concave face 304 facing radiating element and flat face 306 facing away from the radiating element. Conductive lens 300 contains metal strips 312 running horizontally. Antenna face 462 is offset by $\Theta^{2\circ}$ from the orientation of the antenna face 462. Isotropic radiating element 306 has a broad side angle of $\Theta^{1\circ}$ from horizontal. It has a spherical radiating wave front 308 which impinges of the concave lens face 304. Parallel wave front 314 radiates from the far side 306 of cylindrical conducting lens 300 parallel to the lens side 304. It is offset from the antenna face 262 by $\Theta^{2\circ}$ and would be offset from horizontal by $\Theta^{1\circ}-\Theta^{2\circ}$.

FIG. 31B depicts a portion of a radiating antenna array 470 that has an angular tilt of the antenna face 472 of $+\Theta^{1\circ}$ from vertical. Cylindrical dielectric lens 320 is similar to cylindrical dielectric lens 320 depicted in FIG. 20B. It is offset by $\Theta^{2\circ}$ from antenna face 472. Isotropic radiating element 308 has a broad side angle of $\Theta^{1\circ}$ from horizontal. It has a spherical radiating wave front 310 which impinges of the convex lens face 324. Within lens 320 the radiated wave front 32 is parallel with the far face 326. Parallel wave front 334 exits the far face 332 of lens 320 is offset from the antenna broadside by $\Theta^{2\circ}$ and would be offset from horizontal by $\Theta^{1\circ}-\Theta^{2\circ}$. The resulting radiating beams from radiating antenna array 460 and radiating antenna array 470 are focused near zero elevation to target the remote field near the horizon.

The same lens offset depicted in FIGS. 31A and 31B can be used on acoustic and optical phased array antenna to specifically direct the non-isotropic radiating elements to a desired elevation rather than broadside to the antenna face. For example, a communication phased array antenna system located on a high tower or on a hill top might have its antenna broadside targeted below horizontal. In an embodiment of this invention, the antenna could have a portion of the radiating elements having a generally isotropic radiating pattern that covers a +/−60° azimuth and a −20° to +90° elevation covering non-remote field communication receivers and transmitters and would have the balance of the radiating elements having a non-isotropic radiating pattern focused near the horizontal at an offset angle from the antenna broadside and covering remote field communication receivers and transmitters.

In those embodiments of this invention where all antenna elements are non-isotropic radiators or non-omnidirectional receivers, the antenna itself can and generally would be, tilted to optimize the center of their field of view to the desired elevation so it would not be required to tilt the lenses or micro-horns.

Other Aspects of this Invention

Most of the radar, sonar and optical array examples of embodiments of this invention described above were examples where 50% of the radiating elements of the various phased array antenna were isotropic radiating and/or omnidirectional receiving elements and 50% were non-isotropic radiating and/or non-omnidirectional receiving elements. Many other ratios of isotropic and non-isotropic radiating elements and/or omnidirectional and non-omnidirectional receiving elements can be used to implement embodiments of this invention. In Example G, the radar system with a 1000 element array had 500 isotropic radiating elements and 500 non-isotropic radiating elements, a 50:50 mix. The radar system could have had fewer than or more than 500 non-isotropic radiating elements. There is a trade-off that can be made to increase the non-remote field power density and decrease the remote field power density and lower $R_{max}$ by having for example 750 isotropic radiating elements and only 250 non-isotropic radiating elements. The non-remote field $R_{max}$ would increase from 126 km to 139 km while the remote field would decrease from 267 km to 224 km. Similarly, a trade-off could be made to further increase the remote field $R_{max}$ of the non-isotropic radiating elements at the expense of the decreasing further the non-remote field power density and the $R_{max}$ of the isotropic radiating elements by having for example only 250 isotropic radiating elements and 750 non-isotropic radiating elements. The non-remote field $R_{max}$ would decrease from 126 km to 106 km while the remote field would decrease from 267 km to 295 km. The embodiments of this invention apply to any ratio of directional and non-directional phased array elements.

Further, other variations of the specific details of the phased array elements of embodiments of this invention include for example having a wider or narrower remote field of view formed by the non-isotropic radiating elements and/or the non-omnidirectional receiving elements. Changing the remote field elevation field of view of the phased array radar antenna of Example G from 6° to 9° would decrease its gain by 1.8 dB and decrease $R_{max}$ from 267 km of Example G to 240 km. That is still represents a 60% increase in $R_{max}$ over the base line $R_{max}$ of antenna of Example A, 150 km. In the case where a narrower field of view is formed, such as one having 4° vertical field of view, the gain would be increased by 1.8 dB and the $R_{max}$ would be increased to 300 km.

A still further embodiment of this invention is a phased array antenna system in which the generally isotropic radiating elements used in addressing the non-remote field have a small degree of focusing applied to their radiating pattern.

In the case of a surface ship phased array radar system such as the prior art radar system described in Example A, all radiating elements are isotropic with a field of view of at least +/−60° in azimuth and least +/−60° in elevation. The radar system of Example G incorporating embodiments of this invention with half of antenna having non-isotropic radiating elements that extend $R_{max}$ by 78%. Although the non-remote field isotropic radiating elements of Example G have an elevation field of view of +/−60°, the only useful portion is from horizontal (0°) to just over vertical (90°). If the non-remote field isotropic radiating elements had minimum focusing so that the elevation field of view were reduced from the prior art +/−60° to a narrower 0° to 100° by using for example with a cylindrical lens with minimum curvature, the power level in the reduced field of view would be increased by 20% providing an additional gain of 0.8 dB.

FIGS. 32A through 32C depict a dielectric lens that could be used to focus the non-remote field radiating elements field of view from more than 120° down to 90° for example. Cylindrical lens 520 is similar to cylindrical lens 320 depicted in FIGS. 20A through 20C except it has significant less curvature. FIG. 32A depicts a perspective view of lens 520. It is convex on face 524 which faces the antenna face and flat on the opposite face 526. Lens 520 has less curvature on face 524 versus face 324 of lens 320. FIG. 32B depicts a vertical cross-section of lens 520. Isotropic radiating element 508 radiates a spherical wave front 510 that impinges of lens face 524. The lens face 524 refracts the radiated wave but less than lens face 324 in FIG. 20B. The radiated wave front exits the lens on face 526 with a curved wave front that is neither flat nor fully spherical. The radiated wave would have a beam width 20% to 25% narrower than the initial spherical wave front 510 and would have a power density within the beam of 20% to 33% higher. This would increase the non-remote field $R_{max}$ by 10% to 20%. FIG. 32C depicts the horizontal cross-section of lens 520. It has the same effect on radiated wave 510 in the horizontal plane as does lens 320 in FIG. 20C, i.e., having the radiated wave front 534 exiting lens face 526 as a spherical wave front in the horizontal plane.

Yet another implementation of embodiments of this invention is a phased array antenna system having a plurality generally isotropic radiating elements and a plurality of non-isotropic radiating elements where the non-isotropic radiating elements have a narrower field of view in both the vertical plane and the horizontal plane. In the automotive phased array radar system of prior art Example B and the version in Example H incorporating embodiments of this invention, the radiating area array antenna for the remote field only covers an area of +/−9° in azimuth from antenna broadside and 0° to 9° in elevation. In Example H, the remote field radiating elements have focusing elements such as cylindrical lenses to narrow the radiated horizontal field of view from the initial +/−60° to +/−9° in the modified version base on embodiments of this invention. This increased the radiated power density in the remote field by a factor 6.7× and a gain increase of more than 8 dB while covering the same field as the automotive radar of Example B.

In Example N, an additional embodiment of this invention is applied to the antenna of Example H, whereby the remote field radiating elements have their vertical field of view narrowed as well. The remote field vertical field of view is reduced from the original +/−60° of Example B and modified Example H to 0° to 9° in elevation to match the required remote field horizontal field of view. This would increase the radiated power density in the remote field by an additional factor of more than 13× for an additional gain of 11 dB. The combined 19 dB increase in the radiated power density within the narrower field of view of 0° to +9° vertically and +/−9° horizontally would increase the maximum range by 3× or from the 250 m of Example B to 750 m in Example H. In this case, with no increase in radiating element power, no change in the number of radiating elements and no loss of scanned field of view, the remote field maximum range would be increased by a factor of 3× or more.

Although a range increase from the baseline 250 meters on an automotive drive assist radar system may not highly useful, the increased antenna gain provided by embodiments of this invention can be used to reduce the cost of the antenna system by lower the element power or by reducing the number of antenna elements.

Figure 33C:
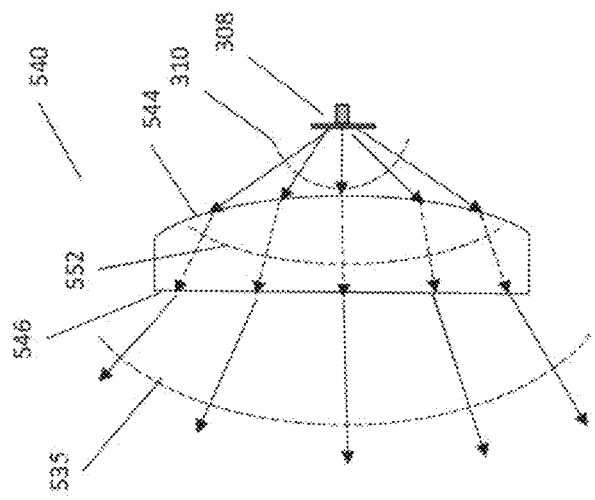
Figure 33B:
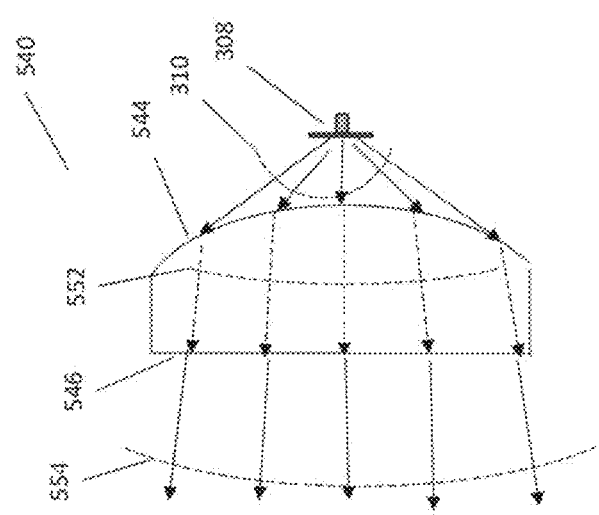
Figure 33A:
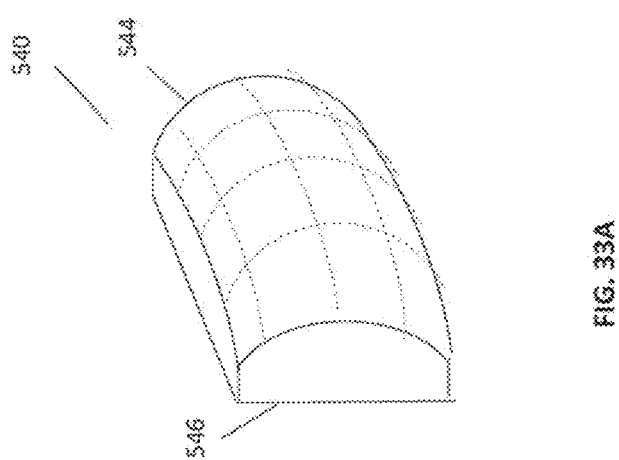

FIGS. 33A through 33C depict oval lens 540 in prospective view, vertical cross-section and horizontal cross-section that can form the vertical and horizontal wave focusing of automotive phased array radar of Example N in this embodiment of this invention. FIG. 33A depicts a perspective view of oval lens 540 that has curved face 544 that would face the antenna face and has flat face 546 on the lens opposite side. FIG. 33B depicts the vertical cross-section of oval lens 540. Isotropic radiating element 308 radiates spherical wave front 310 which impinges on the curved surface 544 of oval lens 540. The lens face 544 refracts the radiated wave but less than lens face 324 in FIG. 20B. The radiated wave front exits the lens on face 546 with a curved wave front that is neither flat nor fully spherical. The radiated wave would have a vertical beam width that was 92% narrower than the initial spherical wave front 510 and would have a power density within the beam of 13× higher for a 11 dB gain. FIG. 33C depicts the horizontal cross-section of oval lens 540. Isotropic radiating element 308 radiates spherical wave front 310 which impinges on the curved surface 544 of oval lens 540. The lens face 544 refracts the radiated wave but less than in the vertical plane. The radiated wave front exits the lens on face 546 with a curved wave front that is neither flat nor fully spherical but with more curvature than the wave in the vertical plane. The radiated wave would have a horizontal beam width that was 85% narrower than the initial spherical wave front 510 and would have a power density within the beam of 6× higher for an 8 dB gain. The combination of the wave front focusing in both the vertical plane and the horizontal plane would provide the gain of 19 dB detailed above for Example N.

This is an example of an embodiment of this invention where radiating waves can be beam formed into non-isotropic wave forms in both the horizontal and vertical plane with no increase in radiating element power, no change in the number of radiating elements and no loss of scanned field of view while increasing the remote field maximum range by a factor of 3× or more. The non-isotropic elements with the vertical beam forming to beam width of 0° to +9° and horizontal beam forming to a beam width of +/−9° can be accomplished with an oval lens with more curvature in the vertical plane than the horizontal plane. This same embodiment of this invention can be applied to other examples of phased array antenna systems where the radiated beam width can be narrowed in both the horizontal and the vertical planes.

Although the examples detailed above of radar, acoustic and optical phased array antenna systems have focused on ground based and shipboard antenna systems, the embodiments of this invention are applicable to other phased array antenna system such as an airborne phased array radar system. The key difference of any airborne radar system versus a ground-based system is that the airborne system must have a vertical field of view that covers positive and negative elevations. The airborne phased array antenna must have a non-remote field vertical field of view of +/−60° to +/−90° for example. In this embodiment of the invention, the plurality of isotropic radiating elements must each have a beam width of at least as wide as the required non-remote field, field of view of the antenna system. The remote field, field of view would be narrower but would also have to vertical field of view that covers positive and negative elevations. In the example radar system of Example G that incorporates an embodiment of this invention, the remote field beam width is only 0° to +6° in elevation. If the antenna of Example G were to be an airborne phased array antenna, its remote field would require a beam width of +/−6°. In that case the focusing cylindrical lens would need to have less curvature than the ones in Example G and would end up with a 2× wider vertical beam width and a 2× lower maximum power density within the beam. The $R_{max}$ would be reduced by a factor of 20%, reducing $R_{max}$ from 267 km for Example G to 224 km in the airborne system. Although this is a reduction from $R_{max}$ of Example G that incorporates an embodiment of this antenna, it is still 50% further than the $R_{max}$ of the base line prior art of Example A.

Figure 34:
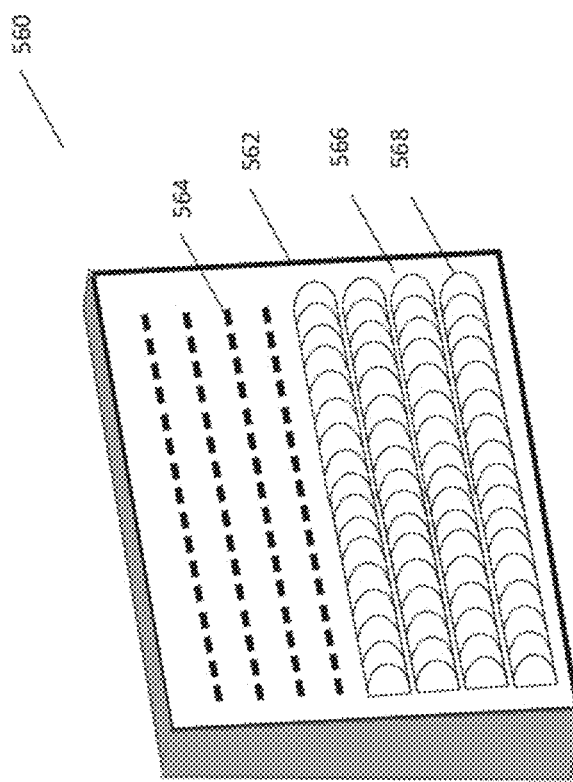
FIG. 34 depicts a phased array radar antenna with a plurality of isotropic radiating elements and with a plurality of non-isotropic radiating elements according to an embodiment of this invention.

Key embodiments of this invention are electromagnetic and acoustic phased array antenna systems each such antenna having a plurality of generally isotropic radiating elements and a plurality of non-isotropic radiating elements on the same antenna face. FIG. 34 depicts a phased array radar antenna 560 comprising eight rows with 16 radiating elements per row on the antenna face 562. The upper four rows comprise 64 isotropic radiating elements 564. The lower four rows comprise non-isotropic radiating elements 566. In this example, the non-isotropic radiating elements 566 are composed of isotropic radiating elements 564 (not shown) and cylindrical lenses 568 that are mounted over each isotropic radiating element. As described above in earlier examples of embodiments of this invention, the portion of the phased array radar antenna 560 with isotropic radiating elements 564 and not having cylindrical lenses 568 are used to address non-remote regions and the portion of the phased array radar antenna 560 with non-isotropic radiating elements 566 which have cylindrical lenses 568 are used to address remote regions. The plurality of isotropic radiating elements and the plurality on non-isotropic radiating elements depicted in FIG. 34 may also comprise a plurality of omnidirectional receiving elements and a plurality of non-omnidirectional receiving elements with the lenses focusing the return signals onto the omnidirectional receiving elements under the lenses.

Figure 35:
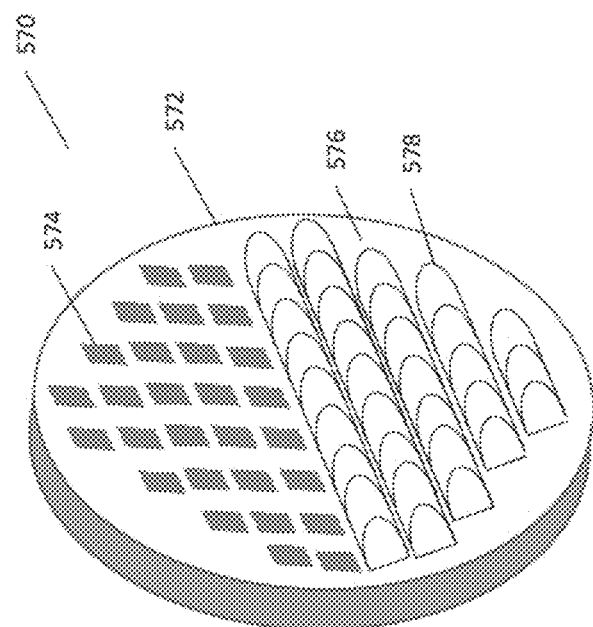
FIG. 35 depicts a phased array acoustic antenna with a plurality of isotropic radiating elements and with a plurality of non-isotropic radiating elements according to an embodiment of this invention.

FIG. 35 depicts a phased array acoustic antenna 570 comprising ten rows of radiating acoustic elements with two to ten elements per row for a total of 56 elements. The upper five rows comprise 28 isotropic radiating elements 574. The lower five rows comprise 28 non-isotropic radiating elements 576. In this example, the non-isotropic radiating elements 576 are composed of isotropic radiating elements 574 (not shown) and cylindrical lenses 578 that are mounted over each isotropic radiating element. As described above in the radar example depicted in FIG. 34, the portion of the phased array acoustic antenna 570 with isotropic radiating elements 574 and not having cylindrical lenses 578 are used to address non-remote regions and the portion of the phased array acoustic antenna 570 with non-isotropic radiating elements 576 which have cylindrical lenses 578 are used to address remote regions. The plurality of isotropic radiating elements and the plurality on non-isotropic radiating elements depicted in FIG. 35 may also comprise a plurality of omnidirectional receiving elements and a plurality of non-omnidirectional receiving elements with the lenses focusing the return signals onto the omnidirectional receiving elements under the lenses.

Another embodiment of this invention is the use of one or more curvilinear reflecting structures is depicted in FIGS. 36A through 36C, FIG. 37, FIGS. 38A through 38C and FIG. 39. FIGS. 36A through 36C depict three views of a portion of phased array antenna 600 comprising multiple curvilinear reflecting structures 602, that are fed by line arrays 604 comprising generally isotropic radiators 606 and/or generally omnidirectional receivers 606. The combination of curvilinear reflecting structures 602 and generally isotropic radiators 606 and/or generally omnidirectional receivers 606 form non-isotropic radiating elements 608 and/or non-omnidirectional receiving elements 608 depicted with dashed lines. FIG. 36A is a plane view of portion 600 of a phased array antenna viewed from antenna broadside. It depicts two curvilinear reflecting structures 602, two line arrays 604 each comprising seven radiators 606 and/or receivers 606. Preferably each line array 604 would be part of longer line array (not depicted). FIG. 36A also contains multiple brackets 610 that position the radiators 606 and/or receivers 606 in front of reflecting structures 602, and generally at or near the focal point of reflecting structure 602. FIG. 36B depicts a horizontal cross-section through the center of reflecting structure 602, through radiators 606 and/or receivers 606 and through antenna base 612. Radiators 606 and/or receivers 606 are connected to brackets 610 which attach to the reflecting structures 602. FIG. 36C depicts a vertical cross-section through the center of one of the radiators 606 and/or receivers 606 from two line arrays 604. Radiators 606 and/or receivers 606 are positioned at or near the focal point of reflecting structures 602. Curvilinear reflecting structures 602 are attached to antenna frame 612 and supported by braces 614. Signal feed lines and/or signal return lines to or from each radiator and/or receiver 606 are not depicted and would preferably be attached to brackets 610. The combination of isotropic radiators 606 and curvilinear reflecting structures 602 form non-isotropic radiating elements 608 (dashed lines) and/or the combination off omnidirectional receivers 606 and curvilinear reflecting structures 602 form non-omnidirectional receiving elements 608 (dashed lines).

Each radiator 606 radiates generally isotropic waves toward curvilinear reflecting structure 602. Curvilinear reflecting structure 602 is preferably parabolic in the vertical plane and linear in the horizontal plane. Each line array 604 is mounted facing and aligned horizontally with one of the at least one curvilinear reflection structures 602 with each radiator 606 at or near the focal point of the curvilinear reflecting structure. The radiated waves from each radiator 606 radiate spherically toward and reflect off of its associated reflecting structure 602 forming a non-isotropic radiating pattern. The reflected waves would have a generally parallel wave front in the vertical plane and maintain a circular wave front in the horizontal plane. The resulting radiating pattern of each radiator 606 after reflecting off of reflecting structures 602 is narrow in the vertical plane, about +/−6° and wide in the horizontal plane, greater than +/−60°.

In the same way, receiver 606 has a generally omnidirectional field of view both vertically and horizontally. Received waves coming from +/−6° of antenna broadside in the vertical plane and +/−60° of antenna broadside in the horizontal plane would be planar waves coming in with a flat wave front. These waves would impinge on the reflecting structures 602 and be reflected into focused waves in the vertical plane and remain flat (or unfocused) in the horizontal plane. Waves coming from a point outside of the vertical field of view of non-omnidirectional receiving elements 608 (>+6° or <−6°) would not be reflected toward receivers 606. Waves coming from a point within the narrow vertical field of view, +/−6° of antenna broadside and from within the generally omnidirectional horizontal field of view, +/−60° of antenna broadside, would be reflected by reflecting structures 602 and the reflected waves would have a radial wave front in the vertical plane that is focused on receivers 606 and have a flat wave front in the horizontal plane. The combination of omnidirectional receivers 606 and reflecting structures 602 form a plurality of non-omnidirectional receiving elements 608 (dashed line). The reflected wave would have a vertical wave front focused toward the receiver and a horizontal wave front that was not focused.

Curvilinear reflecting structures 602 are preferably parabolic in the vertical plane and linear in the horizontal plane. Line arrays 604 with isotropic radiators and/or omnidirectional receivers 606 are mounted facing and aligned horizontally with each curvilinear reflecting structure 602 with each radiator and/or receiver 606 positioned vertically at or near the parabolic focus point of each curvilinear reflecting structure 602. Line arrays 602 preferably have an element-to-element pitch of ½ wavelength to avoid grating lobes in the horizontal plane and to maximize the antenna gain. The combination of each radiator 606 and reflecting structure 602 forms non-isotropic radiating element 608 and the resulting radiating pattern is narrow in the vertical plane, about +/−6° and wide in the horizontal plane, greater than +/−60°. The combination of each receiver 606 and reflecting structure 602 forms non-omnidirectional receiving element 614 and resulting receiving field of view is narrow in the vertical plane, about +/−6° and wide in the horizontal plane, greater than +/−60°.

The precise radiating pattern for each radiator and/or resulting receiving field of view for each receiver would be determined by how close each is positioned to the focal point of reflecting structure 602 and by the specific size and shape of reflecting structure 602. Radiators 606 that are positioned at the focal point of reflecting structures 602 would form radiating elements 608 that would have a radiating pattern that would be very narrow vertically such +/−6° or less and wide horizontally, greater than +/−60° while if they are positioned further away such as at 10% of a wavelength away from the focal point, the radiating pattern would be larger vertically, such as for example +/−12°. Receivers 606 positioned at the focal point of reflecting structures 602 would form receiving elements 608 that would have a field of view that would be very narrow vertically such +/−6° or less and wide horizontally, greater than +/−60°, while if they are positioned further away such as at 10% of a wavelength away from the focal point, the field of view would be larger vertically, such as for example +/−12°. For all positions of the radiators 606 and/or receivers 606 relative to the focal point, the horizontal radiating pattern for each radiator and/or the horizontal field of view for each receiver would be generally isotropic and/or omnidirectional, respectively, or at least +/−60°.

Figure 37:
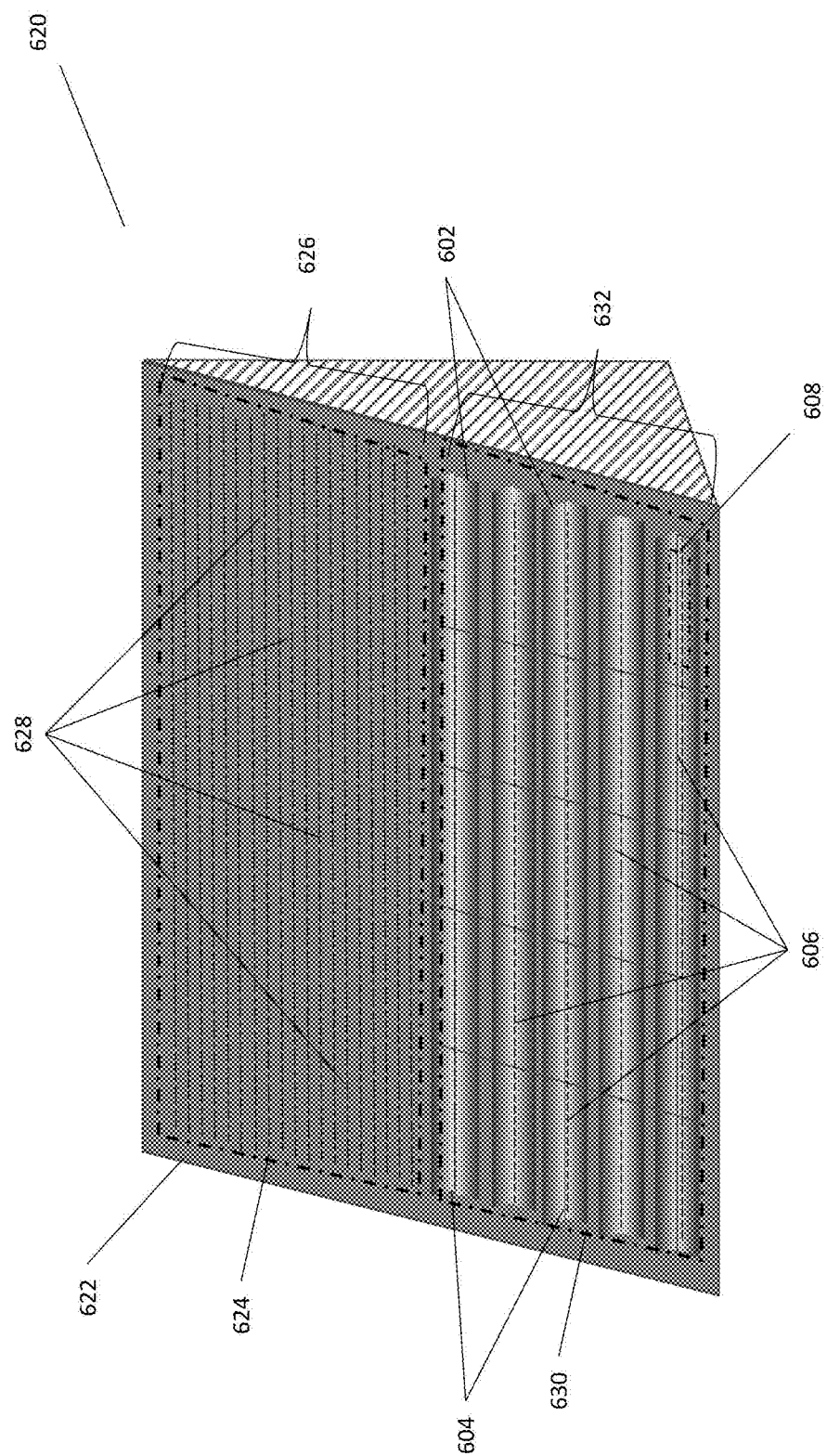
FIG. 37 depicts a phased array antenna with a plurality of isotropic receiving elements and/or omnidirectional receiving elements and a plurality of isotropic radiators and/or omnidirectional receivers and multiple curvilinear reflective structures which combine to form a plurality of non-isotropic radiating elements and/or non-omnidirectional receiving elements.

FIG. 37 depicts phased array antenna 620 with antenna face 622 comprising top area 624 containing first plurality 626 of radiating and/or receiving elements 628. Each element 628 has a radiating pattern that is generally isotropic and/or has a receiving field of view that is generally omnidirectional. Antenna face 622 also comprises bottom area 630 containing second plurality 632 of radiating and/or receiving elements 608. Each element 608 has a radiating pattern that is non-isotropic and/or has a receiving field of view that is non-omnidirectional. The first plurality 626 of radiating and/or receiving elements 628 is preferably in the form of an area array which has a horizontal element-to-element pitch and a vertical element-to-element pitch of about ½ wavelength to maximize antenna gain and to avoid grating lobes. The second plurality of radiating and/or receiving elements 632 is composed of multiple curvilinear reflecting structures 602 and multiple line arrays 604 of radiators and/or receivers 606, each of which has a generally isotropic radiating pattern and/or a generally omnidirectional receiving field of view. The combination of line arrays 634 of radiators and/or receivers 606 and curvilinear reflecting structures 602 creates multiple radiating elements 608 with a non-isotropic radiating pattern and/or multiple receiving elements 608 with a non-omnidirectional field of view. Although FIGS. 36A through 36C and FIG. 37 depict multiple curvilinear reflecting structures 602 each with an associated line array 604 of radiators and/or receivers 606, a phased array antenna of this embodiment could have as few as one curvilinear reflecting structure 602 and only one line array 604 of radiators and/or receivers 606. In that case, higher antenna power levels and further increases in $R_{MAX}$ could be attained with higher outputted power levels at each radiator 606 and higher antenna gain.

Phased array antenna 620 would have the capability to form two different types of steerable, radiated beams of in-phase radiated waves as well as two different types of received field of views. Area array 626 of antenna 620 is used to form the first type radiated beam. This portion of antenna 620 is a standard, prior art antenna with radiating elements 628 that are generally isotropic and/or receiving elements 628 that are generally omnidirectional. It is able to form either one beam using all of the elements 628 of area array 626, achieving maximum gain and maximum range, or it can form multiple independently steered beams if different portions of area array 624 were independently controlled. The phased array beam or beams formed by elements 628 would each be steerable vertically and horizontally from at least +/−60° from antenna broadside. The radiating beam or beams from area array 626 would have a horizontal beam width determined by the number of elements used in a horizontal row or portion of a row and a vertical beam width determined by the number of elements used in a vertical column or portion of a column used to form the beam or beams. The gain of any in-phase beam would be determined by the number of elements used to form that beam. The typical relationship of beam width to number of elements in an array is depicted in FIGS. 2A through 2F.

The area array 632 of antenna 620 is used to form the second type of radiated beam, one that is steerable only horizontally. It is able to form either one beam using all of the elements 608 of area array 632, achieving maximum gain and maximum range, or it is able to form multiple beams if different portions of area array 632 were independently steered. The beam or beams are steerable horizontally and would have a horizontal beam width determined by the number of radiators 606 used in each of the horizontal line array 604 or by the number of horizontal elements used if only a portion of the elements are used. The vertical beam width would be determined by the alignment of each radiator 606 relative to its respective reflecting structure 602 and the specific curvature of the reflecting structure. Standard phased array electronic beam steering would be used to move the resulting in-phase beam across the horizontal field of view at least +/−60°. No electronic beam steering is used to move the resulting in-phase beam vertically as it is designed to be non-steerable vertically. Instead, the parabolic shape of the reflecting structure in the vertical plane forms a narrow vertical beam width, broadside of the antenna and generally set from the horizon to just above the horizon. It should be noted that for airborne applications, the elevation of the center of the beam and broadside of the antenna would generally be set to 0° in elevation with the beam covering from just below the horizon to just above the horizon. The total gain for the portion of the antenna containing the non-isotropic radiating and/or non-omnidirectional receiving elements would be determined by the product of the number on elements in each linear array and the number of linear arrays times the gain that the curvilinear reflecting structure provides and times to radiated power of each radiator.

Gain=Total number of Elements×Gain of Reflecting Structure

Figure 38:
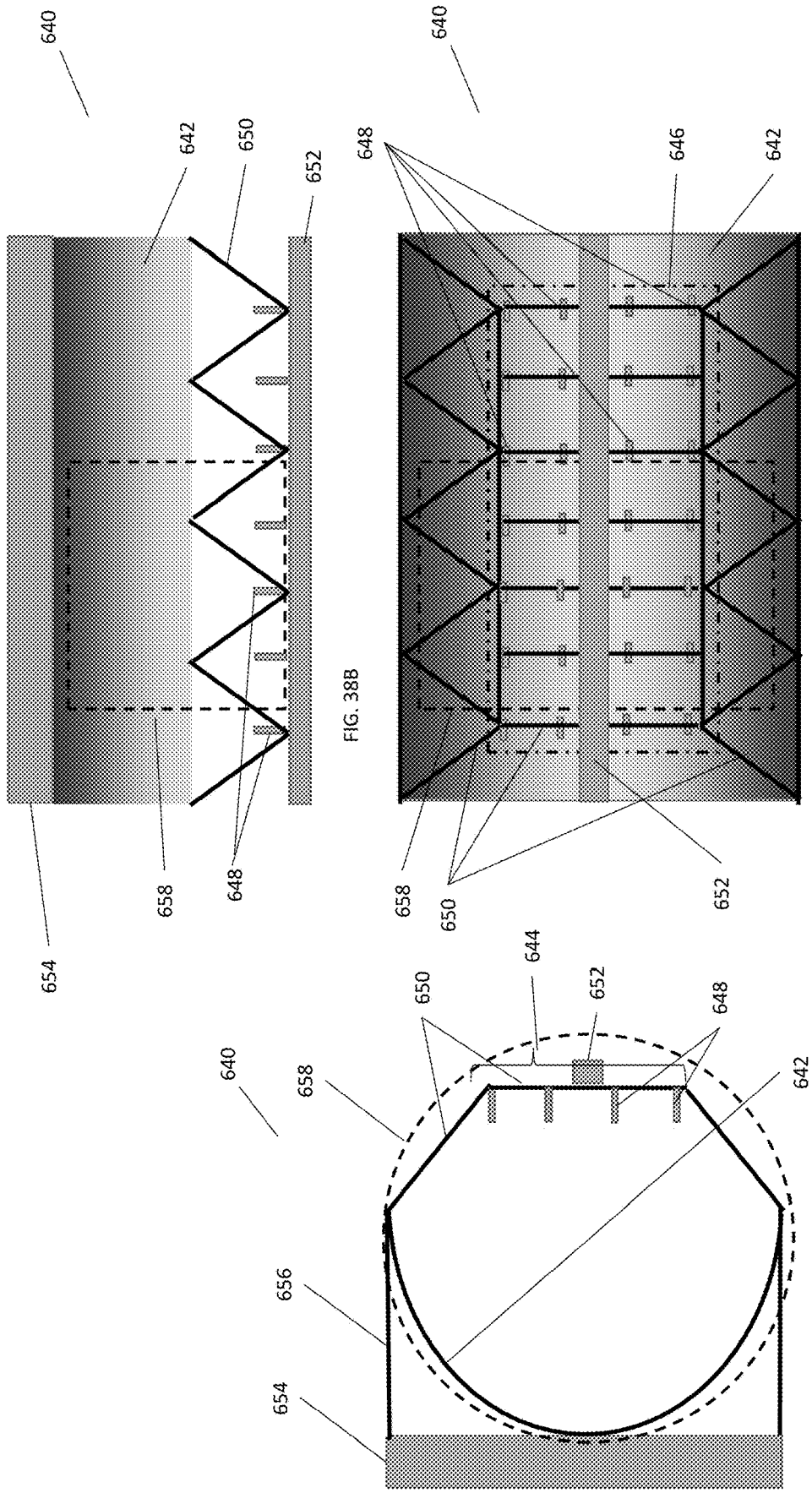
FIGS. 38A through 38C depict a front view, a horizontal cross-section and a vertical cross-section of portion of a phased array antenna with an area array of radiators and/or receivers and a curvilinear reflective structure that combine to do beam forming in vertical plane and not in the horizontal plane.

FIGS. 38A through 38C depict three views of a portion of a phased array antenna 640 comprising at least one curvilinear reflecting structure 642 that is being fed by an area array 646 comprising generally isotropic radiators 648 and/or generally omnidirectional receivers 648. Each radiator 648 radiates spherical waves toward reflecting structure 642. Curvilinear reflecting structure 642 is preferably parabolic in the vertical plane and linear in the horizontal plane. Radiators and/or receivers 648 are mounted facing and aligned horizontally with each of the at least one curvilinear reflection structures 642. Each array 646 is positioned vertically with its horizontal center at or near the focal point of curvilinear reflecting structure 642. The radiated waves from each radiator 648 radiate spherically toward and reflect off of reflecting structure 642 forming a non-isotropic radiating pattern. The reflected wave would have a generally parallel wave front in the vertical plane and maintain a circular wave front in the horizontal plane. The resulting radiating pattern of each radiator 648 after reflecting off of reflecting structures 642 is narrow in the vertical plane, much less than +/−60° and wide in the horizontal plane, greater than +/−60°. The radiating pattern for each radiator would be determined by how close they are positioned to the focal point of the curvilinear reflecting structure 642 as described above relative to FIGS. 36A through 36C. Because phased array antenna portion 640 has area array 646 of radiators and/or receivers 648 whereas phased array antenna portion 600 has line array 606 of radiators and/or receivers 608, not all of the radiators and/or receivers 648 can be ideally placed directly at the focal point of reflecting structure 642, the vertical beam width of the resulting radiated pattern would be larger than in the with the antenna of FIGS. 36A through 36C, such as for example +/−10° or wider. In all cases the horizontal field of view for each radiating and/or receiving element would be at least +/−60°. Therefore, the antenna gain would be lower than if all radiators and/or receivers were located at the focal point of reflecting structure 658.

In the same way, receiver 648 has a generally omnidirectional field of view both vertically and horizontally. Received waves coming from +/−60° of antenna broadside in the vertical plane and the horizontal plane would be planar waves coming in with a flat wave front. These waves would impinge on the reflecting structures 642 and be reflected into focused waves in the vertical plane and remain flat (or unfocused) in the horizontal plane. Waves coming from a point outside of the field of view of non-omnidirectional receiving elements 658 would not be reflected toward receivers 648. Waves coming from a point within the narrow vertical field of view and from within the generally omnidirectional horizontal field of view of receiving elements 658, would be reflected by reflecting structures 642 and the reflected waves would be non-omnidirectional in the vertical plane and generally omnidirectional in the horizontal plane. The combination of omnidirectional receivers 648 and reflecting structures 642 form a plurality of non-omnidirectional receiving elements 658. The reflected wave would have a vertical wave front focused toward receiver 648 and a horizontal wave front that was not focused.

FIG. 38A is a plane view of portion 640 of a phased array antenna viewed from antenna broadside. It depicts one curvilinear reflecting structure 642, an area array 646 comprising a four by seven array of radiators and/or receivers 648 and preferably would be part of a larger area array (not depicted). FIG. 38A also contains multiple brackets 650 that position area array 646 in front of reflecting structure 642, with the area array center line located generally at or near reflecting structure 642 focal point. It also depicts signal distribution channels 652 that distribute input signals to each radiator 648 and/or output signals from each receiver 648. FIG. 36B depicts a horizontal cross-section through the center of reflecting structure 642, and through radiators and/or receivers 648, through brackets 650, through signal distribution channels 652 and through antenna base 654. Radiators and/or receivers 648 are connected to brackets 650 which attach to reflecting structure 642. FIG. 36C depicts a vertical cross-section through the center of a vertical column of the radiators and/or receivers 648 of area array 646. Area array 646 is positioned at or near the focal point of reflecting structures 642. Curvilinear reflecting structures 642 are attached to antenna base 654 and supported by braces 656. The combination of isotropic radiators 648 and curvilinear reflecting structures 642 form non-isotropic radiating elements 658 and/or the combination of omnidirectional receivers 646 and curvilinear reflecting structures 642 form non-omnidirectional receiving elements 658.

The at least one curvilinear reflecting structure 642 is preferably parabolic in the vertical plane and linear in the horizontal plane. Area array 646 with isotropic radiators and/or omnidirectional receivers 648 is mounted facing and is positioned vertically at or near the parabolic focus point of curvilinear reflecting structure 642. Area array 646 preferably has horizontal and vertical element-to-element pitch of ½ wavelength to avoid grating lobes in the horizontal plane and to maximize gain. The combination of each radiator 648 and reflecting structure 642 forms non-isotropic radiating element 658 and the resulting radiating pattern is narrow in the vertical plane and wide in the horizontal plane and forms non-isotropic radiating element 658. The resulting receiving field of view from the combination of receiver 648 and reflecting structure 642 is narrow in the vertical plane and wide in the horizontal plane and forms non-omnidirectional receiving element 658. The resulting radiating pattern for each radiator and/or resulting receiving field of view for each receiver would be determined by how close the area array is positioned relative to the focal point of reflecting structure 642 and by the specific size and shape of reflecting structure 602. Isotropic radiators 648 that are positioned at or near the focal point of reflecting structures 602 combined with reflecting structures 642, to form radiating elements 658 that have a non-isotropic radiating pattern that would be very narrow vertically such +/−10° or less, and wide horizontally, greater than +/−60°. If they are positioned further away such as at 10% of a wavelength away from the focal point, the radiating pattern would be larger vertically, such as for example +/−15°. Receivers 648 positioned at or near the focal point of reflecting structures 642 would form receiving elements 648 that would have a field of view that would be very narrow vertically such +/−10° or less and wide horizontally, greater than +/−60°. If they are positioned further away such as at 10% of a wavelength away from the focal point, the field of view would be larger vertically, such as for example +/−15°. For all positions of the radiators and/or receivers 648 relative to the focal point, the horizontal radiating pattern for each radiator 648 and/or the horizontal field of view for each receiver 648 would be generally isotropic and/or omnidirectional, respectively, or at least +/−60°.

The at least one parabolic reflective structure of FIGS. 38A through 38C and also operate in a different mode where only one horizontal row 649 of radiators 648 of array 646 is activated at a time. In this mode the radiated beam reflected off of reflective structure 642 from the activation of just one of horizontal row 649 of radiators would radiate a beam that is vertically narrow and horizontally wide, and its vertical beam width center off of antenna broadside. The highest positioned horizontal row 649 would have its reflective wave centered below antenna broadside while the lowest horizontal row 649 would have its reflective wave centered above antenna broadside. The second highest horizontal row 649 would also have its reflective wave centered above antenna broadside but less so than the highest horizontal row 649. This can be used to move the resulting beam of in-phase waves in the vertical plane to provide more accurate target location data.

Figure 39:
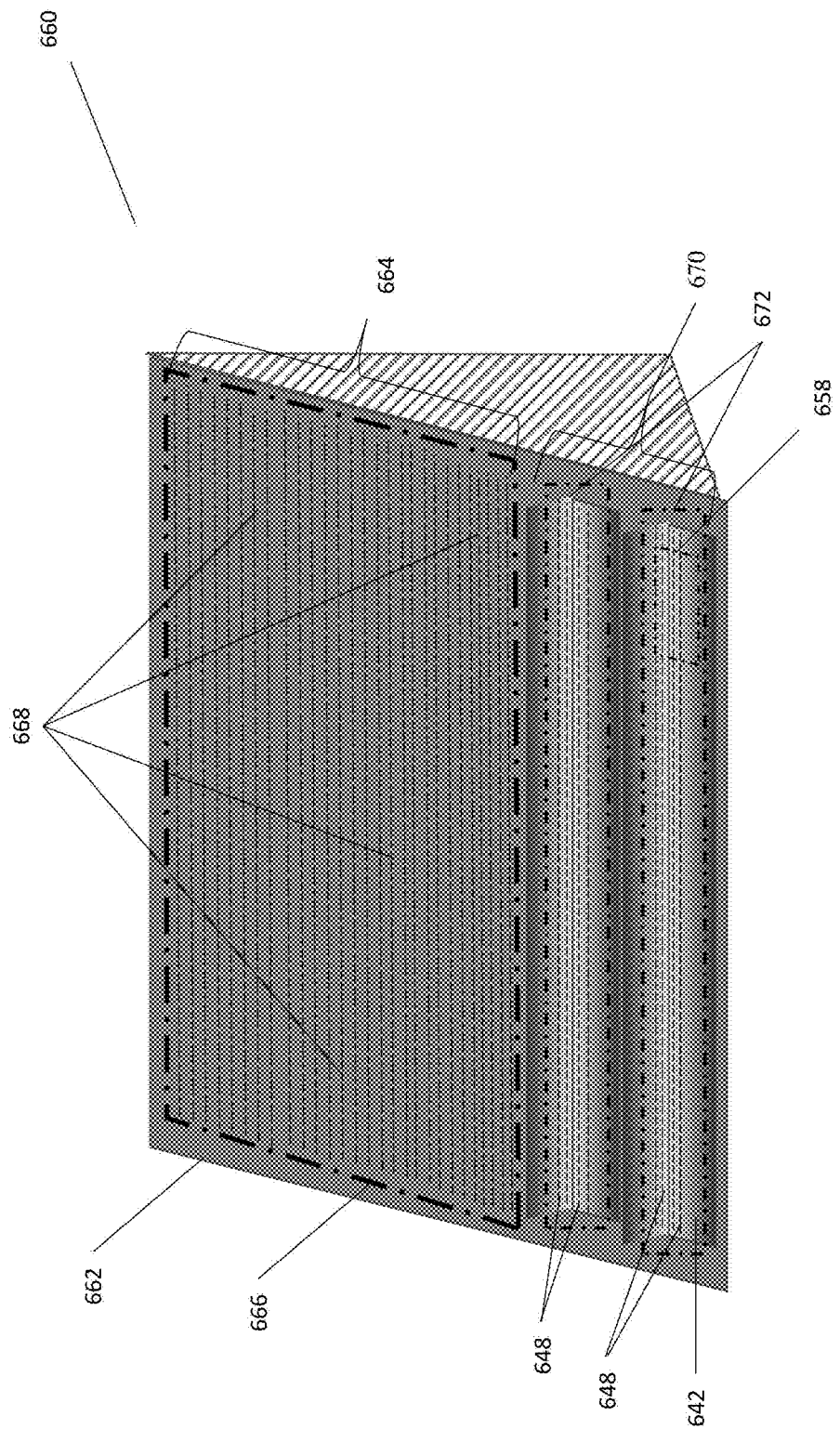
FIG. 39 depicts a phased array antenna with a plurality of isotropic receiving elements and/or omnidirectional receiving elements and a plurality of isotropic radiators and/or omnidirectional receivers and multiple curvilinear reflective structures which combine to form a plurality of non-isotropic radiating elements and/or non-omnidirectional receiving elements.

FIG. 39 depicts phased array antenna 660 with antenna face 662 comprising a top area 664 containing a first plurality 666 of radiating and/or receiving elements 668. Each element 668 has a radiating pattern that is generally isotropic and/or has a receiving field of view that is generally omnidirectional. Antenna face 662 also comprises a bottom area 670 containing a second plurality 672 of radiating and/or receiving elements 658. Each element 658 has a radiating pattern that is non-isotropic and/or has a receiving field of view that is non-omnidirectional. The first plurality 664 of radiating and/or receiving elements 666 is preferably in the form of an area array which has a horizontal element-to-element pitch and a vertical element-to-element pitch of about ½ wavelength to maximize antenna gain and to avoid grating lobes.

The lower area 670 of antenna face 662 contains two curvilinear reflecting structures 642 and two area arrays 672, one aligned with each reflecting structure 642. Each area array 672 comprises radiators 648, each of which has a generally isotropic radiating pattern and/or receivers 648 each of which has a generally omnidirectional field of view. Each area array 672 is aligned with its associated reflecting structure 642 and located at or near the focal point of reflecting structure 642. Each radiator 648 radiates a generally isotropic wave directed toward its associated reflecting structure 642. The combination of radiator 648 and curvilinear reflecting structure 642 creates multiple radiating elements 658 with a non-isotropic radiating pattern. Although FIG. 39 depicts two curvilinear reflecting structures 642 and two area arrays 672 of radiators 648 and/or receivers 648, a phased array antenna of this embodiment of this invention can include more than two reflecting structures 642 each with an associated area array 672 of radiators and/or receivers 648 or may have only one reflecting structure 642 and associated area array 672.

The resulting phased array beam that is formed by all of the radiating and or receiving elements 658 in the lower portion 670 of antenna face 662 would have a horizontal beam width determined by the number of elements in each of the horizontal rows of area array 672. As depicted in FIG. 2, a 10-element horizontal line array would have a horizontal beam width of +/−5° and a gain of 10 dB, a 20-element horizontal line array would have a horizontal beam width of +/−3° and a gain of 13 dB and a 40-element horizontal linear array would have a horizontal beam width of +/−1.5° and a gain of 16 dB. Standard phased array electronic beam steering would be used to move the resulting in-phase beam across the horizontal field of view at least +/−60°. No electronic beam steering is used to move the resulting in-phase beam vertically as it is designed to be non-steerable vertically. Instead, the parabolic shape of reflecting structures 642 in the vertical plane forms a narrow vertical beam width, broadside of the antenna and generally set from the horizon to just above the horizon. The total gain for the portion of the antenna containing the non-isotropic radiating and/or non-omnidirectional receiving elements would be determined by the product of the number of elements in each area array times the number of area arrays times the gain that the curvilinear reflecting structure provides.

Grating Lobes

It must be noted that the gain plots depicted in FIGS. 2B through 2F assume that the element pitch is one-half wavelength of the operating frequency of the antenna. When the element pitch is less than or equal to ½ wavelength, only the main lobe and much lower gain side lobes exists in the field of view. Grating lobes appear when the element pitch is greater than ½ wavelength. FIG. 40A depicts gain plot 700 in polar coordinates of a seven-element linear array with element pitch at ½ wavelength. Main lobe 702 is centered at 90° (antenna broadside) and has a beam width of +/−7° with a peak gain of 11 dBi. The largest side lobes 704 occur at +122° and +58° with a maximum gain of −2 dBi. FIG. 40B depicts the gain plot in polar coordinates of a seven-element linear array with element pitch at one wavelength. Its main lobe is centered at 90° and has a beam width of +/−5° with a peak gain of 12 dBi. The largest side lobes 714 occur at +110° and +70° with a maximum gain of −0 dBi. Grating lobes 716 occur at +180° and at 0° with a maximum gain of +12 dB, equal to that of the main lobe. FIG. 40C depicts the gain plot in polar coordinates of a seven-element linear array with element pitch at 1½ wavelength. Its main lobe is centered at 90° and has a beam width of +/−3° with a peak gain of 10 dBi. The largest side lobes 724 occur at +105° and +75° with a maximum gain of 0 dBi. Grating lobes occur at +135° and at +45° with a maximum gain of +10 dB, equal to that of the main lobe.[8] Grating lobes degrade the performance of the phased array antenna because a target that is in the same direction as a grating lobe, would appear to be in the same direction as the main beam and cause a very strong false target return, which is unacceptable for any phased array antenna.

In many of the preferred embodiments of this invention, non-isotropic radiating elements and/or non-omnidirectional receiving elements are composed of isotropic radiators and/or omnidirectional receivers combined with either lenses and/or reflective structures. As one skilled in the art would know, each lens would need to be larger than the element it is associated with and a reflective structure would need to be larger than the element it is associated with. If a lens is used to narrow the radiating pattern of a radiator and/or the field of view of a receiver in the vertical plane and not the horizontal plane a curvilinear lens would be used. Vertical element pitch would need to be larger than ½ wavelength, such as 1 or 1½ wavelengths. Horizontal element pitch would remain at ½ wavelength since the curvilinear lens runs parallel to each row of elements in the array. This would mean that grating lobes could appear at +/−90° of elevation from antenna broadside with a one wavelength element pitch or at +/−45° in elevation from antenna broadside with a 1½ wavelength element pitch. A reflective structure used to focus the radiated waves in one plane such as a curvilinear reflective structure must also be larger than the element width in the plane that is focused. Using a curvilinear reflective structure to focus the radiated waves of an isotropic radiator or an array of isotropic radiators, in the vertical plane as proposed in a number of embodiments of this invention, would require vertical element spacing of more than ½ wavelength although horizontal spacing could remain ½ wavelength. As with the lenses above, with vertical element spacing of one wavelength, grating lobes could occur in the vertical plane at +/−90° from antenna broadside and with vertical element spacing of ½ wavelength, grating lobes could occur in the vertical plane at +/−45° from antenna broadside.

Limited Field of View In a phased array antenna system with all elements having non-isotropic receiving elements (radiating pattern of less than)+/−60° and/or non-omnidirectional receiving elements (field of view of less than)+/−60° would not be able to steer beams over a full +/−60° in elevation and/or azimuth that is the base line for phased array antenna. Such a phased array antenna system would also suffer from the effects of grating lobes that would create ambiguities as to which direction a positive return signal came from, i.e., from the direction of the main lobe or from the direction of a grating lobe. Ambiguities as to which direction would be unacceptable for phased array antenna systems such as radar systems or sonar systems.

These issues of grating lobes degrading antenna performance and limited radiating pattern and/or field of view for a phased array antenna having non-isotropic radiating elements and/or non-omnidirectional receiving elements are addressed in the embodiments of this invention. The limited radiating pattern and/or the limited field of view is overcome by the incorporation of two pluralities of radiating elements and/or receiving elements in one antenna system. Specifically, a first plurality of radiating elements, each radiating element having an isotropic radiating pattern of at least +/−60° in elevation and azimuth, and/or receiving elements, each receiving element having an omnidirectional field of view. The first plurality of radiating and/or receiving elements is used to address all regions in front of the antenna face of at least +/−60° in elevation and azimuth, for a range covering from the antenna face to a distance of $R_{MAX2}$. As shown in Example G above, utilizing one half of the elements of a baseline antenna such as a 1000 element phased array radar antenna to form the first plurality of radiating and/or receiving elements, would reduce the antenna maximum range, from $R_{MAX1}$ or 150 km to $R_{MAX2}$ or 126 km.

The remaining 500 isotropic and/or omnidirectional elements would be replaced by non-isotropic and/or non-omnidirectional elements that form the second plurality of radiating and/or receiving elements. The second plurality of elements are only used to address regions beyond $R_{MAX2}$ or 126 km, as the first plurality of elements is used to address all regions from +/−60° in elevation and azimuth and from the antenna to $R_{MAX2}$. If the second plurality of elements has vertical element pitch of one wavelength and horizontal element pitch of ½ wavelength, grating lobes could appear at elevations of +/−90° while a second plurality of elements with a vertical pitch of 1½ wavelength and horizontal element pitch of ½ wavelength, grating lobes could appear at elevations of +/−45°. This would mean that any object sitting at a range beyond $R_{MAX2}$ would send a strong return signal when the beam was steered at 0° in elevation, antenna broadside and would be assumed to be located at 0° in elevation, But in Example G, there cannot be a false return signal from a grating lobe beyond $R_{MAX2}$ or 126 km at an elevation of +/−90° in the case of one wavelength vertical pitch or at an elevation of +/−45°, the case of 1½ wavelength vertical pitch. At +90° and at +45°, objects causing a false return would be at 126 km or 89 km in elevation, respectively, beyond the atmosphere and into space where no viable target would be located. In a similar way, at −90° and at −45°, objects causing a false return would be at −126 km or −89 km in elevation, respectively, below the surface of the ground. Elimination of the false returns that can be caused by grating lobes from widely spaced elements is straight forward utilizing the two pluralities of elements, as disclosed in this specification. To summarize, all proposed embodiments of this invention would use the first plurality of elements to detect or track targets within $R_{MAX2}$ from +/−60° of antenna broadside in elevation and azimuth and would use the second plurality of elements to detect or track targets beyond $R_{MAX2}$ from +/−60° of antenna broadside azimuth and from about +/−6° to about +/−10° from antenna broadside in elevation and this fully eliminates the risk of grating lobes degrading the antenna performance.

Flat Dielectric Lenses

Figure 41B:
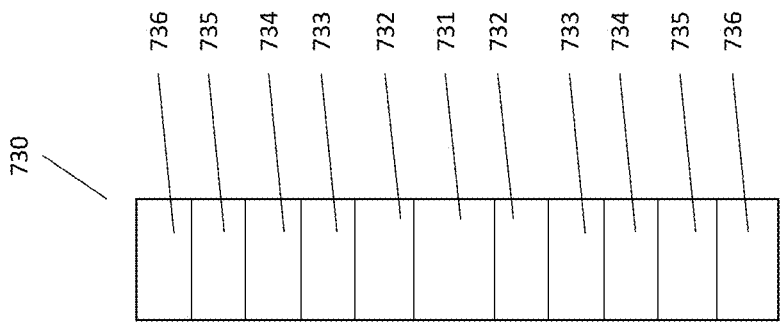
FIGS. 41A through 41C depict a prior art radial gradient dielectric flat lens that has concentric lenses utilizing dielectric material with differing dielectric constant material that can focus radiated waves and/or received waves in both the horizontal and vertical planes and a waveform plot of the flat lens.
Figure 41:
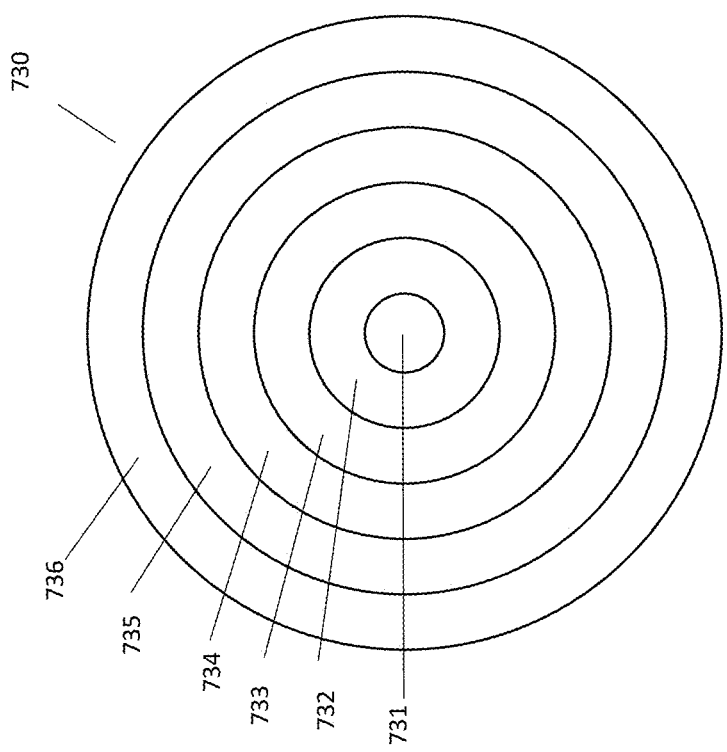
FIGS. 41D and 41E depict a prior art radial gradient dielectric flat lens that has a lens utilizing a varying density of through holes to achieve a varying effective dielectric constant that can focus radiated waves and/or received waves in both the horizontal and vertical planes and a waveform plot of the flat lens.
Figure 41C:
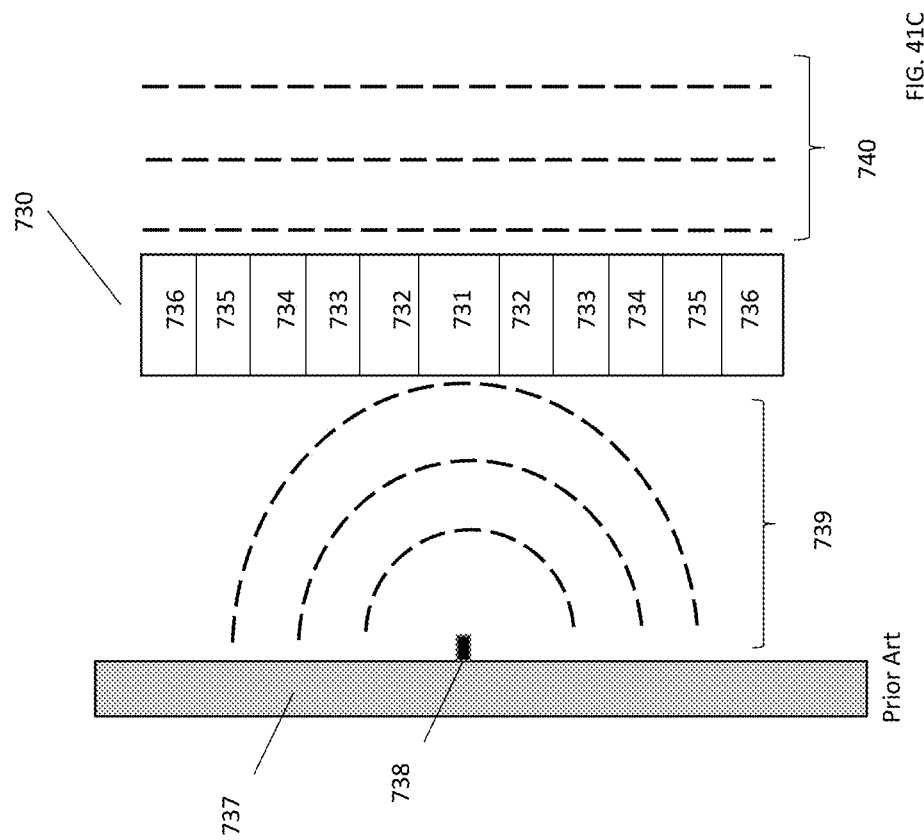
Figure 41E:
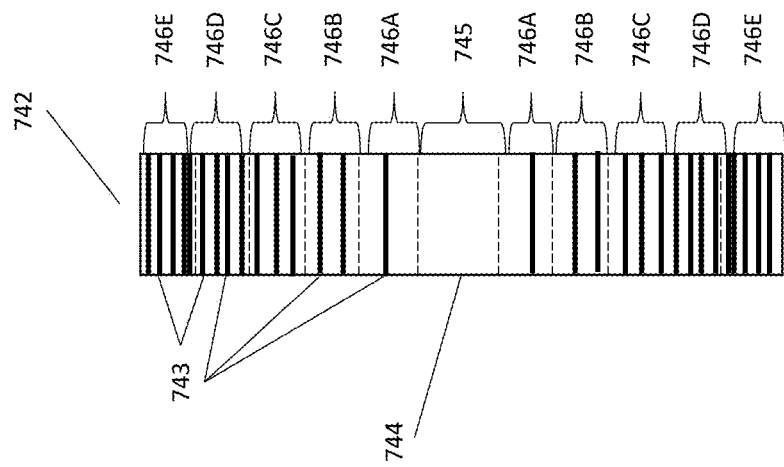
Figure 41:
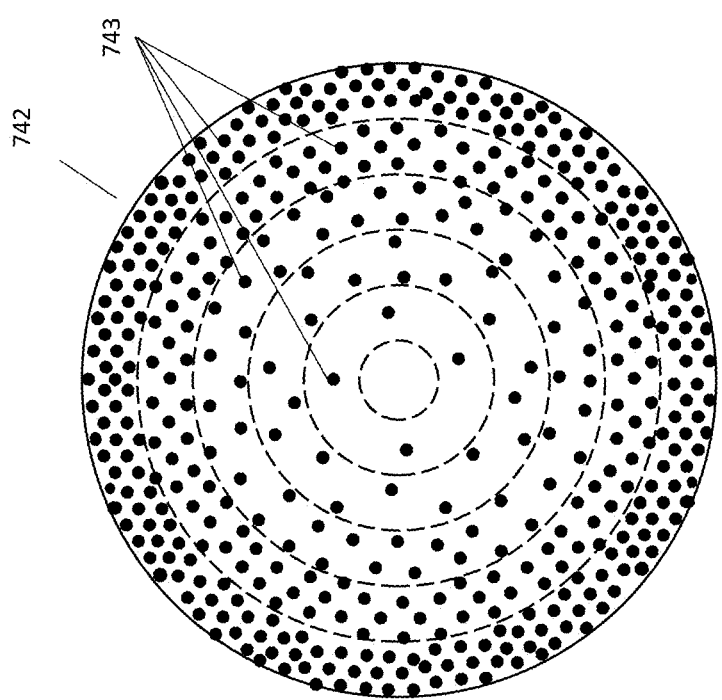
Figure 42B:
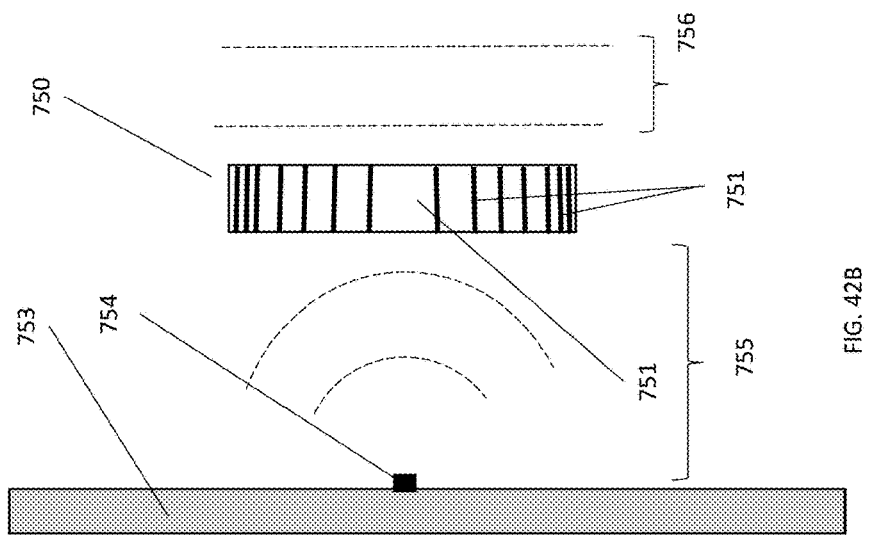
FIGS. 42A through 42C depict a linear gradient dielectric flat lens and a vertical wave plot and a horizontal wave plot respectively. The a linear gradient dielectric flat lens utilizes a varying density of through holes in the vertical plane and with a constant density of through holes in the horizontal plane to achieve a varying effective dielectric constant in the vertical plane and a constant effective dielectric constant in the horizontal plane that can focus radiated waves and/or received waves in the vertical planes and not focus radiated waves and/or received waves in the horizontal plane a waveform plot of the flat lens.

Isotropic radiated waves can also be focused utilizing flat dielectric lenses having a varying dielectric constant. A typical dielectric flat lens that focuses spherical radiated waves from an isotropic radiator into planar radiated, non-isotropic, waves in both the horizontal and vertical planes would be a radial gradient dielectric flat lens that consists of multiple concentric rings of dielectric material with each ring having a different permittivity (€r). This creates desired phase delays from each ring and forms a plane wave exiting the lens forming a very narrow radiating field for each element. FIGS. 41A through 41E depict various images of radial gradient dielectric flat lenses and the wave fronts going into and coming out of the lens. FIGS. 41A and 42B depict a face view and a cross-sectional view respectively, of prior art radial gradient dielectric flat lens 730 having center 731 and five concentric rings 732 through 736, around it, each having a differing €r. [9] In one example lens, center 731 has an €r of 6.05 and outer ring 736 has an €r of 2.25 with the other rings, 732 through 735 having €r from 5.77 to 3.16. As depicted in FIG. 41C, when flat lens 730 is radiated by spherical radiated wave 737 radiated from radiator 738, a plane wave 739 is radiated from flat lens 730 with a beam width of about +/−6°, broadside to the lens. Because of the difficulty in constructing lens 730, an alternative lens structure was used to form a concentric dielectric flat lens. FIGS. 41D and 41E depict a face view and a cross-sectional view respectively, of prior art radial dielectric flat lens 742 utilizing holes 743 through a uniform dielectric material 744 with the density of holes determining the effective €r in any region of the lens. This alternate structure utilizes base dielectric material 745 with a uniform €r, as for example 6.0, and then forms small holes 743 through dielectric 744 with the hole density varying from 0% in center region 745, to about 75% at the outer area and with the hole density increasing from inner ring area 746A through each next larger ring area from ring area 746B through 746D. The effective €r varies from 6.0 at the center to 2.25 at the perimeter, effectively matching the concentric ring lens 730 depicted in FIGS. 41A and 41B.

Figure 42A:
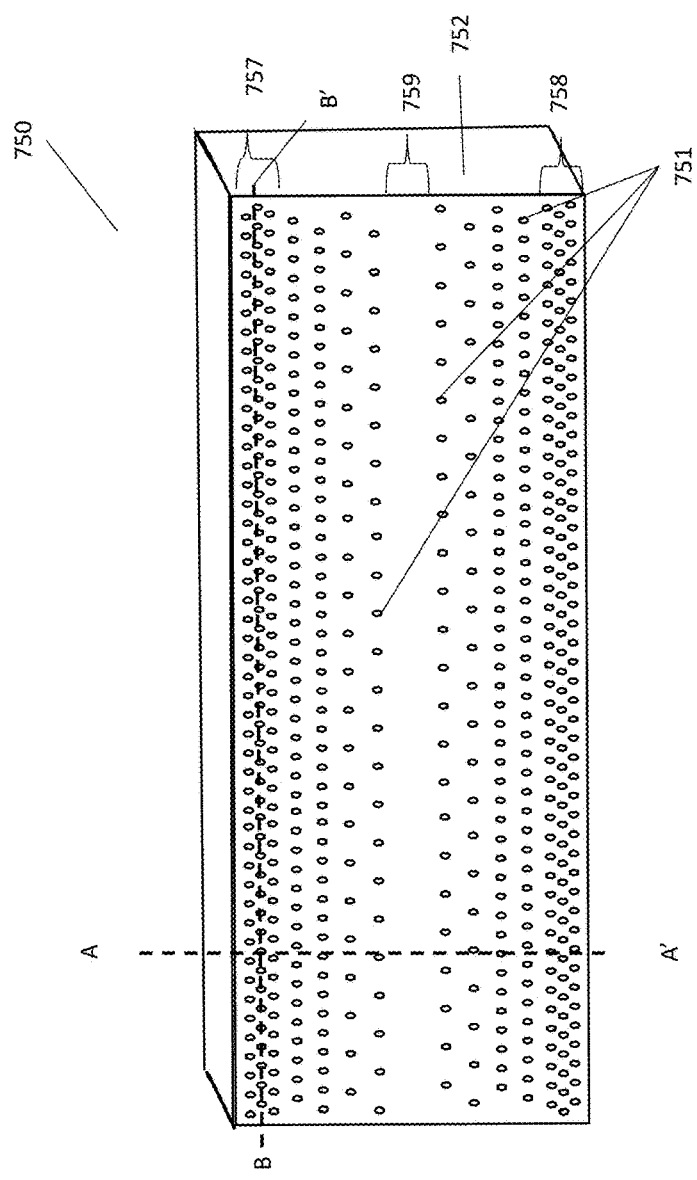
Figure 42C:
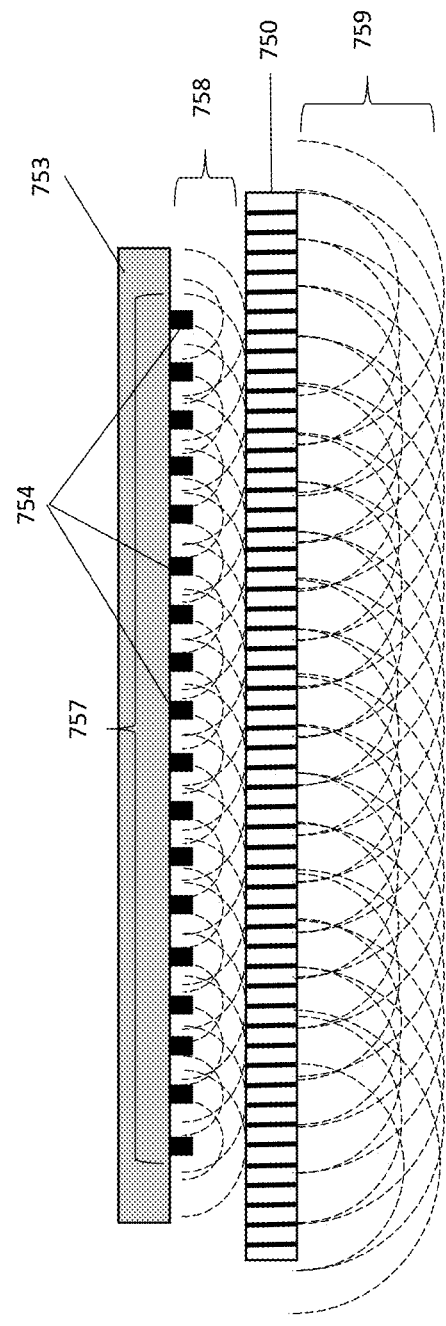

A preferred embodiment of this invention is to utilize a linear gradient dielectric flat lens with a dielectric constant that varies vertically but is constant horizontally to focus the radiated waves of isotropic radiators from a line array in the vertical plane and not focus the radiated waves in the horizontal plane. FIGS. 42A through 42C depict linear gradient dielectric flat lens 250 with varying density of through holes 572 in dielectric material 751. FIG. 42A depicts a perspective view of flat lens 750 with holes 752 formed through dielectric material 751. The density of holes 752 in the vertical direction varies with top region 757 and bottom region 758 have the highest density of holes 752 and therefore the lowest €r, the center region 759 has no holes and has the highest €r with the other regions having a varying density of holes 752 and a varying €r. FIG. 42B depicts a vertical cross-sectional view A-A' through flat lens 750 of FIG. 42A, showing antenna structure 753, radiator 754, radiated spherical waves 755 and planar waves 756. Lens 750 focuses radiated spherical waves 755 from isotopic radiator 754 into planer waves 756 in the vertical plane. FIG. 42C depicts a horizontal cross-sectional view B-B' through flat lens 750 of FIG. 42A, showing antenna structure 753, line array 757 with radiators 754, radiated spherical waves 758 and waves 759 exiting the lens with radial wavefront in the horizontal plane. Lens 750 does not focus radiated spherical waves 758 from radiator 754 in the horizontal plane. In a similar way, return planar waves (not depicted) pass through flat lens 750 forming focused waves (not depicted) in the vertical plane that are focused onto receivers 754 and not forming focus waves in the horizontal plane.

Figure 43B:
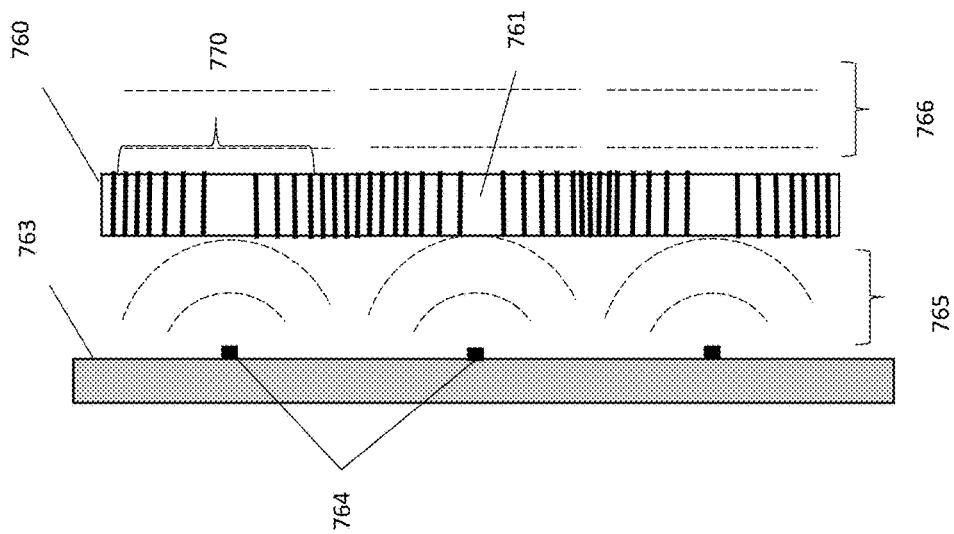
FIGS. 43A and 43B depict a linear gradient dielectric flat lens and a vertical wave plot with three separate lens areas to focus waves in the vertical plane from three sets of elements. The a linear gradient dielectric flat lens utilizes a varying density of through holes in the vertical plane and with a constant density of through holes in the horizontal plane to achieve a varying effective dielectric constant in the vertical plane and a constant effective dielectric constant in the horizontal plane that can focus radiated waves and/or received waves in the vertical planes and not focus radiated waves and/or received waves in the horizontal plane a waveform plot of the flat lens.
Figure 43A:
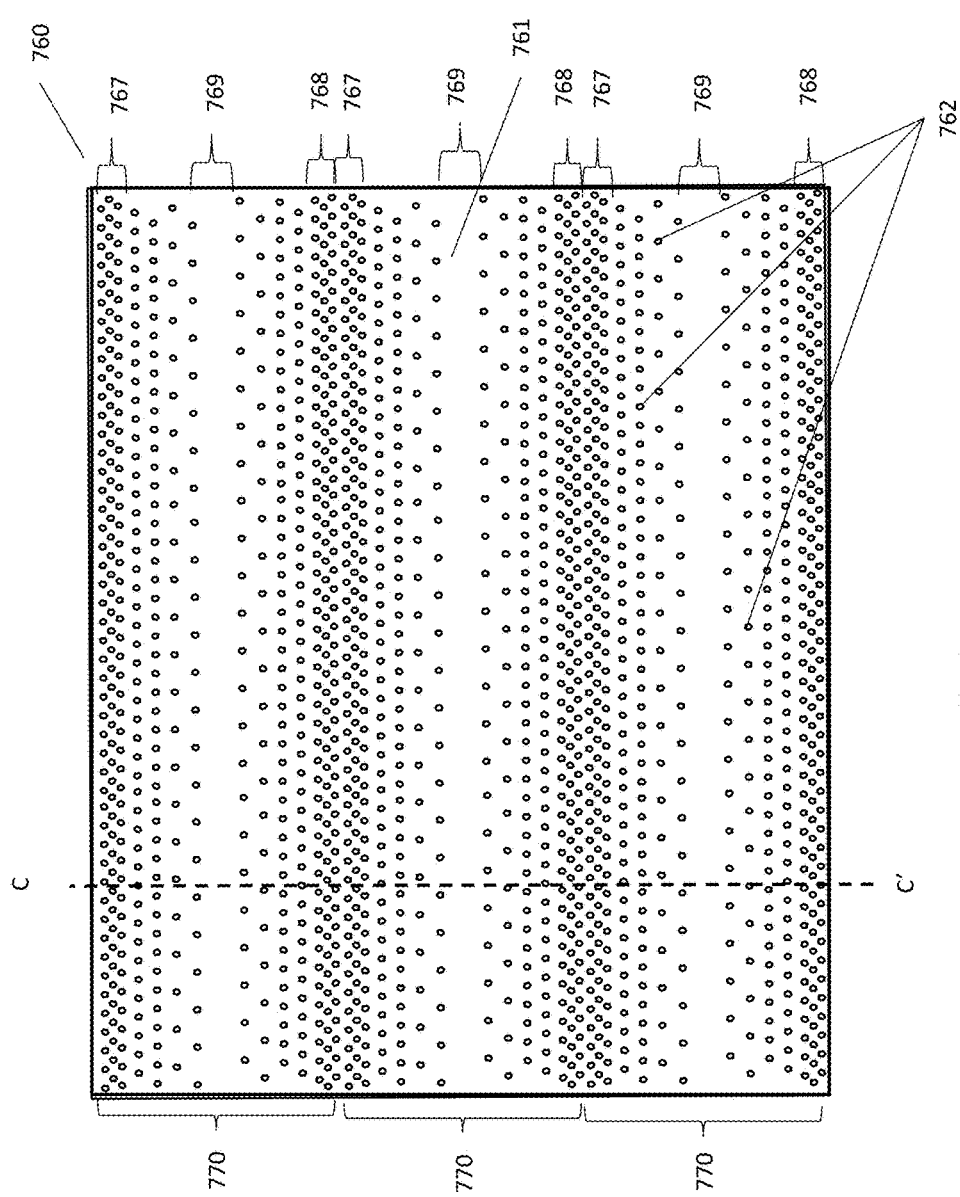

FIGS. 43A and 43B depict linear gradient dielectric flat lens 760 with varying density of through holes 762 in dielectric material 761 that creates a varying dielectric constant covering multiple line arrays of radiators. FIG. 43A depicts a front face view of flat lens 760 which has three sets of linear gradient dielectric flat lens areas 770, each used to focus the radiated waves from different line arrays of isotropic radiators. The flat lens is composed of dielectric material 761 and has through holes 762 formed there through. As with flat lens 750 in FIGS. 42A and 42B, the density of holes varies vertically within each of the three lens areas 770. The upper portion 767 of each lens area 770 and the lower portion 768 of each lens area 770 have a high density of holes 762 and a low €r, the center portion 769 of each lens area 770 has no holes 762 and has a high €r and the portions between these portions have holes 762 with densities less than areas 767 and 768 and more than area 769 and effective €r that is more than that of areas 767 and 768 and less than that area 769. FIG. 43B depicts a vertical cross section of flat lens 760 through C-C' along with antenna base 763, radiators 764, radiated spherical waves 765 and planar waves 766. As with FIG. 42B above, radiators 764 with isotropic radiating patterns 765 which impinge on flat lens 760 and get focused in the vertical plane into flat planar waves 766 but do not get focused in the horizontal plane and remain radial waves.

For the purposes of the specification for this invention the term "generally isotropic radiating element" is defined as a radiating element that has a field of view of at least 120° in azimuth and a field of view of at least 90° in elevation. Further, for the purposes of the specification for this invention the term "non-isotropic radiating element" is defined as a radiating element that has a field of view is less than half of the field of view of the "generally isotropic radiating elements" of the antenna array in either azimuth and/or elevation. Similarly, for the purposes of the specification for this invention the term "generally omnidirectional receiving element" is defined as a receiving element that has a field of view of at least 120° in azimuth and a field of view of at least 90° in elevation. In addition, for the purposes of the specification for this invention, the term "non-omnidirectional receiving element" is defined as a receiving element that has a field of view is less than half of the field of view of the "generally omnidirectional receiving elements" of the antenna array in either azimuth and/or elevation.

While the invention has been described in detail with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of this invention have been described, it is to be understood that aspects of this invention may include only some of the described embodiments. Accordingly, the invention is not to be seen as limited by the foregoing description, but is only limited by the scope of the appended claims.

REFERENCES

[1] *A Framework for Understanding: Deriving the Radar Range Equation*, Keysight.com
[2] *mmWave Automotive Radar and Antenna System Development*, awrcorp.com Application Note.
[3] *ARS 408-21 Long Range Radar Overview*, Conti-engineering.com
[4] *Introduction to Naval Weapon Engineering*, fas.org
[5] *Laser Beam Steering Subsystem*, Center for Gravitational Physics, Australian National University
[6] *Highly Integrated Optical Phased Arrays*, Martin J. R. Heck, degruter.com, Aarhus University, Denmark
[7] *Revolutionary new 2D optical phased array is packed onto a single, tiny chip*, ExtremeTech, Jan. 13, 2013
[8] *Antenna Theory and Design*, Stutzman, W. L. Thiele, G. A 3rd Edition. New York: Wiley, 2013, p. 307
[9] *Design and Performance Evaluation of a Dielectric Flat Lens Antenna for Millimeter-Wave Applications*, M. Imbert et al., IEEE Antennas and Wireless Propagation Letters, 2013

What is claimed is:

1. A phased array antenna system comprising:
a first plurality of array elements, each said array element in said first plurality comprising at least one of: a radiating element having an isotropic radiating pattern; and a receiving element having an omnidirectional field of view; and
a second plurality of array elements, each said array element in said second plurality comprising at least one of: a radiating element having a non-isotropic radiating pattern; and a receiving element having a non-omnidirectional field of view; wherein:
said isotropic radiating pattern comprises a radiating pattern of at least 120° in azimuth and 90° in elevation;
said omnidirectional field of view comprises a field of view of at least 120° in azimuth and 90° in elevation;
said non-isotropic radiating pattern comprises a radiating pattern of less than half f said isotropic radiating pattern in elevation;
said non-omnidirectional field of view comprises a field of less than half of said omnidirectional field of view in elevation;
said first plurality of array elements address non-remote field regions and said second plurality of array elements address remote field regions; and
wherein said second plurality of array elements comprises at least one of: radiators with isotropic radiating patterns; and receivers with an omnidirectional field of view and at least one curvilinear reflective structure that is curved in the vertical plane and is linear in the horizontal plane and that focuses in the vertical plane but does not focus in the horizontal plane.

2. The phased array antenna system of claim 1, wherein each of the said at least one curvilinear reflective structures has at least one of: a horizontally orientated line array of said radiators with isotropic radiating patterns radiating waves toward it; and said receivers with an omnidirectional field of view receiving waves from it.

3. The phased array antenna system of claim 1, wherein each of the said at least one curvilinear reflective structures has at least one of: a horizontally orientated area array of said radiators with isotropic radiating patterns radiating waves toward said reflective structure; and said receivers with an omnidirectional field of view receiving waves from said reflective structure.

4. The phased array antenna system of claim 3, wherein each row of the at least one horizontally orientated area array of said at least one of radiators and receivers can be independently controlled to form radiated waves directed at different elevation angles.

5. The phased array antenna system of claim 1, wherein the vertical element-to-element spacing and the horizontal element-to-element spacing of the second plurality of said at least one of a radiating and a receiving element do not cause grating lobes that degrade the performance of the antenna system.

6. The phased array antenna system of claim 1, wherein the phased array antenna system is an electromagnetic phased array antenna system.

7. The electromagnetic phased array antenna system of claim 6, wherein the electromagnetic phased array antenna system is part of a radar system or a communication system.

8. The phased array antenna system of claim 1, wherein the phased array antenna system is an acoustic phased array antenna system.

9. The acoustic phased array antenna system of claim 8, wherein the acoustic phased array antenna system is part of a sonar system or an ultrasound system.

10. A phased array antenna system comprising:
a first plurality of array elements, each said array element in said first plurality comprising at least one of: a radiating element having an isotropic radiating pattern; and a receiving element having an omnidirectional field of view; and
a second plurality of array elements, each said array element in said second plurality comprising a radiating element having at least one of: a non-isotropic radiating pattern; and a receiving element having a non-omnidirectional field of view; wherein:
said isotropic radiating pattern comprises a field of at least 120° in azimuth and 90° in elevation;
said omnidirectional field of view comprises a field of at least 120° in azimuth and 90° in elevation;
said non-isotropic radiating pattern comprises a radiating pattern of less than half of said isotropic radiating pattern in elevation;
said non-omnidirectional field of view comprises a field of less than half of said omnidirectional field of view in elevation;

wherein said second plurality of array elements comprises at least one of: radiators with isotropic radiating patterns; and receivers with an omnidirectional field of view; and at least one linear gradient dielectric flat lens comprising a varying effective dielectric constant in the vertical plane and a constant effective dielectric constant in the horizontal plane and focuses in the vertical plane but does not focus in the horizontal plane.

11. The phased array antenna system of claim 10, wherein the vertical element-to-element spacing and the horizontal element-to-element spacing of the second plurality of said at least one of a radiating and a receiving element; do not cause grating lobes that degrade the performance of the antenna system.

12. The phased array antenna system of claim 10, wherein the phased array antenna system is an electromagnetic phased array antenna system.

13. The electromagnetic phased array antenna system of claim 12, wherein the electromagnetic phased array antenna system is part of a radar system or a communication system.

14. The phased array antenna system of claim 10, wherein the phased array antenna system is an acoustic phased array antenna system.

15. The acoustic phased array antenna system of claim 14, wherein the acoustic phased array antenna system is part of a sonar system or an ultrasound system.

16. A phased array antenna system comprising:

a first plurality of array elements, each said array element in said first plurality comprising at least one of: a radiating element having an isotropic radiating pattern; and a receiving element having an omnidirectional field of view; and a second plurality of array elements, each said array element in said second plurality comprising at least one of: a radiating element having a non-isotropic radiating pattern; and a receiving element having a non-omnidirectional field of view; wherein:

said isotropic radiating pattern comprises a field of at least 120° in azimuth and 90° in elevation;

said omnidirectional field of view comprises a field of at least 120° in azimuth and 90° in elevation;

said non-isotropic radiating pattern comprises a radiating pattern of less than half of said isotropic radiating pattern in elevation;

said non-omnidirectional field of view comprises a field of less than half of said omnidirectional field of view in elevation;

wherein said second plurality of array elements comprises at least one of: radiators with isotropic radiating patterns; and receivers with an omnidirectional field of views; and at least one cylindrical metal lens that focuses in the vertical plane but does not focus in the horizontal plane.

17. The phased array antenna system of claim 16, wherein the vertical element-to-element spacing and the horizontal element-to-element spacing of the second plurality of at least one of a radiating and a receiving element do not cause grating lobes that degrade the performance of the antenna system.

18. The phased array antenna system of claim 17, wherein the phased array antenna system is an electromagnetic phased array antenna system.

19. The electromagnetic phased array antenna system of claim 18, wherein the electromagnetic phased array antenna system is part of a radar system or a communication system.

* * * * *